(12) United States Patent
Harris et al.

(10) Patent No.: US 6,505,341 B1
(45) Date of Patent: Jan. 7, 2003

(54) SYSTEM AND METHOD FOR PROGRAMMING A LOGIC CONTROL UNIT

(75) Inventors: Richard Harris, San Jose, CA (US); Jack Wiens, San Jose, CA (US); Joseph Fraser, Santa Rosa, CA (US); Heiki Kask, Tallinn (EE); Peter Nobel, Tallinn (EE)

(73) Assignee: Scientronix, Inc., San Jose, CA (US)

( * ) Notice: Subject to any disclaimer, the term of this patent is extended or adjusted under 35 U.S.C. 154(b) by 0 days.

(21) Appl. No.: 09/189,027

(22) Filed: Nov. 10, 1998

(51) Int. Cl.$^7$ ................................................ G06F 9/44
(52) U.S. Cl. ......................... 717/100; 716/11; 716/17; 716/18
(58) Field of Search ............................. 717/1; 709/104, 709/213; 700/716; 716/11, 17, 18

(56) References Cited

U.S. PATENT DOCUMENTS

| | | | |
|---|---|---|---|
| 5,414,851 A | * 5/1995 | Brice, Jr. et al. | 709/104 |
| 5,491,799 A | * 2/1996 | Kreuzenztein et al. | 709/213 |
| 5,555,201 A | * 9/1996 | Dangelo et al. | 364/489 |
| 5,572,437 A | * 11/1996 | Rostoker et al. | 364/489 |
| 5,623,418 A | * 4/1997 | Rostoker et al. | 364/489 |
| 5,801,958 A | * 9/1998 | Dangelo et al. | 364/489 |
| 5,867,399 A | * 2/1999 | Rostoker et al. | 364/489 |
| 5,933,356 A | * 8/1999 | Rostoker et al. | 364/489 |
| 6,167,319 A | * 12/2000 | Harris et al. | 700/86 |
| 6,385,757 B1 | * 5/2002 | Gupta et al. | 716/1 |
| 6,389,383 B1 | * 5/2002 | Sarathy et al. | 703/21 |
| 6,446,243 B1 | * 9/2002 | Huang et al. | 716/7 |

* cited by examiner

Primary Examiner—Gregory Morse
Assistant Examiner—Todd Ingberg
(74) Attorney, Agent, or Firm—Oppenheimer Wolff & Donnelly LLP; Claude A. S. Hamrick; Justin F. Boyce

(57) ABSTRACT

A system and process for generating a control program for execution by a programmable logic control unit including the steps of: providing a variable editing user interface allowing a user to define and edit variables including input variables and output variables; providing a program level editing user interface allowing the user to edit a program level; providing a state editing user interface allowing a user to define and edit a plurality of states of the control program; providing a condition editing user interface allowing a user to define and edit at least one condition for each of the states of the control program; and generating the control program as a function of associative relationships of the variables, states, and conditions.

33 Claims, 52 Drawing Sheets

DIGITAL INPUT VARIABLE

| ID | DI VAR. NAME | I/O ADDRESS | ON STATE LOGIC LEVEL | NUMBER OF SAMPLES | SAMPLE TIME | DI VALUE |
|---|---|---|---|---|---|---|
| | | | 248 | 250 | 252 | 253 |

DIGITAL OUTPUT VARIABLE

| ID | DO VAR. NAME | I/O ADDRESS | ACCESS RIGHT | ON STATE LOGIC LEVEL | DELAY | LED PROPERTY | DO VALUE |
|---|---|---|---|---|---|---|---|
| | | | 256 | | 258 | 260 | 261 |

LED VARIABLE

| ID | LED VAR. NAME | I/O ADDRESS | ACCESS RIGHT | ON STATE LOGIC LEVEL |
|---|---|---|---|---|

PANEL SWITCH VARIABLE

| ID | PS VAR. NAME | I/O ADDRESS | ACCESS RIGHT | ON STATE LOGIC LEVEL |
|---|---|---|---|---|

PROGRAM VARIABLE

| ID | PROGRAM VARIABLE. NAME | CONFIGURATION PROPERTY | INITIALIZATION VALUE | ACCESS RIGHT |
|---|---|---|---|---|

DIGITAL VARIABLE

| ID | DIGITAL VARIABLE NAME | CONFIGURATION PROPERTY | INITIALIZATION VALUE | ACCESS RIGHT | LED PROPERTY |
|---|---|---|---|---|---|

TIMER VARIABLE

| ID | TIMER VARIABLE NAME | CONFIGURATION PROPERTY | INITIALIZATION VALUE | ACCESS RIGHT |
|---|---|---|---|---|

LEVEL-2 (TASK)

LEVEL-3 (SUBROUTINE)

1200 ↘

'DIGITAL OUTPUT VARIABLE' CROSS REFERENCE

DIGITAL OUTPUT VARIABLE NAME ⟩ 1205

| SET OFF | LEVEL NAME : STATE NAME | X:Y | R/O ACCESS |
| | LEVEL NAME : STATE NAME | X:Y | R/O ACCESS |

⎵1206   ⎵1207   ⎵1208   ⎵1209

1202 ↘

'DIGITAL INPUT VARIABLE' CROSS REFERENCE

DIGITAL INPUT VARIABLE NAME ⟩ 1210

| TEST ON IN AND | LEVEL NAME : STATE NAME : COND. NAME | X:Y:Z |
| TEST OFF IN AND | LEVEL NAME : STATE NAME : COND. NAME | X:Y:Z |

⎵1211   ⎵1212   ⎵1213

1204 ↘

'TIMER VARIABLE' CROSS REFERENCE

TIMER VARIABLE NAME ⟩ 1214

| 'FORMULA NAME' | LEVEL NAME : STATE NAME | X:Y | FORMULA EXPRESSION |
| 'FORMULA NAME' | LEVEL NAME : STATE NAME | X:Y | FORMULA EXPRESSION |

SYSTEM AND METHOD FOR PROGRAMMING A LOGIC CONTROL UNIT

CROSS REFERENCE TO RELATED APPLICATIONS

This application is related to copending U.S. patent application Ser. No. 09/172,473, filed on Oct. 13, 1998, entitled "PROCESS FOR GENERATING PROGRAM LISTINGS FOR PROGRAMMING A LOGIC CONTROL UNIT".

BACKGROUND OF THE INVENTION

1. Field of the Invention

This invention relates generally to systems and methods for configuring logic control units in distributed process control systems, and more particularly to a computer implemented programming process used to program a logic control unit based on a form of state machine theory.

2. Description of the Prior Art

Distributed process control systems are widely used in many applications including machine tools, material handling, assembling systems, molding and casting machines, and robotics systems. Such systems typically include a logic control unit (LCU) such as a commercially available programmable logic controller (PLC) which is a specialized data processor. A PLC typically includes a plurality of input ports for receiving analog and digital input signals from components of the system under control, a plurality of output ports providing digital and analog output signals to components of the system, a microprocessor, and memory for storing a control program. The PLC operates by repetitively scanning the signals present at the input ports to determine input data, analyzing the input data using the control program stored in memory to determine the corresponding output data, and providing output signals based on the output data at the output ports in order to control the system.

In accordance with one prior art method for configuring a PLC, a control program is created using a "ladder logic" programming method. A ladder logic program typically includes a plurality or ladder logic statements commonly referred to as "rungs". Each ladder logic statement defines a relationship between variables such as between an output variable and an input variable. A simple ladder logic statement might indicate that a particular output variable is ON if and only if variables A and B are both ON. For easier comprehension by ladder logic programmers, ladder logic editors use ladder logic statements, and programs are often expressed in terms of ladder logic graphs including input symbols, line segments, and variable names.

Ladder logic programs are created and edited using a programming computer system separate from the PLC such as a personal computer or mini computer. A complete ladder logic program is recorded on magnetic tape or disk, and uploaded from the programming computer system into the memory of the PLC.

An important problem with prior art methods for programming logic control units, such as those using a ladder logic editor, is that a skilled ladder logic programmer is needed to create a ladder logic program. In accordance with a typical prior art PLC development cycle, development begins with a hardware applications engineer who designs and builds the hardware for the system under control. A PLC programmer then interfaces with the hardware application engineer who describes specifications of the system to the programmer. The programmer then begins software development. Typically the hardware engineer cannot read the ladder logic program listing either in the form of ladder logic instructions or in the ladder logic graph form. Therefore it is common that numerous problems with the control system are discovered by the hardware engineer only after executing the software over the PLC. When the application engineer begins to evaluate the performance of the system as controlled by the configured PLC, the engineer determines problems with the system which must then be communicated to the programmer. The programmer then reads the ladder logic graphs or statements in order to determine which rungs of the diagrams correspond with the problems in the implemented system which have been communicated to the programmer by the hardware application's engineer. Although this repetitive communication between the programmer and applications engineer is awkward and time consuming, it is necessary because the hardware applications engineer is typically not skilled in the art of programming PLC's using a ladder logic editor.

What is needed is a system and method for programming a logic control unit wherein the time required to develop and test the control program is reduced.

What is also needed is a system and method for programming a logic control unit wherein the programming process provides an interface which is easily understood by an applications engineer who is not trained in the arts of software engineering ladder logic instructions, or ladder logic graphs.

SUMMARY OF THE INVENTION

It is an object of the present invention to provide a system and method for programming a logic control unit wherein the time required to develop and test the control program is reduced.

It is also an object of the present invention to provide a system and method for programming a logic control unit wherein the programming process provides an interface which is easily understood by an applications engineer who is not trained in the arts of software engineering ladder logic instructions, or ladder logic graphs.

It is a further object of the present invention to provide such a system and method which is capable of generating programming listings describing the operation of the programmed process, the program listings being easily read and understood by an applications engineer who is not trained in the arts of software engineering.

It is yet another object of the present invention to provide a method of programming a logic controller wherein it is easy to effect and accommodate changes in the system under control. Further objects of the present invention include the provision of automatic flow chart generation, self-documenting functions, and improved quality of the controlling process.

The present invention provides a process for generating a control program for execution by a logic control unit having a plurality of input ports for receiving input signals from components of an external system under control, and a plurality of output ports for providing output signals to components of the external system. The process includes the steps of; providing a variable editing user interface allowing a user to define and edit variables including input variables associated with corresponding ones of the input signals, and output variables associated with corresponding ones of the output signals; and storing the variables in an internal file.

The process also includes the steps of; providing a state editing user interface allowing a user to define and edit a plurality of states of the control program, wherein selected ones of the variables are associated with corresponding ones of the states, and wherein each selected variable is assigned a corresponding selected data value upon transition of the control program to the selected corresponding state during execution of the control program by the logic control unit; and storing the states in the internal file. The process further includes the steps of; providing a condition editing user interface allowing a user to define and edit at least one condition for each of the states of the control program, each condition specifying a transition from an associated state as a source state to a corresponding selected destination state of the control program upon satisfaction of the condition during execution of the control program by the logic control unit; storing the conditions in the internal file; and generating the control program as a function of the associative relationships of the variables, the states, and the conditions stored in the internal file.

In a preferred embodiment, the process further includes the step of providing a program level editing user interface allowing the user to define and edit a plurality of program levels each including a corresponding plurality of the states, each program level for defining a sub-process of the control program, each program level for asynchronous execution by the logic control unit. The program levels include: at least one task program level; and at least one subroutine program level which may be called by a corresponding calling one of the program levels, the plurality of states of the corresponding calling program level including at least one state having a call condition associated therewith, the call condition specifying a transition from the associated state of the calling program level to a corresponding selected destination state of the corresponding subroutine program level. The plurality of states of the corresponding subroutine program level including at least one state having a return condition associated therewith, the return condition specifying that the control program is to transition to a return state of the corresponding calling program level upon satisfaction of the return condition during execution of the control program. The return state is indicated by a return state field associated with the calling condition of the corresponding calling program level. Each subroutine program level and corresponding calling program level are executed by the logic control unit in a single thread. Each of the program levels has a program level value field associated therewith, the program level value field for carrying a corresponding program level value uniquely identifying the program level.

Each of the states of each program level has a state address field associated therewith, the state address field for carrying a corresponding state address defined by the program level value of the corresponding program level, and a corresponding state value uniquely identifying the state. Each of the conditions has condition fields associated therewith, the condition fields including, a condition address field for carrying a corresponding condition address indicative of the conditions the condition address being formed by the program level value of the corresponding program level, the state value of the corresponding state, and a corresponding condition value uniquely identifying the corresponding condition, and a destination state address field carrying the state address of the corresponding selected destination state to which the process is to transition if the condition is determined to be true during execution of the control program by the logic control unit.

Each of the program levels has a program level name field associated therewith, the program level name field for receiving a user specified character string descriptive of the corresponding program level. Each of the states of each program level has a state name field associated therewith, the state name field for receiving a user specified character string descriptive of the corresponding state. The condition fields further include a condition name field for receiving a user specified character string descriptive of the corresponding condition.

The state values and the condition values are automatically generated sequentially by the programming process as the user defines the states and the conditions via the state editing user interface and the condition editing user interface respectively. The variables further comprise memory location variables including: at least one program variable for which an associated program variable data field is to be allocated by the logic control unit upon execution of the control program; and at least one digital variable for which an associated digital variable data field is to be allocated by the logic control unit upon execution of the control program.

The input variables include: analog input variables associated with corresponding analog input signals received from corresponding ones of the components of the external system; and digital input variables associated with corresponding digital input signals received from corresponding ones of the components of the external system. The output variables include: analog output variables associated with corresponding analog output signals provided to corresponding ones of the components of the external system; and digital output variables associated with corresponding digital output signals provided to corresponding ones of the components of the external system.

The conditions include condition statements for determining whether the transition from the associated source state to the corresponding destination state is to occur, the condition statements comprising check-state condition statements specifying that a selected check state one of the states must be active for the associated condition to be satisfied, the selected check state and the source state being associated with different ones of the program levels. Selected limited ones of the program levels are limited to be executed by the logic control unit only when corresponding selected limiting states are active, each limiting state being associated with a program level other then the corresponding limited program level.

The forgoing and other objects, features, and advantages of the present invention will be apparent from the following detailed description of the preferred embodiment which makes reference to the several figures of the drawing.

IN THE DRAWINGS

FIG. 31B is a functional block diagram generally illustrating software modules for receiving and interpreting a control program in the UCB of FIG. 2;

FIGS. 4A through 4I are block diagrams generally illustrating fields of variables used in the programming process of the present invention;

Figure 36:
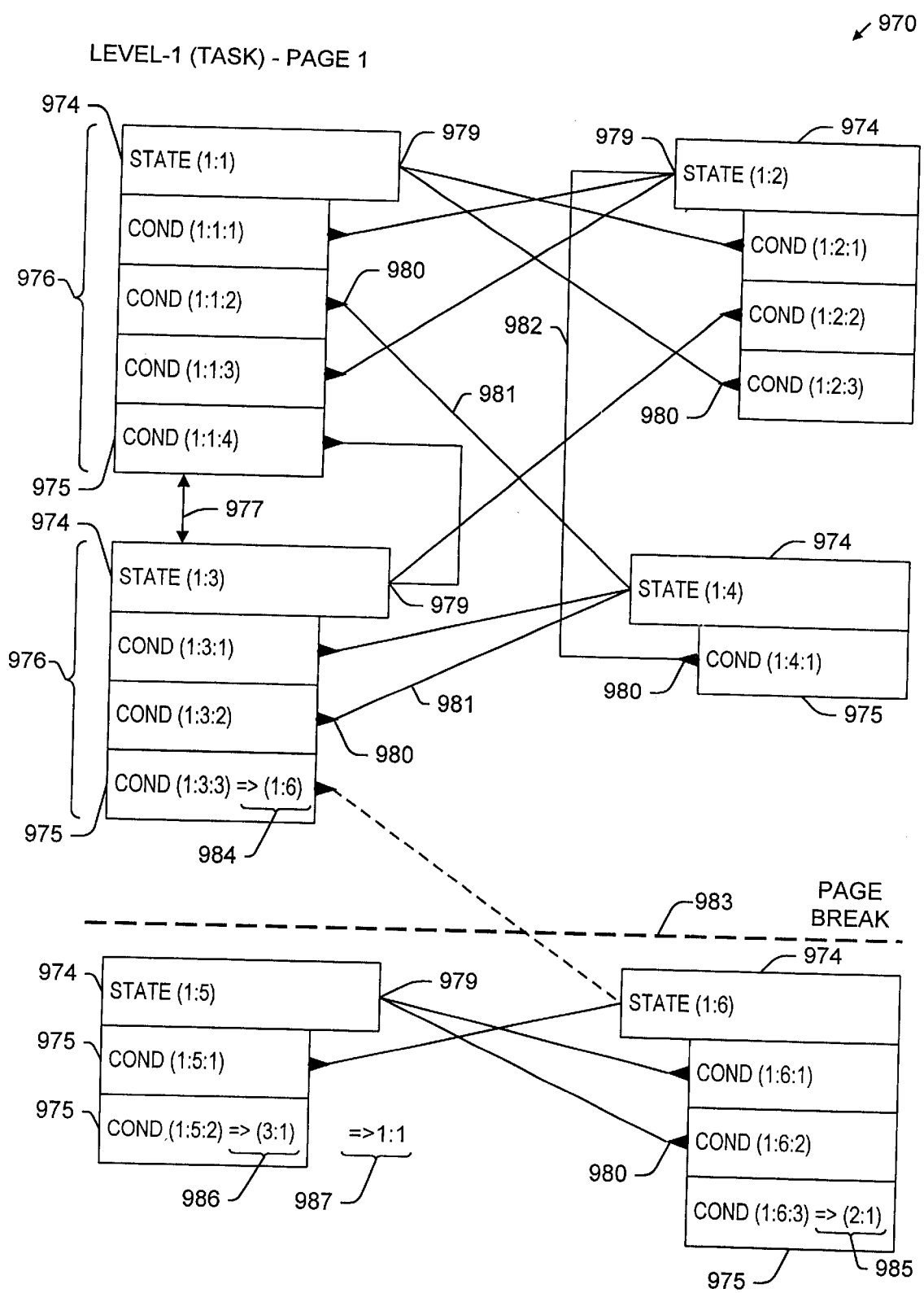
Figure 37:
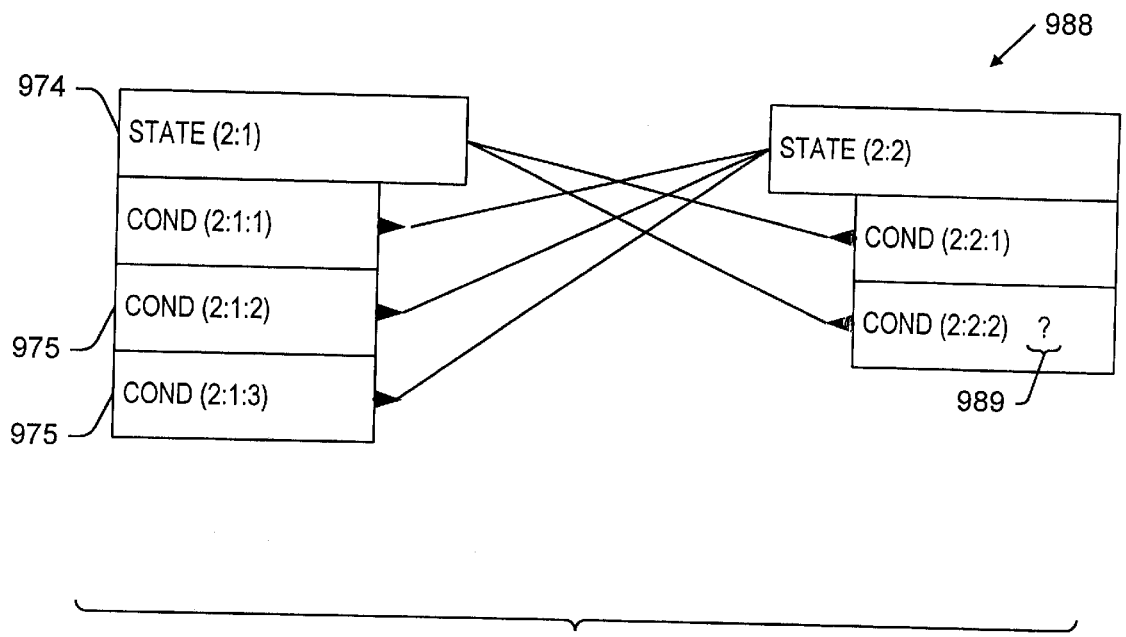
Figure 38:
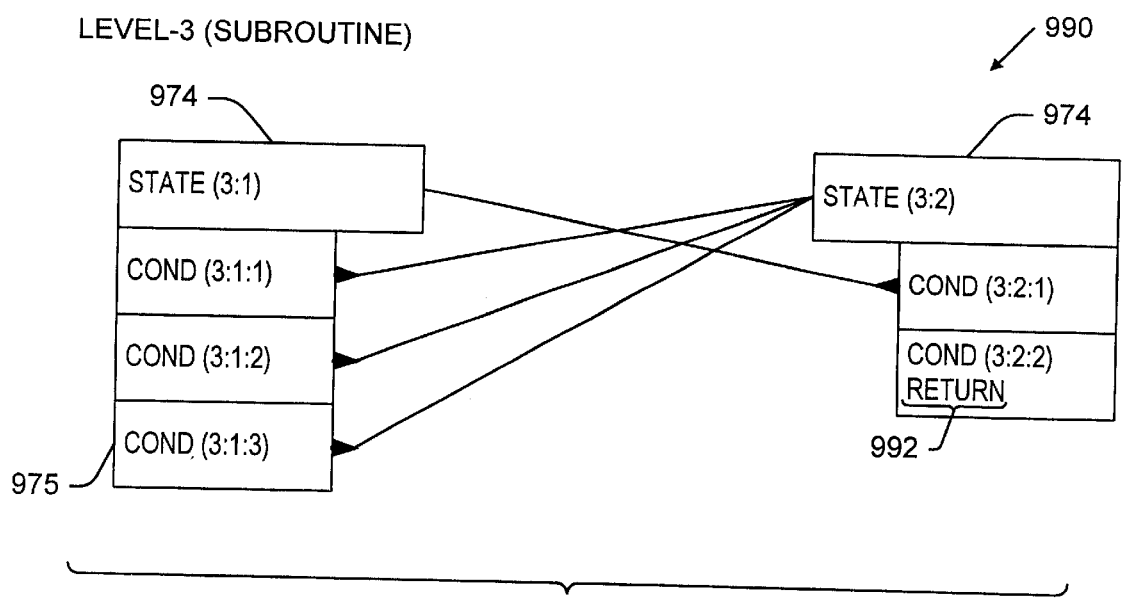
Figure 39:
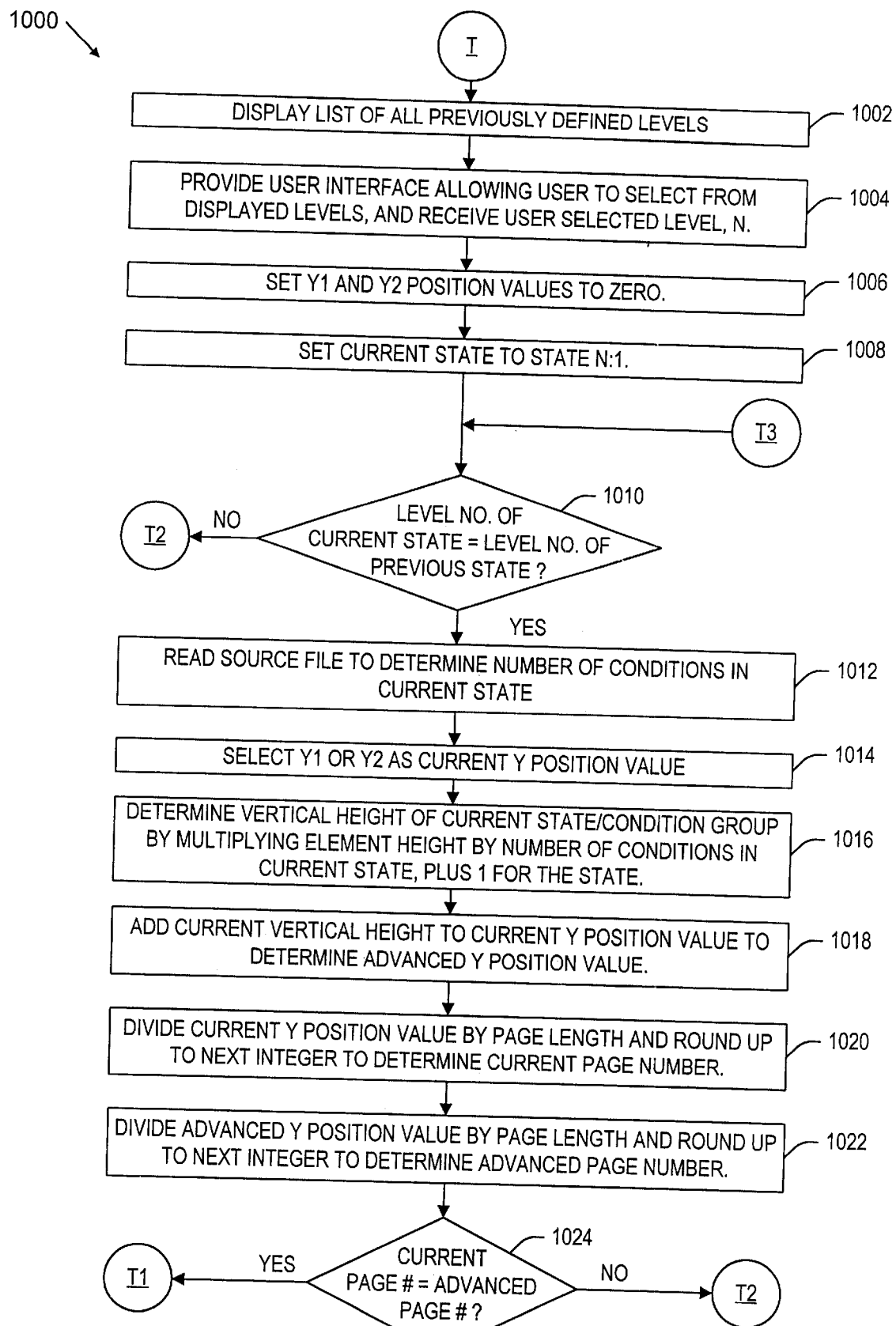
Figure 40:
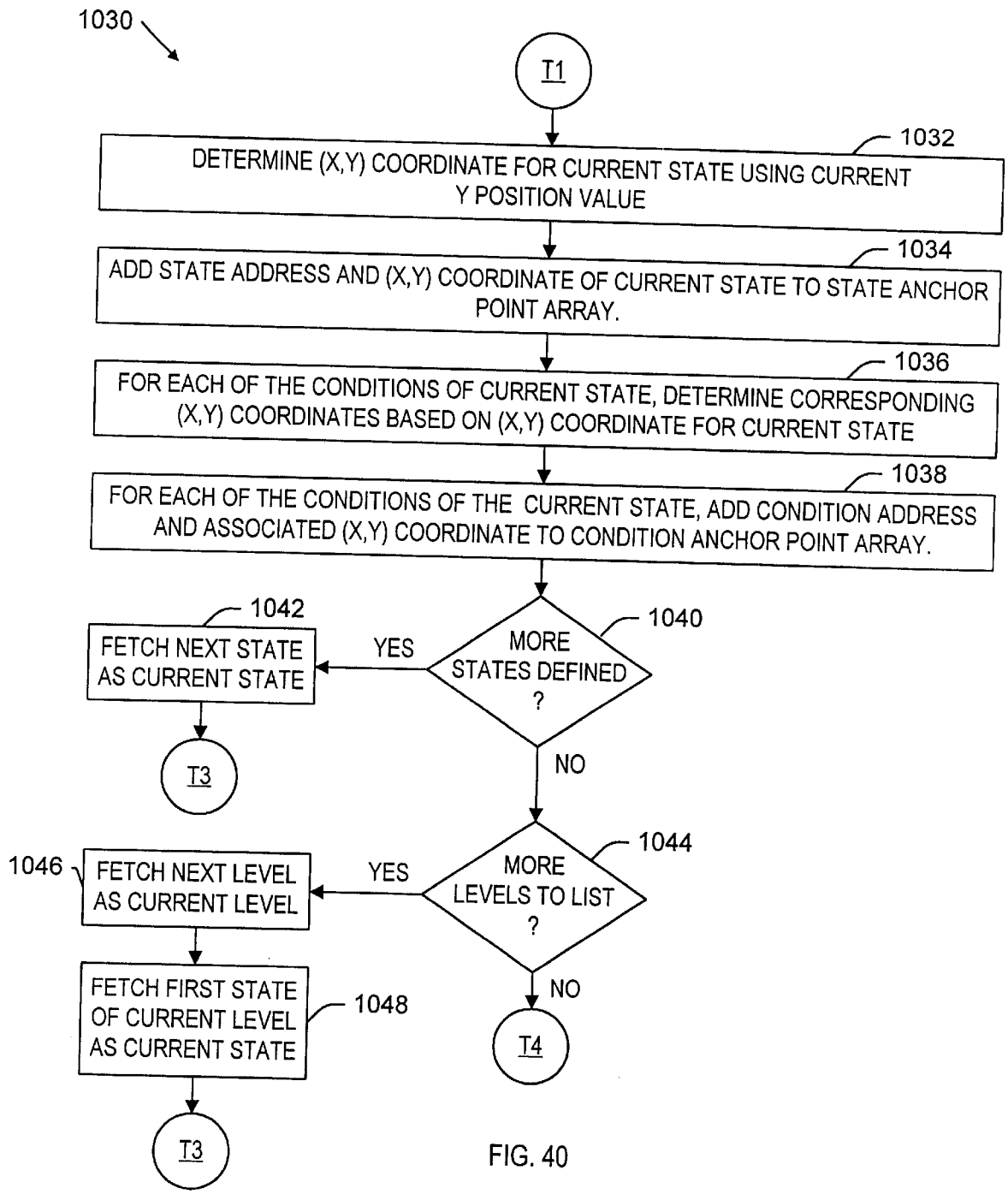
Figure 41:
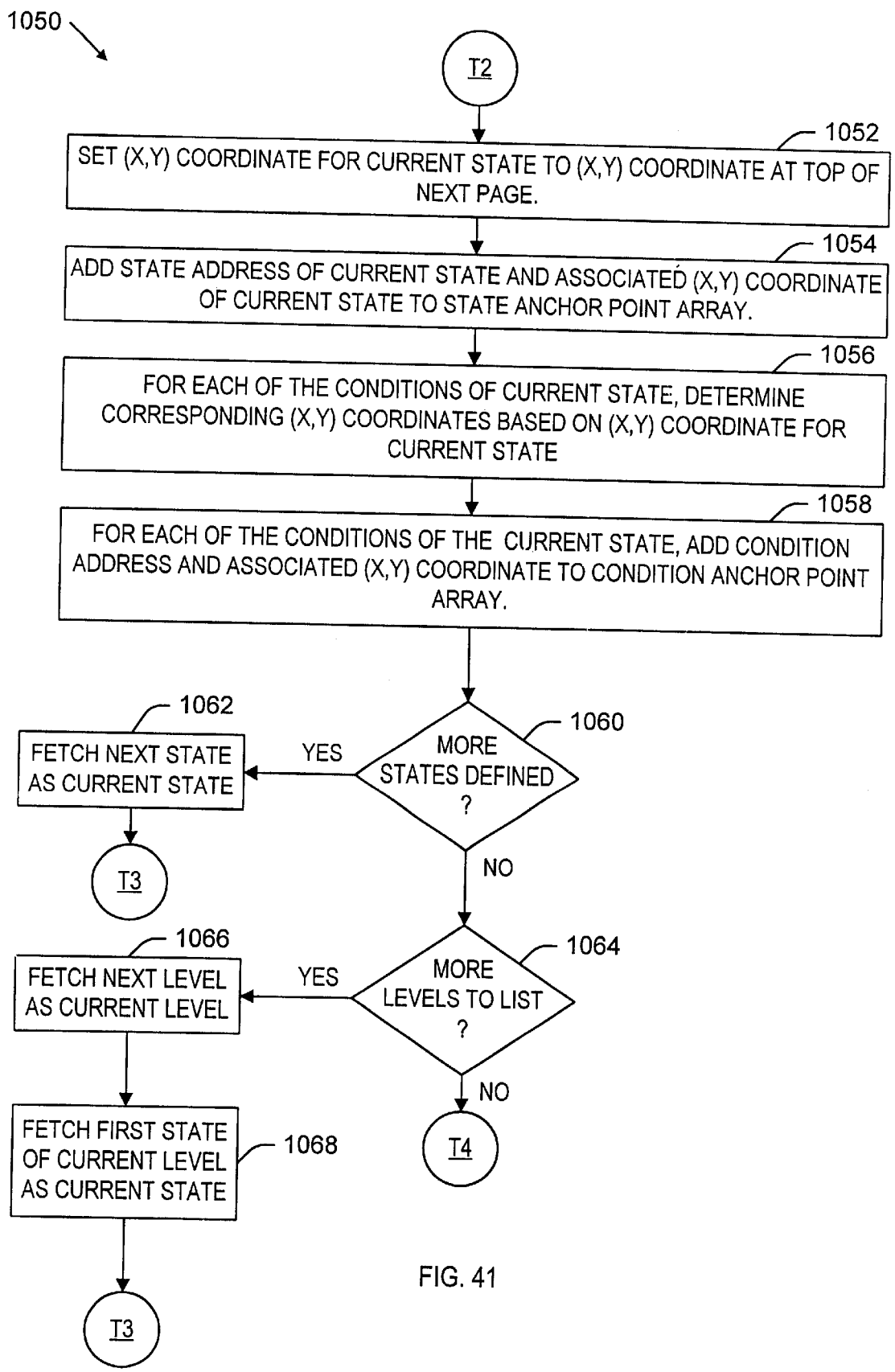

FIGS. 36, 37, and 38 are block diagrams of an exemplary flow chart listing of three program levels of a control program created using the programming system of the present invention;

FIG. 39 is a flow diagram illustrating a process of generating the flow chart listing of FIGS. 36, 37, and 38 in the programming system of the present invention;

FIGS. 39, 40, and 41 are flow diagrams illustrating a first phase of a process of generating the flow chart listing of FIGS. 36, 37, and 38 in the programming system of the present invention, the first phase generating arrays of position coordinates for each program level, state, and condition of a control program;

FIGS. 42, 43, 44, and 45 are flow diagrams illustrating a second phase of the process of generating the flow chart listing of FIGS. 36, 37, and 38 wherein the flow chart listing is rendered using the arrays of position coordinates generated in the first phase;

FIG. 46 is a block diagram of an exemplary cross reference listing generated using the programming system of the present invention; and FIGS. 47–50 show a flow diagrams depicting a process for generating a cross-reference listing.

DETAILED DESCRIPTION OF THE PREFERRED EMBODIMENTS

The present invention provides a programming system and process for configuring a logic control unit (LCU), based on a modified state machine theory, the LCU being configured for use in a distributed process control system. The programming system of the present invention enables programming of an LCU in accordance with a user friendly graphic interface designed for use by or under the supervision of process control engineers who need not be programming experts.

Figure 1:
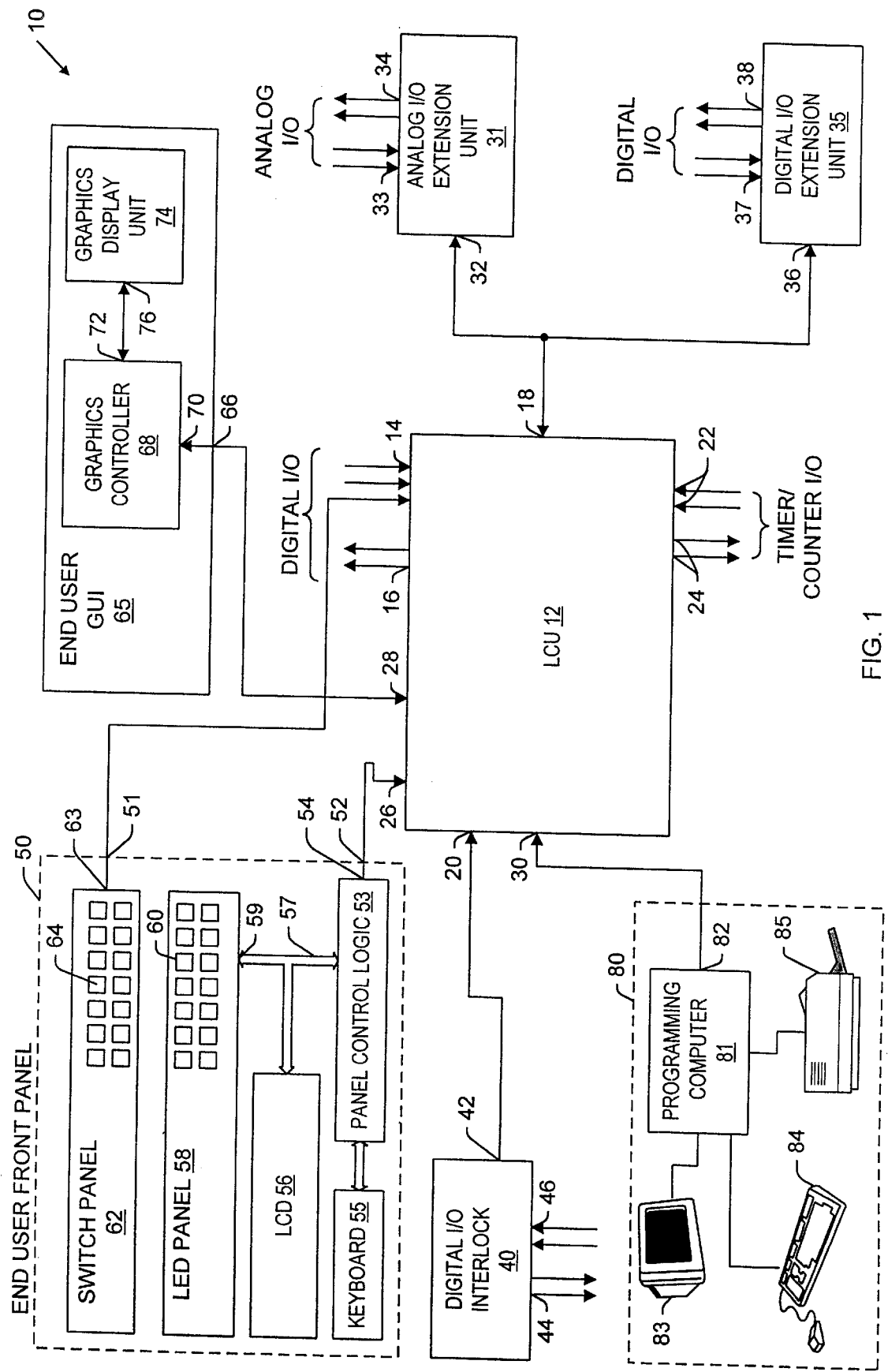
FIG. 1 is a schematic block diagram of a distributed process control system including a logic control unit (LCU) configured by a programming system which executes a programming process in accordance with the present invention.

Referring now to the drawing, FIG. 1 shows a schematic block diagram of a distributed process control system 10 which may be used in practicing the present invention. The system 10 includes a logic control unit (LCU) 12 having; a plurality of digital input ports 14 for receiving digital input signals from a component of a system under control (not shown); a plurality of digital output ports 16 for providing digital output signals to components of the system under control; a serial bus port 18; a digital interlock port 20; a plurality of timer/counter input ports 22; a plurality of timer/counter output ports 24; a front panel port 26; a port 28; and a control program installation port 30.

In a preferred embodiment, each of the digital input ports 14 and each of the digital output ports 16 includes eight bits. Also, in the preferred embodiment, the front panel port 26 and graphics port 29 are both RS232 type serial communication ports, and the LCU 12 includes all hardware required for each RS232 port. Further in the preferred embodiment, the serial bus port 18 is a synchronous serial input/output port. In an embodiment, the LCU 12 may include additional RS232 type ports (not shown) for coupling with additional logic control units or with a network hub.

The depicted control system 10 also includes: an analog input/output extension unit 31 having a port 32 coupled with serial bus port 18 of the LCU 12, a plurality of analog input ports 33 for receiving analog input signals from components of the system under control, and a plurality of analog output ports 34 for providing analog output signals to components of the system under control; and a digital input/output extension unit 35 having a port 36 also coupled with serial bus port 18 of the LCU 12, a plurality of additional digital input ports 37, and a plurality of additional digital output ports 38. The serial bus port 18 of the LCU 12 may provide serial communication with additional extension units such as robotics extension units (not shown), and PID extension units (not shown).

The depicted control system 10 further includes a digital input/output interlock unit 40 having a port 42 coupled with the digital interlock port 20 of the LCU 12, a plurality of digital interlock output ports 44 for providing digital interlock output signals to external equipment of the system under control indicating that the system under control is to be shut down due to an interlock condition, and a plurality of digital interlock input ports 46 for receiving digital interlock input signals from external equipment of the system under control indicating that the system under control is to be shut down due to an interlock condition.

The depicted control system 10 further includes an end user front panel unit 50 having; a port 51 connected with a plurality of the ports 14 of the LCU 12; a port 52 coupled with the front panel port 26 of the LCU; a panel control logic unit 53 having a port 54 connected with the front panel port 26 of the LCU via port 52 of the panel unit 50; a keyboard 55 coupled with the panel processor 53; a liquid crystal display unit (LCD unit) 56 coupled with the panel control logic unit 53 via a bus 57; all LED panel 58 having a port 59 coupled with the panel logic control unit via bus 57, and having, a plurality of light-emitting diodes (LED's) 60; and a switch panel 62 having a port 63 coupled with ports 14 of the LCU 12 via port 51 of the panel unit 50, and having a plurality of switches 64.

The depicted control system 10 further includes: an end user graphical user interface (end user GUI) 65 having a port 66 connected to port 28 of the LCU 12; a graphics controller unit 68 having a port 70 coupled for communication with port 28 of the LCU via port 66 of the end user GUI and a port 72; and a graphics display unit 74 having a port 76 coupled to port 72 of the graphics controller unit 68.

The end user front panel 50 provides an interface between an end user and the distributed process control system 10 during execution of a control program by the LCU 12. Each of the LED's 60 of the end user front panel 50 is individually addressable by the LCU 12 via the panel control logic unit 53 which is responsive to signals received via the RS232 communication channel coupled with the front panel port 26 of the LCU. The LCU 12 provides front panel LED output signals to the panel control logic unit 53, the signals carrying information indicating which of the LED's 6O are to he activated. For example, a front panel LED output signal may be used to carry information instructing the panel control logic unit 53 to activate a particular one of the LED's 60 to indicate to the end user that a pressure value has exceeded a threshold.

The switches 64 of the end user front panel provide front panel switch signals to particular digital inputs 14 of the LCU, the front panel switch signals carrying information indicative of which switches 64 are ON and which are OFF. For example, a front panel switch signal may be used to carry information indicating that a particular one of the switches 64 has been activated by the end user in order to decrease a pressure value.

In the preferred embodiment, the LED panel 58 includes 128 individually addressable LED's 60, and the switch panel 62 includes 4 rows of 40 switches 64. In the depicted embodiment, the analog input/output extension unit 31 and digital input/output extension unit 35 are non-intelligent cards. However, in an alternative embodiment, the extension units 31 and 35 may include additional processing capability and additional memory capacity.

In the preferred embodiment, the control system 10 further includes a programming computer system 80 for executing a programming process according to the present invention for configuring the LCU 12. The programming system 80, which may be a personal computer, work station, or other suitable computer, includes: a port 82 coupled with the programming port 32 of the LCU 12. a computer processing and memory unit 81, a display unit 83 coupled with the computer, an interlace device 84 such as a keyboard or mouse coupled with the computer, and a printer 85. As further explained below, the programming process according to the present invention provides a graphical user interface which allows the end user, usually a process engineer, to generate internal files including data and instructions for controlling a system based on a modified state machine theory. The internal files are compiled to generate a control program for uploading to the LCU 12 via a sequence of steps including compiling, data conversion, and loading as further explained below.

In varying embodiments, the programming process of the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the invention with appropriate standard computer hardware to execute the code contained therein. An apparatus for practicing the invention could be one or more computers and storage systems, such as the programming system 80, containing or having network access to computer program(s) coded in accordance with the present invention.

The end user GUI 65 displays the values of variables created by the programming process in a graphic form. The variables carry control information associated with analog and digital input/output signals, and various control program parameters. Each variable includes an access right field indicating whether or not the associated data field of the corresponding variable is accessible from the end user GUI 65 as a read only (RO) type value or as a read/write (R/W) type value. As further explained below, the access right value stored in the access right field of each variable is initially assigned when defining and editing the variable in the programming process. Also, in accordance with the programming process of the present invention, the access right value may be varied depending on the present state of the system under test during execution of the control program. The programming process provides for generating program listings including each variable and its associated access rights for use by the end user.

Figure 2:
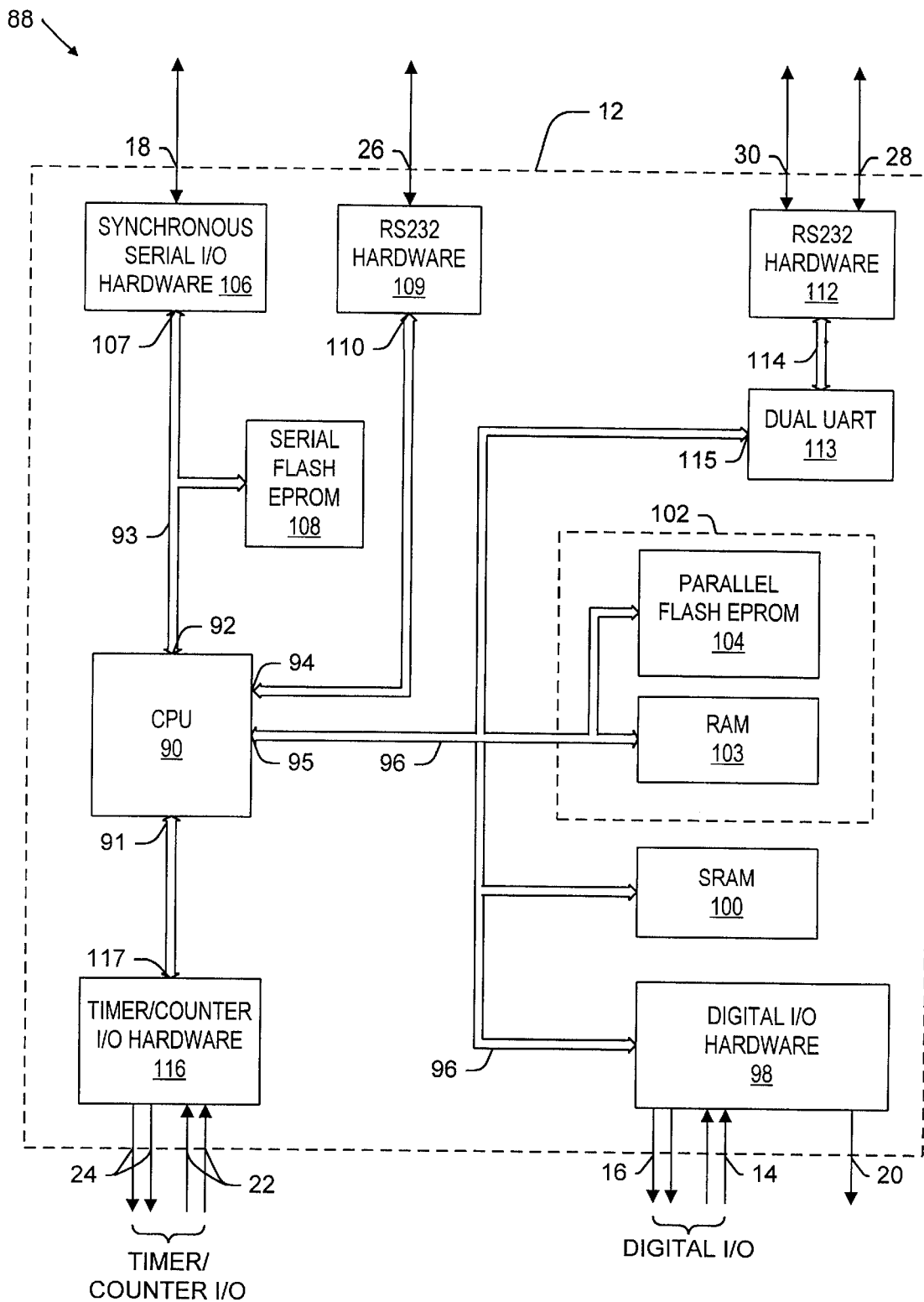
FIG. 2 is a schematic block diagram of a universal controller (UCB) which is a preferred embodiment of the LCU of FIG. 1.

FIG. 2 shows a schematic block diagram of a preferred embodiment of the LCU 12 (FIG. 1) formed by a universal controller board (UCB) 88 including: a central processing unit (CPU) 90 having a first port 91, a second port 92 coupled with a serial bus 93, a third port 94, and a fourth port 95 coupled with a bus 96; a digital I/O hardware unit 98 coupled with the bus 96, and having a plurality of inputs coupled to receive digital input signals via digital input ports 14 of the LCU 12, a plurality of outputs coupled to provide the digital output signals via the digital output ports 16 of the LCU 12, and a plurality of digital interlock terminals coupled to provide digital interlock signals via the digital interlock port 20 of the LCU 12; a static RAM (SRAM) 100 coupled for communication via the bus 96; a memory card 102 having a RAM 103 and a parallel flash EPROM 104 each being coupled for communication via the bus 96; a synchronous serial I/O hardware unit 106 having a port 107 coupled for communication with the CPU 90 via the serial bus 93, and having a port coupled for communication with the extension units 31 and 35 (FIG. 1) via the serial bus port 18; a serial flash EPROM 108 coupled for communication with the synchronous serial I/O hardware unit 106 and the CPU 90 via the serial bus 93; a first RS232 hardware unit 109 having a port 110 coupled for communication with the third port 94 of the CPU 90, and having a port coupled for communication with the panel control logic unit 53 of the end user front panel 50 (FIG. 1) via the front panel port 26 of the LCU 12; a second RS232 hardware unit 112 coupled for communication with a dual universal asynchronous receiver/transmitter hardware unit (dual UART hardware unit) 113 via a bus 114, a first port coupled for communication with the programming computer system 80 (FIG. 1) via the installation port 30 of the LCU 12, and a second port coupled for communication with the end user GUI 65 (FIG. 1) via the graphics port 28 of the LCU 12. The dual UART 113 has a port 115 coupled for communication with the bus 96 (FIG. 19) and provides communication between the RS232 ports 28 and 30 and the bus 96.

The parallel flash EPROM 104 is used for storing software including: an operating system kernel; I/O device drivers for interfacing with external devices of the system under control providing and receiving I/O signals; and an interpreter for translating and executing instructions and data of the control program. The serial flash EPROM 108 is used for storing configuration data as further explained below. The SRAM 100 provides a working read/write memory for the UCB.

During the course of developing a control program for execution by the UCB 88 to control a specified process, it may be necessary for the user of the programming process to reconfigure the UCB by overwriting a previously stored control program. During execution of the control program by the UCB. the end user typically observes the calibration of various components (e.g., a transducer) which transmit and receive I/O signals to and from the LCU 12 (FIG. 1). Also, the end user may wish to modify certain parameters of components of the system under control, as further explained below, in order to calibrate the control system. For example, each analog input signal received from a device (not shown) via one of the analog input ports (FIG. 1) has a range of signal program level values defined by a minimum device value and a maximum device value included within the driver software. As further explained below, in the programming process of the present invention, when defining an analog input variable associated with a corresponding analog input signal, an initial value may be assigned for an engineering unit low and an engineering unit high values which correspond with the device low values and device high values, respectively. The end user GUI 65 (FIG. 1) or the end user front panel 50 may be used to change the engineering unit low value or engineering unit high value subsequent to uploading the control program to the UCB. Later, when a revised control program is uploaded to the UCB it is desirable that the operator-adjusted engineering unit low value or engineering unit high value not be overwritten. Therefore, in accordance with the programming process of the present invention, some parameters of the control program are defined as configuration data. Configuration data may only be overwritten during uploading of a revised control program if an option to do so is selected. Configuration data is maintained in the EPROM 100 separate from other data and instructions of the control program.

Figure 3A:
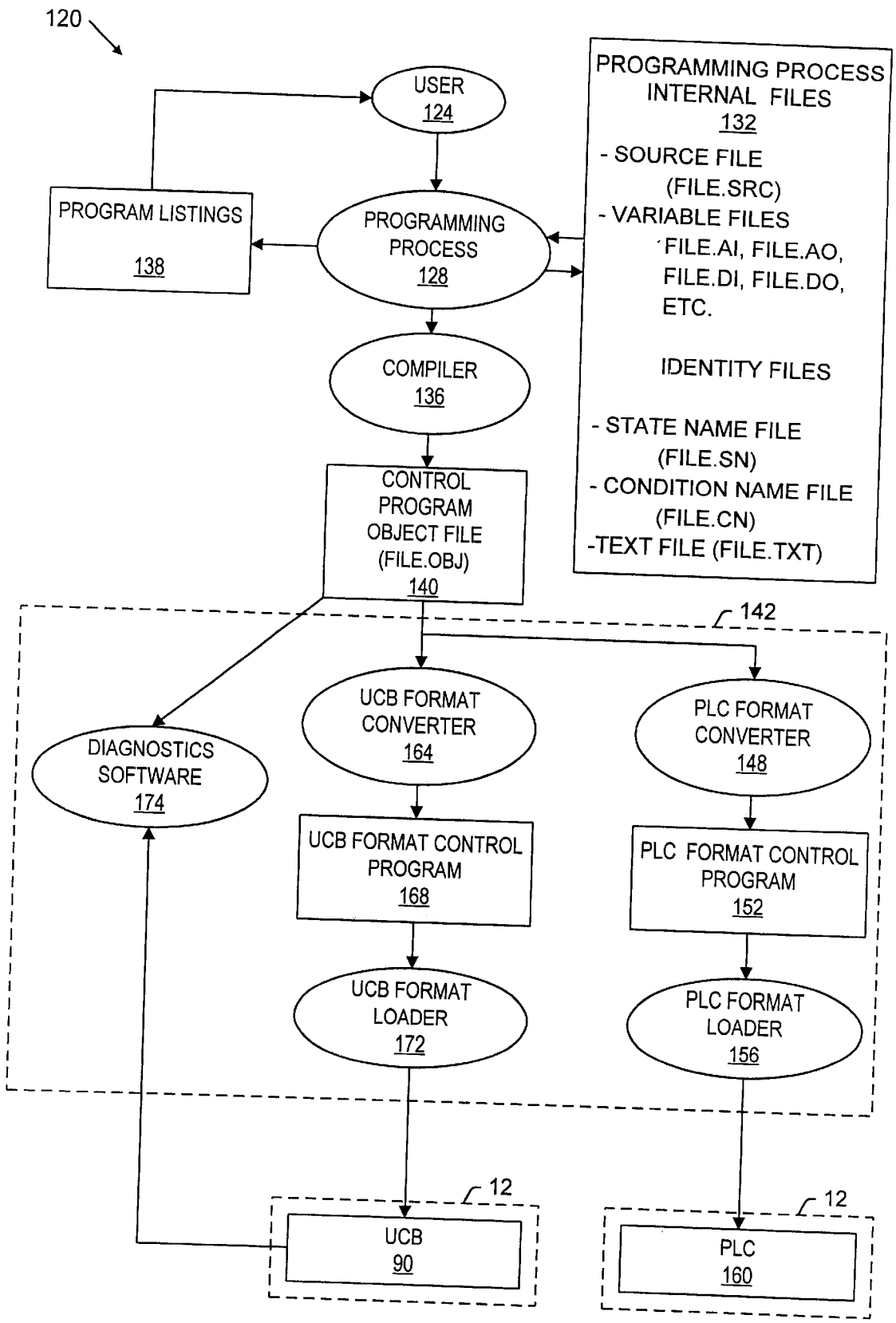
FIG. 3A is a logical flow diagram generally illustrating functional relationships between modules of the programming process of the present invention which is used to generate and upload a user specified control program into the LCU of FIG. 1.

FIG 3A shows a logical flow diagram at 120 generally illustrating a process of configuring the LCU 12 (FIG. 1) according to the present invention. Configuration of the LCU 12 is specified by a user 124 who creates a control program using a graphical user interface of a programming process 128 implemented on the programming system 80 (FIG. 1). As further explained below, the programming process 128 of the present invention allows the user 124 to design a control program in terms of program levels, states and conditions based on a modified state machine theory. The interface of the programming process 128 is used to create internal files 132 including: a source file having source code defining a control program; variable files having information defining all variables used in the programming process as further explained below; an identity file; a state name file; a condition name file; and a text file.

In the preferred embodiment, the programming process is implemented in C language. As will be readily apparent to those skilled in the art of computer programming, the programming process may be implemented in a variety of other programming languages including C++, assembly language, or any other suitable programming language. The programming process 128 uses the internal files 132 to generate program listings 138 in accordance with the present invention which may be easily read and understood by an applications engineer who provides the specifications of the control program. As further explained below, the program listings 138 enable a dramatic reduction in the time required to configure a logic control unit.

The programming process 128 provides source code from the internal files 132 to a compiler 136 which compiles the source code to create a control program object file 140. The identity files, state name file, condition name file, and text file of the internal files 132 are not compiled and are not included in the object file 140.

An uploading module 142 provides conversion and uploading of the object file 140 to the LCU 12 (FIG. 1). For a control system using a programmable logic controller (PLC), the object file 140 is converted by a PLC format data converter 148 from the format of the programming system 80 (FIG. 1) (e.g., PC format) to a PLC format control program 152 which is then loaded by a PLC format loader 156 to a PLC 160 implementing the LCU 12. For a logic control system using the preferred UCB 88 (FIG. 2) according to the present invention, the object file 140 is converted by a UCB. format converter module 164 from the format of the programming system to a UCB format control program 168 which is loaded by a UCB format loader module 172 to the UCB 88 implementing the LCU 12. It will be apparent to those skilled in the art that the functions of data format conversion and uploading may be implemented in the present invention in accordance with any of a variety of well known methods. The uploading module 142 further includes diagnostic software 174 for simulating the control program and determining problems associated therewith.

Figure 3B:
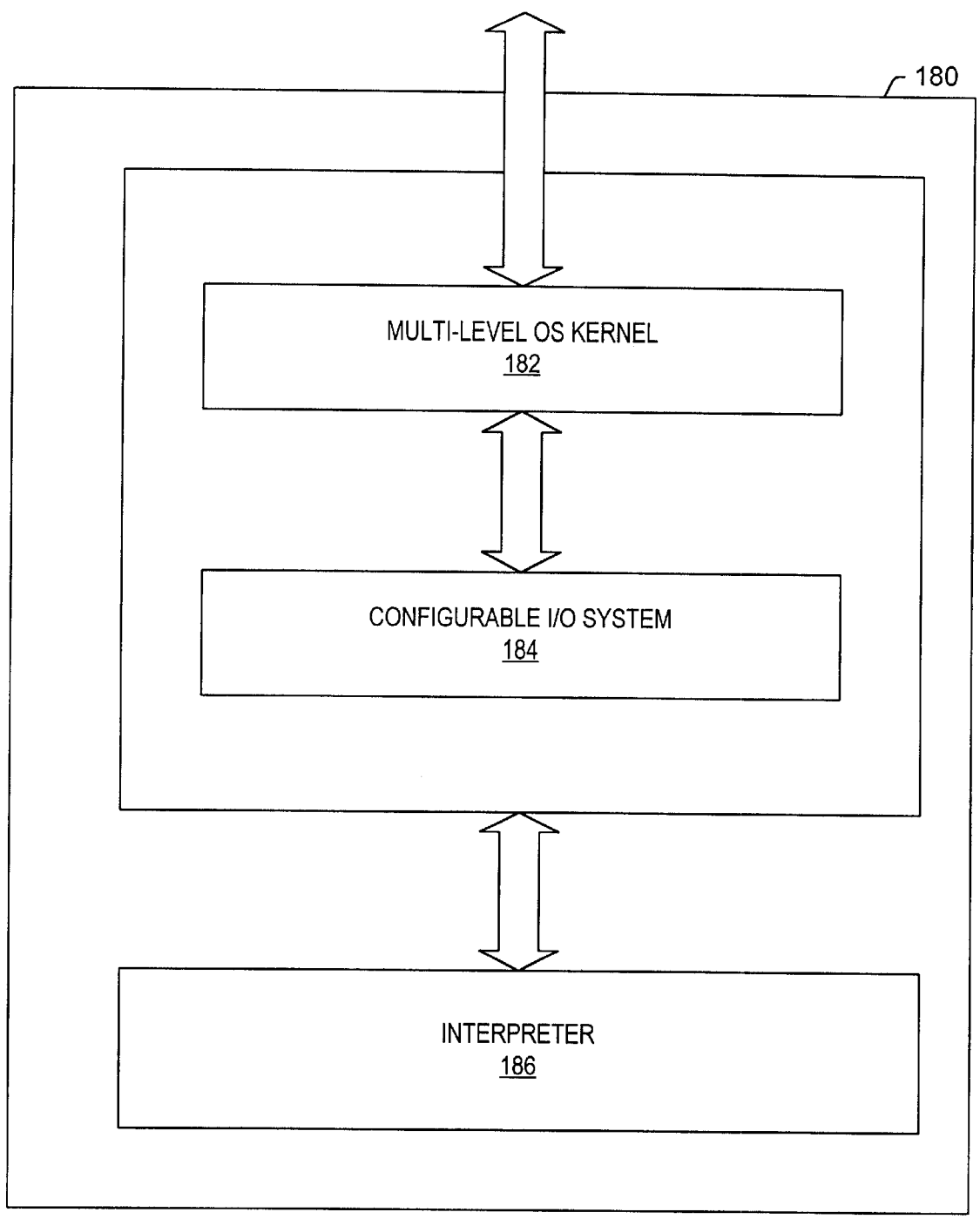

FIG. 3B shows a functional block diagram generally illustrating modules of controller software 180 for receiving, interpreting, and executing a control program generated in accordance with the present invention. The control software 180 is stored in the parallel flash EPROM unit 98 (FIG. 2) and executed by the CPU 90 of the UCB of FIG. 2. The controller software 180 includes a multitasking operating system kernel (OS kernel) 182, a configurable I/O system 184, an interpreter 186.

The OS kernel 182 receives data and instructions of the control program from the parallel flash EPROM unit 98 (FIG. 2) and passes the data and instructions to the interpreter 186 which translates and then executes the instructions of the control program one at a time. The OS kernel 182 and interpreter 186 are stored in the parallel flash EPROM 104 (FIG. 3A). The configurable I/O system 184 includes a plurality of I/O drivers.

Creating and Editing Variables

Variables used in the programming process of the present invention may be classified as input/output device variables (I/O device variables), memory location variables, and timer variables. The I/O device variables include analog input variables, analog output variables, digital input variables, digital output variables, front panel LED variables, and front panel switch variables. The memory location variables include program variables and digital variables. As further explained below, each of the variables includes an identification field used in the programing process for storing ID values which uniquely identify the corresponding variable, and which specify a type of an associated data field to be allocated by the LCU 12 (FIG. 1) during execution of the formatted control program by the LCU 12 (FIG. 1), the type of the data field being appropriate for storing a data value associated with the corresponding variable.

Variables may be classified by the types of data fields to be allocated by the LCU for the different variables. Digital value type variables include digital input variables, digital output variables, panel switch variables, and panel LED variables. Float value type variables include analog input variables, analog output variables, and program variables. Long value type variables include timer variables. A digital value type data field is allocated by the LCU 12 (FIG. 1) for each of the digital value type variables. In the preferred embodiment of the present invention, eight bits are allocated by the LCU for each digital value type data field. A floating point value data field is allocated by the LCU 12 (FIG. 1) for each of the float value type variables. A long value type data field is allocated by the LCU 12 (FIG. 1) for each of the long value type variables. As further described below, the programming process uses count values stored in the variable files of the internal files 132 (FIG. 3) to assign the identity values to the variables. A digital type variable count value, stored in the variable files of the internal files, is increased each time a new digital type variable is created by the user. A float type variable count value, stored in the variable files of the internal files, is increased each time a new float type variable is created by the user. A long variable count value, stored in the variable files of the internal files, is increased each time a new long type variable is created by the user.

Figure 4A:
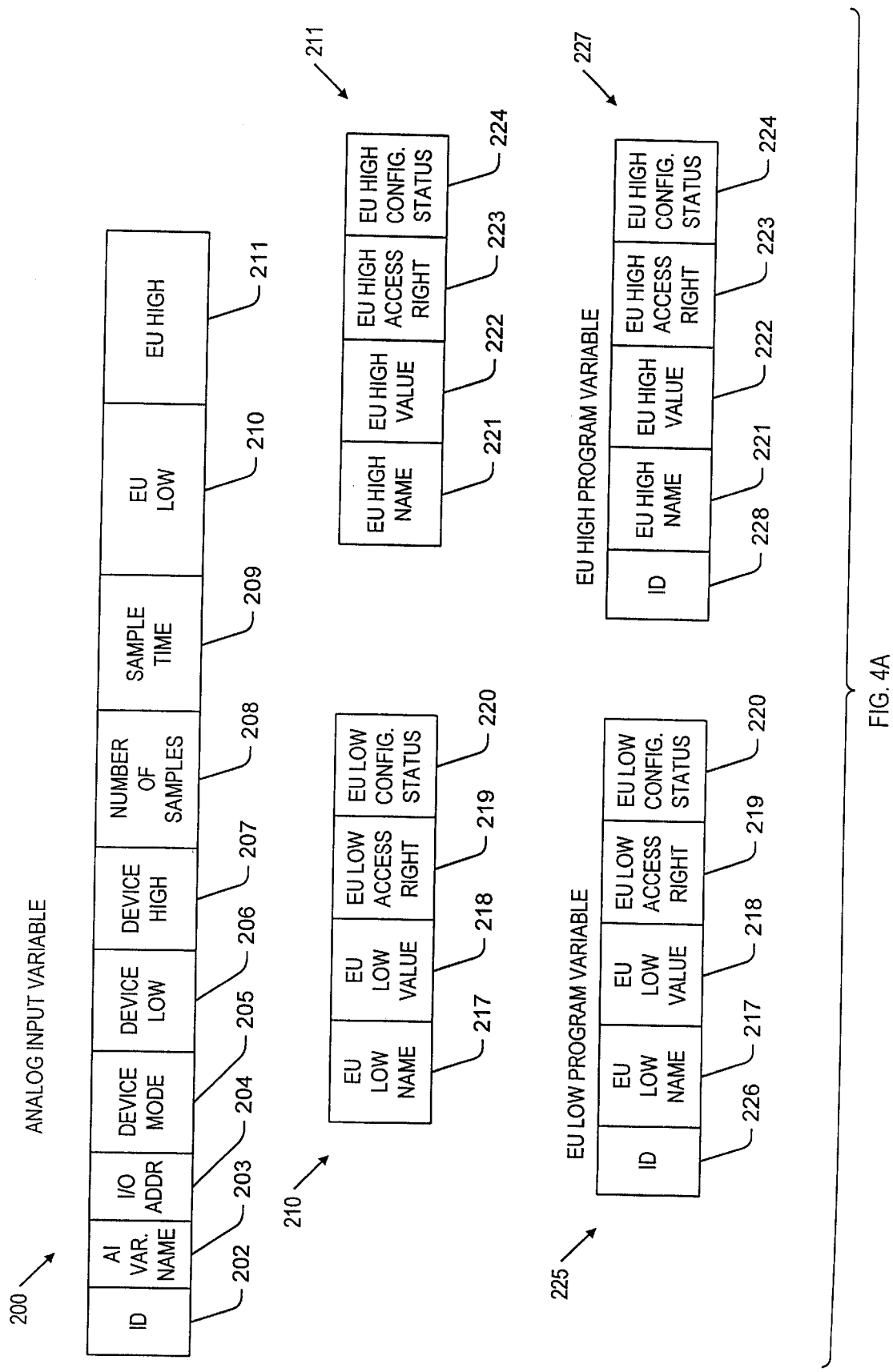

FIG. 4A shows a block diagram at 200 illustrating fields of an analog input variable used in the programming process of the present invention, the fields including: an identity field (ID field) 202 for receiving an ID value automatically assigned by the programming process, the ID value for uniquely identifying the corresponding analog input variable and also for specifying the length of an associated analog input data field (not shown) to be allocated by the LCU 12 (FIG. 1) for receiving a sampled value derived from a corresponding one of the analog input signals received at input ports 36 (FIG. 1) of the LCU; an analog input variable name field 203 for receiving a user-specified string of characters descriptive of the source of, or information carried by, the corresponding analog input signal; an input/output address field 204 for receiving a user-specified value indicative of a particular one of the analog input ports 36 (FIG. 1) of the analog I/O extension unit 33 (FIG. 1) at which the corresponding analog input signal is received; a device voltage/current mode field 205 for receiving a user-specified mode value indicative of whether the corresponding analog input signal is to be sensed by the logic control unit 12 (FIG. 1) in a voltage mode or in a current mode; a device low value field 206 for receiving a user-specified device low value indicative of a minimum voltage or current value (as specified by the corresponding mode value stored in the device mode field 205) of the corresponding analog input signal; and a device high value field 207 for receiving a user-specified device low value indicative of a maximum voltage or current value (as specified by the corresponding mode value) of the corresponding analog input signal. The values entered into the device low and high value fields 206 and 207 need not be passed to the UCB because the device drivers stored in the memory of the UCB includes device low and high values. However, user specified values stored in the device low and high value fields 206 and 207 are used in generating program listings as further explained below.

Fields of the analogy input variable illustrated at 200 also include a sample number field 208 for receiving a user specified sample number value, and a sample time field 209 for receiving a user specified sample time value. The sample number value and sample time value are used in a software implemented filtering scheme of the present invention for filtering noise disturbances in the corresponding analog input signal which may arise due to any of a wide variety of electrical and mechanical effects in the distributed process control system 10 (FIG. 1). The sample number value and sample time value specify a required number of consecutive samples during the specified sample time for which the corresponding analog input signal must have a signal program level within a predefined threshold in order to be considered as having settled. The threshold value is determined taking into account the manufacturer specifications of the device providing the analog input signal.

Fields of the analog input variable illustrated at 200 further include an engineering unit low field (EU LO field)

210, and an engineering unit high field (EU HI field) 211. The EU LO field 210 has a plurality of sub-fields including an EU low name field 217, an EU low value field 218, an EU low access right field 219, and an EU low configuration status field 220.

The EU HI field 211 has a plurality of sub-fields including an EU high name field 221, an EU high value field 222, an EU high access right field 223, and an EU high configuration status field 224. The EU low and EU high name fields 217 and 221 each receive a user-specified string of descriptive of an absolute minimum value and an absolute maximum value respectively of an allowable range of unit values carried by the corresponding analog input signal.

The sub-fields 217, 218, 219, and 220 of the EU low field 210 are used by the programming process of the present invention, as further explained below, to automatically create an EU low program variable 225 which is distinct from the analog input variable 200. The EU low program variable 225 includes: an ID field 226 for receiving a unique ID value which uniquely identities the EU low program variable 225; and the EU low sub-fields 217, 218, 219, and 220. Likewise, the sub-fields 221, 222, 223, and 224 of the EU high field 211 are used by the programming process of the present invention as further explained below, to create an EU high program variable 227 which is also distinct from the analog input variable 200 and EU low program variable 225. The EU high program variable 227 includes: an ID field 228 for receiving a program generated ID value which uniquely identifies that the EU high program variable 227; and the EU high sub-fields 221, 222, 223, and 224.

The low value field 218 receives a user-specified absolute minimum value expressed in appropriate engineering units (e.g., psi), which corresponds with the device low value entered in the device low field 206. The EU low access right field 219 carries a value indicative of whether the EU LO program variable 225 may be accessed as a read only value or as a read/write value by the end user GUI 65 (FIG. 1). The EU low configuration status field 220 carries a value indicative of whether the EU low program variable 225 is to be stored in the configuration data base in the serial flash EPROM unit 100 (FIG. 2) of the UCB, or in the main data base in the parallel flash EPROM unit 98 (FIG. 2). when the control program object file 140 (FIG. 3) is installed into the UCB 88.

The EU high value field 222 receives a user-specified absolute maximum value, indicative of a value expressed in appropriate units, which corresponds with the device high value entered in the device high field 207. The EU high access right field 223 receives a user-specified value indicative of whether the EU high program variable 227 may be accessed as a read only value or as a read/write value by the end user GUI 65 (FIG. 1). The EU high configuration status field 224 receives a user-specified value indicative of whether the EU high program variable 227 is to be stored in the configuration data base in the serial flash EPROM unit 100 (FIG. 2) of the UCB, or in the main data base in the parallel flash EPROM unit 98 (FIG. 2), when the control program object file 140 (FIG. 3) is installed into the UCB 88.

As all example, an analog input variable 200 may be used in the programming process of the present invention to represent an analog input signal provided by a pressure transducer (not shown) and received at one of the analog input ports 36 (FIG. 1) of the analog I/O extension unit of the LCU, 12 (FIG. 1). The analog input signal provided by the pressure transducer may have a range of 0 to 20 volts which represents pressure variations in a range between 5 and 100 psi. In this example; the device mode field 205 carries a value indicative of "voltage"; the low and device high fields 206, 207 carry values indicative of 0 and 20 volts respectively; the EU high and low names carried in fields 215 and 220 may be "psi", and the EU high and low values carried in fields 218 and 222 will be set to 5 and 100 respectively by the user of the programming process of the present invention. The EU high and low fields are passed to the UCB.

As further described below, the above described values for fields 203–211 are user specified in accordance with the programming process of the present invention. In the preferred embodiment, the analog input ID value specifies a length for an associated analog input data field (to be allocated by the LCU 12 of FIG. 1), which is adequate for storing a floating point number. The ID values stored in the ID fields 202 of the analog input variables are automatically assigned by the programming process which increases the float type variable counter value, stored in the corresponding identity files of the internal 132 (FIG. 3), each time a new float type variable is created by the user. As mentioned above, float type variables include analog input variables, analog output variables, and program variables.

As explained in further detail below, the fields 202, 204–209, 218–220, and 222–224 are all passed from the programming system 80 (FIG. 1) to the logic control unit 12 (FIG. 1) upon installation of the control program to the logic control unit 12. However, as is generally the case for all variables used in the programming process of the present invention, name fields (including fields 203, 217, and 221 for the depicted analog input variable) are not passed to the to the logic control unit. Also, the device low field and device high field are not passed to the to the logic control unit because, as mentioned above, the device low and device high values are included in the I/O drivers.

Figure 4B:
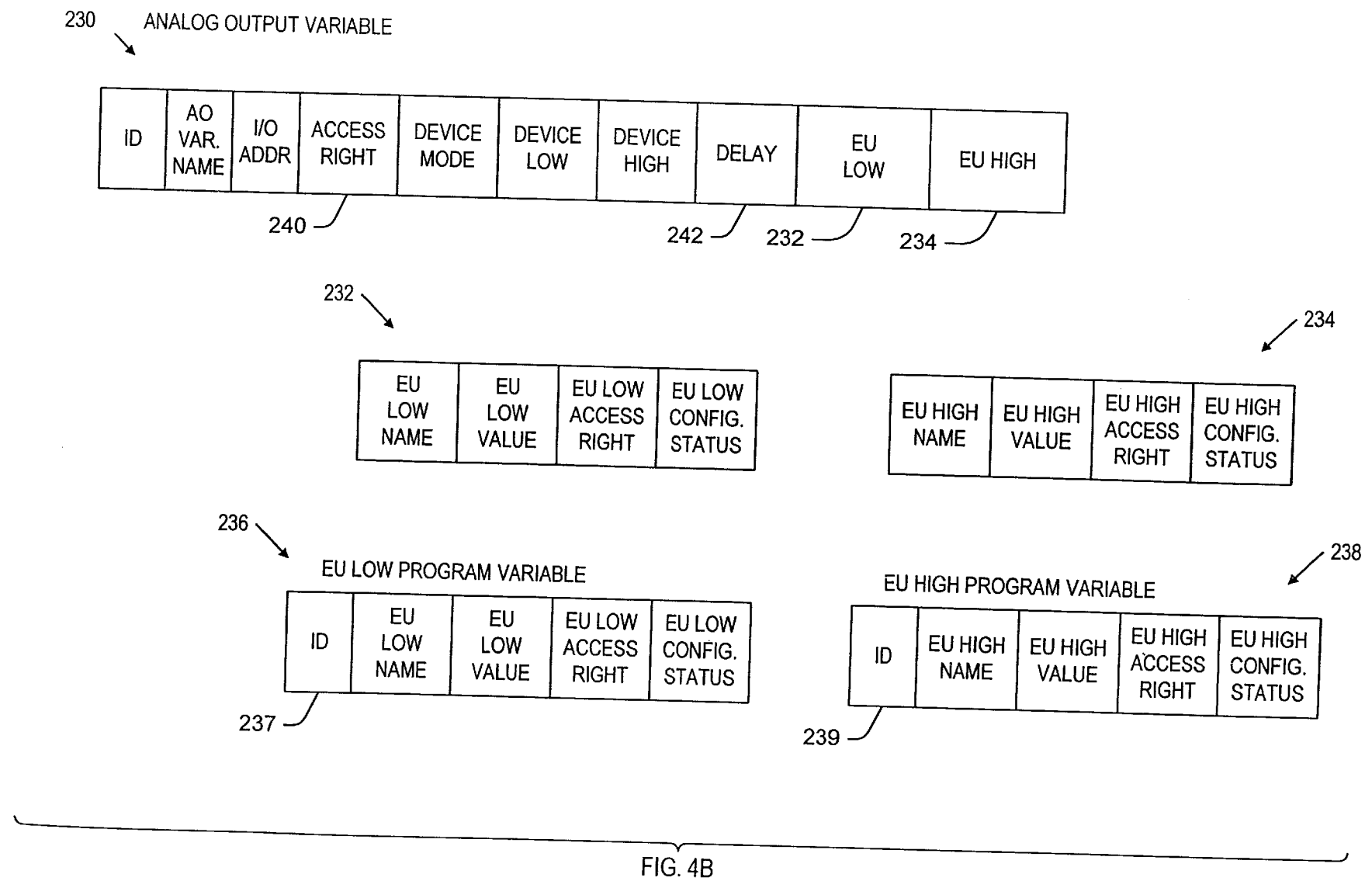

FIG. 4B shows a block diagram at 230 illustrating fields of an analog output variable used in the programming process of the present invention. Analog output variables are used to generate the analog output signals provided at each of the plurality of analog output ports 38 (FIG. 1) of the analog I/O extension board. The depicted analog output variable is similar to the analog input variable at 200 (FIG. 4A) in that fields of the analog output variable also include: an ID field for receiving an AO identity value automatically assigned by the programming process, the AO identity value for uniquely identifying the corresponding analog output variable and also for specifying the length of an associated analog output data field (not shown) to be allocated by the LCU 12 (FIG. 1) for receiving analog output values used in generating a corresponding one of the analog output signals provided at ports 38 (FIG. 1) of the LCU; an analog output variable name field for receiving a user-specified string of characters descriptive of information carried by the corresponding analog output signal; an input/output address field for receiving a user-specified value indicative of the particular one of the analog output ports 38 (FIG. 1) of the analog I/O extension unit 33 (FIG. 1) from which the corresponding analog output signal is provided; a device voltage/current mode field for receiving a user-specified mode value indicative of whether the corresponding analog output signal is to be controlled by the logic control unit 12 (FIG. 1) in a voltage mode or in a current mode; a device low field for receiving a user-specified device low value indicative of a minimum voltage or current value (as specified by the corresponding mode value stored in the device mode field 205) of the corresponding analog output signal; and a device high field for receiving a user-specified device low value indicative of a maximum voltage or current value (as specified by the corresponding mode value) of the corresponding analog output signal.

In the preferred embodiment, the analog output identity value specifies a length for the associated analog output data field (to be allocated by the LCU of FIG. 1) which is adequate for storing a floating point number. The depicted analog output variable 230 is also similar to the analog input variable 200 (FIG. 4A) in that the analog output variable 230 further includes: an engineering unit low field (EU low field) 232 having an EU low name sub-field, an EU low value sub-field, an EU low access right sub-field, and an EU low configuration status sub-field; and an engineering unit high field (EU high field) 240 having an EU high name sub-field, an EU high value subfield, an EU high access right sub-field, and an EU high configuration status sub-field.

The sub-fields of the EU low field 232 are used in the programming process of the present invention, as further explained below, to automatically create an EU low program variable 236 which is associated with but distinct from the analog output variable 230. The EU low program variable 236 includes an ID field 237 for receiving a unique ID value which uniquely identifies the EU low program variable 236, and the EU low sub-fields. Likewise, the sub-fields of the EU high field 234 are used in the programming process of the present invention as further explained below, to create an EU high program variable 238 which is also associated with but distinct from the analog output variable 230. The EU high program variable 238 includes: an ID field 239 for receiving a program generated ID value which uniquely identifies that the EU high program variable 238; and the EU high sub-fields.

However, unlike the analog input variable 200 (FIG. 4A), the depicted analog output variable does not include a sample number field or a sample time field. Additionally, the depicted analog output variable has an access right field 240 and a delay field 242, neither of which is included in the analog input variable. The access right field 240 of the analog output variable 230 receives a user-specified value indicative of whether the analog output variable may be accessed as a read only value or as a read/write value from the end user GUI 65 (FIG. 1) during execution of the control program. The delay filed 242 receives a user specified delay time value indicative of a delay time required for an external component of the system under test to be responsive to the corresponding analog output signal.

In the same manner as for the analog input variable at 200 (FIG. 4A), all of the depicted fields of the analog output variable except the name fields are passed to the LCU 12 (FIG. 1). Note that the analog input variable 200 (FIG. 4A) does not include an access right field. Access to analogy input variables from the end user GUI 65 (FIG. 1) defaults to read only, and therefore read/write access to the analog input variables from the end user GUI 65 (FIG. 1) is not allowed during execution of the control program.

FIGS. 4C shows a block diagram at 246 illustrating fields of a digital input variable used in the programming process of the present invention, the fields including: an identity field (ID field) for receiving a digital input identity value for uniquely identifying the corresponding digital input variable 246, and also for specifying the length of an associated digital input data field to be allocated try the LCU 12 (FIG. 1) for storing values derived from a corresponding one of the digital input signals received at the digital input ports 14 and 37 of the LCU; a digital input variable name field for receiving a user-specified string of characters descriptive of the source of, or information carried by the corresponding digital input signal received at a corresponding one of the plurality of digital input ports 14 (FIG. 1) of the logic control unit; and an input/output address field for receiving a user-specified value indicative of a particular one of the digital input ports 14 (FIG. 1) of the LCU 12 at which the corresponding digital input signal is received.

The fields of the digital input variable at 246 further include: an ON state logic program level field 248 for receiving a user specified value indicative of a logic program level corresponding to an ON state for the source device (not shown) from which the corresponding digital input signal is received; a sample number field 250 for receiving a user specified sample number value; and a sample time field 252 for receiving a user specified sample time value. The sample number value and sample time value are used in a software implemented debouncing scheme of the present invention which provides debouncing of the corresponding digital input signal which may arise due to any of a wide variety of electrical and mechanical effects in the distributed process control system 10 (FIG. 1). The sample number value and sample time value specify a required number of consecutive values sampled during the specified sample time for which the corresponding digital input signal must be above or below the ON state logic program level value before a transition of the logic value of the digital input signal is determined to have occurred. Note that the digital input variable 246 does not include an access right field. Access to input variables from the end user GUI 65 (FIG. 1) defaults to read only, and therefore read/write access to the digital input variable 246 from the end user GUI 65 (FIG. 1) is not provided during execution of the control process.

In the preferred embodiment, the digital input identity value carried in the ID field of the digital input variable 246 specifies a length for the associated digital input data field (to be allocated in the ECU 12 of FIG. 1), which is adequate for storing a bit value.

FIG. 4D shows a block diagram at 254 illustrating fields of a digital output variable used in the programming process of the present invention, the fields including: an identity field (ID field) for receiving a digital output identity value for uniquely identifying the corresponding digital output variable 254, and also for specifying the length of an associated digital output data field to be allocated by the LCU 12 (FIG. 1) for storing values used for generating a corresponding one of the digital output signals provided at the digital output ports 16 and 38 of the LCU and digital I/O extension unit 40 (FIG. 1); a digital output variable name field for receiving a user specified string of characters descriptive of the source of, or information carried by, the corresponding digital output signal; and an input/output address field for receiving a user specified value indicative of the particular one of the digital output ports 16 (FIG. 1) at which the corresponding digital output signal is to be provided. The digital output variable 254 is similar to the digital input variable 246 (FIG. 4C) in that it also includes an ON state logic program level field. However, the depicted digital output variable differs from the digital input variable 246 (FIG. 4C) in that it does not include a sample number field or a sample time field. In addition, the digital output variable 254 is dissimilar from the digital input variable in that it includes an access right field 256, a delay field 258, and an LED property field 260. In the preferred embodiment, the digital output identity value carried in the ID field of the digital output variable 254 specifies a length for the associated digital output data field (to be allocated in the LCU 12 of FIG. 1), which is adequate for storing a bit value.

The access right field 256 receives a user-specified value indicative of whether the digital output variable 254 may be accessed as a read only value or as a read/write value by the end user GUI 65 (FIG. 1).

The delay field 258 of the digital output variable receives a user specified delay time value indicative of a delay time required for an external component of the system under test to be responsive to the corresponding digital output signal.

The LED property field of the digital output variable is used to carry an LED property value for specifying the behavior of an external LED of the system under control (other than the LED's 60 of the LED panel of FIG. 1) in response to receiving the digital output signal corresponding, with the digital output variable 254.

FIG. 4E shows a block diagram at 262 illustrating fields of a front panel LED variable used in the programming process of the present invention, the fields including: an ID field for receiving a front panel LED variable identity value for uniquely identifying the corresponding front panel LED variable 262, and also for specifying the length of an associated LED data field to be allocated by the ECU 12 (FIG. 1) for storing values used for generating a corresponding one of the LED output signals provided at the front panel port 26 of the LCU 12 (FIG. 1); a front panel LED variable name field for receiving a user specified string of characters descriptive of the source of, or information carried by, the corresponding LED output signal; an 10 input/output address field for receiving a user specified value indicative of the port 26 (FIG. 1) at which the corresponding LED output signal is to be provided; an access right field for receiving a user-specified value indicative of whether the digital output variable 254 may be accessed as a read only (R/O) value or as a read/write (R/W) value by the end user GUI 65 (FIG. 1); and an ON state logic program level field. The front panel LED variable 262 is very similar to the digital output variable 254 (FIG. 4D). In the preferred embodiment, the front panel LED variable identity value carried in the ID field of the front panel LED variable 262 specifies a length for the associated LED data field (to be allocated in the LCU 12 of FIG. 1), which is adequate for storing a two bit value. The two bits of the LED data field to be allocated by the LCU are used for storing LED values representing LED states including ON, OFF, blink slow, and blink fast.

FIG. 4F shows a block diagram at 264 illustrating fields of a panel switch variable used in the programming process of the present invention, the fields including: an identity field for receiving a panel switch variable identity value for identifying the corresponding panel switch variable 264, and also for specifying the length of an associated panel switch data field to be allocated by the LCU 12 (FIG. 1) for storing values received via a corresponding one of the panel switch signals received at the front panel port 26 of the LCU 12 (FIG. 1); a panel switch variable name field for receiving a user specified string of characters descriptive of the source of, or information carried by, the corresponding panel switch signal; and an input/output address field for receiving a user specified value indicative of the particular digital input port 14 (FIG. 1) at which the corresponding panel switch signal is to be provided; an access right field for receiving a user-specified value indicative of whether the corresponding panel switch variable 264 may be accessed as a read only (R/O) value or as a read/write (R/W) value by the end user GUI 65 (FIG. 1); and an ON state logic program level field.

In the prefer-red embodiment, the panel switch variable identity value carried in the ID field of the panel switch variable 264 specifies a length for the associated panel switch variable data field (to be allocated in the LCU 12 of FIG. 1), which is adequate for storing a bit value.

FIG. 4G shows a block diagram at 266 illustrating fields of a program variable used in the programming process of the present invention, the fields including: an identity field for receiving an ID value identifying the corresponding program variable 266, and also for specifying the length of an associated program variable data field (not shown) to be allocated by the LCU 12 (FIG. 1) for storing program values; a program variable name field for receiving a user-specified string of characters descriptive of the corresponding program variable; a configuration property field 268 for receiving a user specified value indicative of whether the program variable 266 is to be stored in the configuration data base in the serial flash EPROM unit 100 (FIG. 2) of the UCB, or in the main data base in the parallel flash EPROM unit 98 (FIG. 2), when the control program object file 140 (FIG. 3) is installed into the UCB 88; an initialization value field 270 for receiving a corresponding user-specified initialization value for the program variable data field (not shown); and an access right field for receiving a user-specified value indicative of whether the corresponding program variable 266 may be accessed as a read only (R/O) value or as a read/write (R/W) value by the end user GUI 65 (FIG. 1). In the preferred embodiment, the program variable identity value carried in the ID field of the program variable 266 specifies a length for the associated program variable data field (to be allocated in the LCU 12 of FIG. 1), which is adequate for storing a floating point number.

FIG. 4H shows a block diagram at 272 illustrating fields of a digital variable used in the programming process of the present invention. The fields of the depicted digital variable include: an identity field for receiving an ID value identifying the corresponding digital variable 272, and also for specifying the length of an associated digital variable data field (not shown) to be allocated by the LCU 12 (FIG. 1) for storing digital values; a digital variable name field for receiving a user-specified string of characters descriptive of the corresponding digital variable; a configuration property field for receiving a user specified value indicative of whether the digital variable 272 is to be stored as configuration data; an initialization value field 274 for receiving a corresponding user-specified initialization value for the digital variable data field (not shown); and an access right field for receiving a user-specified value indicative of whether the corresponding digital variable 272 may be accessed as a read only (R/O) value or as a read/write (R/W) value from the end user GUI 65 (FIG. 1); and an LED property field 276. The LED property field 276 is used for carrying a value indicative of whether a specified LED is currently, or was at some time, blinking fast or blinking slow.

In the preferred embodiment, the identity value carried in the ID field of the digital variable 272 specifies a length for the associated digital variable data field (to be allocated in the LCU 12 of FIG. 1). which is adequate for storing a bit value.

FIG. 4I shows a block diagram at 278 illustrating fields of a timer variable used in the programming process of the present invention. The depicted fields of the timer variable 278 include: an identity field for receiving an ID value identifying the corresponding timer variable 278, and also for specifying the length of an associated timer variable data field (not shown) to be allocated by the LCU 12 (FIG. 1) for storing timer values; a timer variable name field for receiving a user-specified string of characters descriptive of the corresponding timer variable; a configuration property field for receiving a user specified value indicative of whether the timer variable 278 is to be stored as configuration data; an initialization value field 280 for receiving a corresponding user-specified initialization value for the timer variable data field (not shown); and an access right field for receiving a user-specified value indicative of whether the corresponding timer variable 278 may be accessed as a read only (R/O) value or as a read/write (R/W) value from the end user GU1 65 (FIG. 1). In the preferred embodiment, the identity value carried in the ID field of the timer variable 278 specifies a length for the associated timer variable data field (to be allocated in the LCU), which is adequate for storing an integer whole number.

The Programming Process

Figure 5:
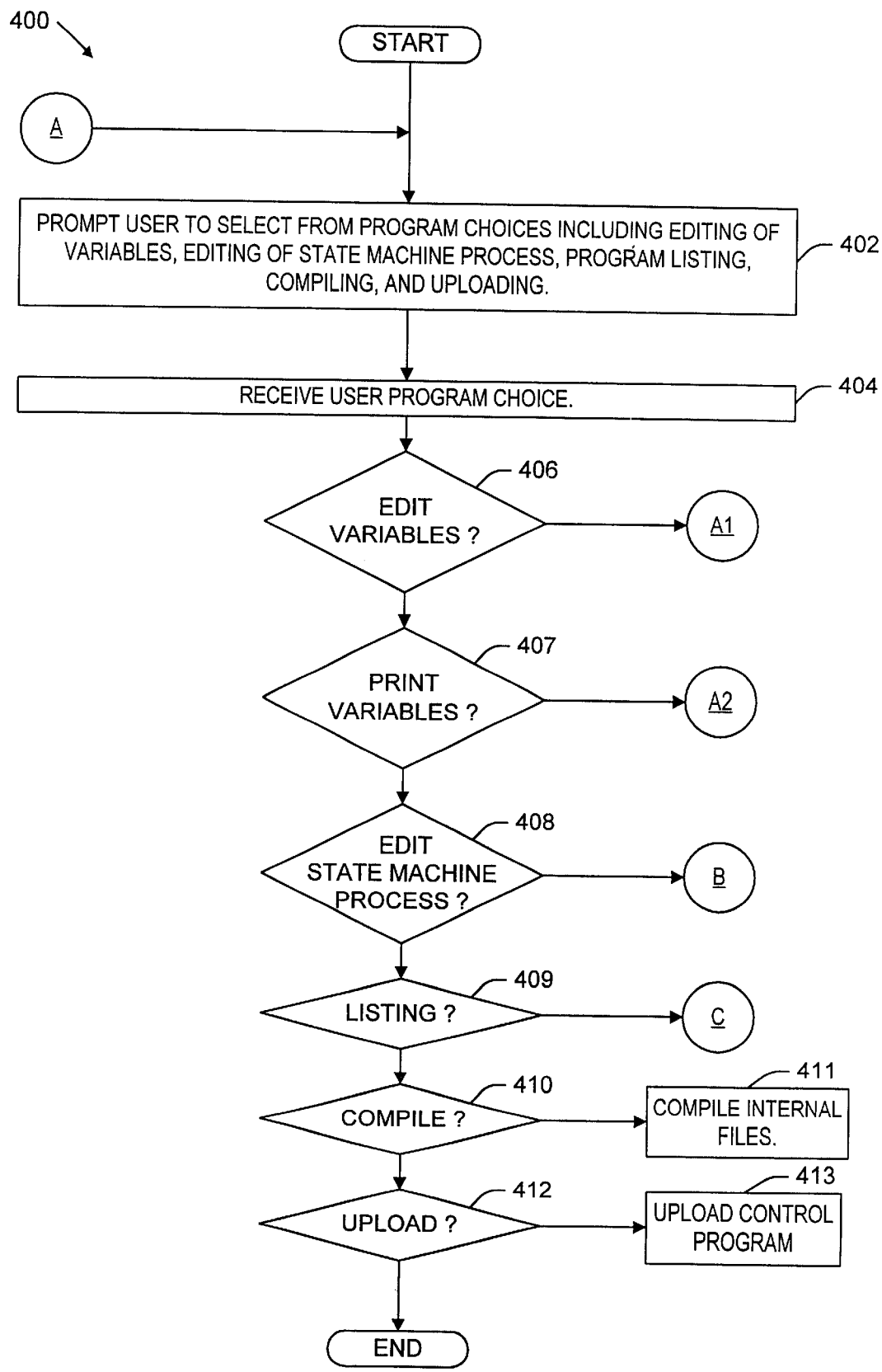
FIG. 5 is a flow diagram illustrating a series of steps for implementing a main menu of a user interface of the programming process of the present invention.

FIG. 5 shows a flow diagram at 400 illustrating a series of steps for implementing a main menu of a user interface of the programming process of the present invention for configuring a logic control unit. Although not shown, in the preferred embodiment, the programming process provides an option in the main menu of selecting from a plurality of control programs to be edited or created. The depicted process begins with step 402 in which the programming process prompts a user to select from programming options including editing of variables, editing of the state machine process, compiling, and uploading. In step 404, the programming process receives a user input selected from the choices specified in step 402. In step 406, the programming process determines whether the option of editing variables has been selected. If the user has selected the option of editing of variables, the depicted process proceeds to "A1" (to FIG. 6). In step 407, it is determined whether the user has selected the option of printing a variable listing for the present control program, and if so, the process proceeds to "A2" (to FIG. 17). In step 408 it is determined whether the user has selected the option of editing the state machine process. If so, the depicted process proceeds to "B" (to FIG. 18). In step 409, it is determined whether the user has selected the option of generating a program listing, and if so, the process proceeds to "C" (to FIG. 32). In step 410 it is determined whether the user has selected the option of compiling and if so, the depicted process proceeds to step 411 in which the programming system compiles the internal files 132 (FIG. 3A) in accordance with any of a variety of well known compiling techniques. In step 412, the programming process determines whether the user has selected the option of uploading. If it is determined at 412 that the user has selected the option of uploading, the depicted process proceeds to step 413 in which the uploading module 142 (FIG. 3A) provides conversion and uploading of the object file 140 to the LCU 12 (FIG. 1) as described above. If it is determined at 412 that the user has not selected the option of uploading, the depicted process ends.

Editing Logic Control Variables

Figure 6:
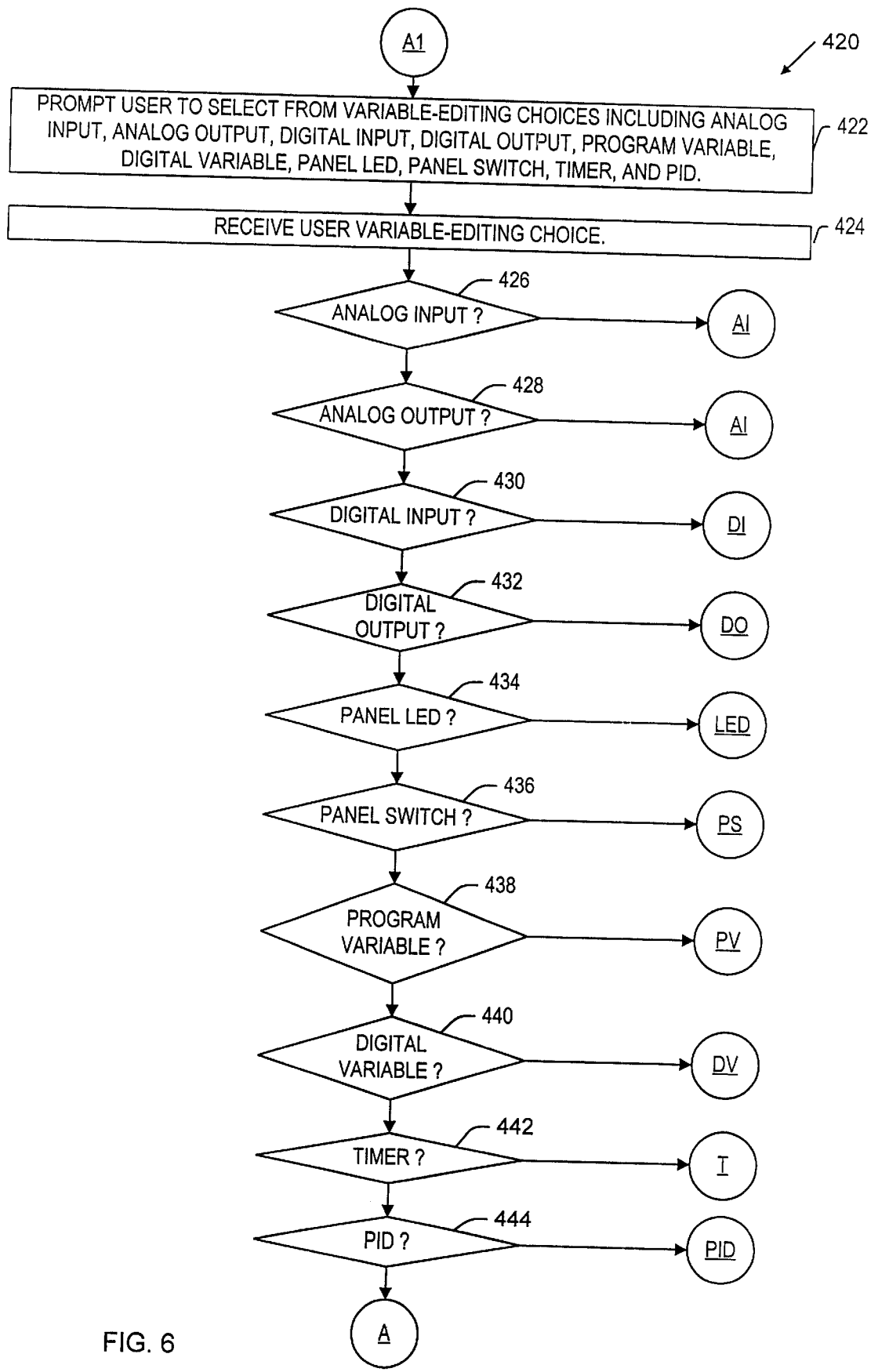
FIG. 6 is a flow diagram illustrating a sub-process providing a user with options for editing different types of variables used in the programming process of the present invention.

FIG. 6 shows a flow diagram at 420 illustrating a variable editing sub-process providing a user with choices for editing different types of variables in the programming process of the present invention. The depicted process begins with step 422 in which the programming process prompts a user to select from variable-editing options including the editing of analog input variables, analog output variables, digital input variables, digital output variables, program variables, digital variables, panel light-emitting diode (panel LED) variables, panel switch variables, timer variables, and proportional integral derivative (PID) variables. In step 424, the programming process receives a user input indicating one of the variable editing options provided in step 422.

From step 424, the depicted process proceeds to 426 at which it is determined whether the option of editing analog, input variables has been selected. If so, the depicted process proceeds to "AI" (to FIG. 7). From 426, the depicted process proceeds to 428 at which it is determined whether the user has selected the option of editing analog output variables, and if so, the depicted process proceeds to "AO" (to FIG. 8). From 428, the depicted process proceeds to 430 at which it is determined whether the user has selected the option of editing digital input variables, and if so, the process proceeds to "DI" (to FIG. 9). From 430, the depicted process proceeds to 432 at which it is determined whether the user has selected the option of editing digital output variables, and if so, the depicted process proceeds to "DO" (to FIG. 10).

Figure 11:
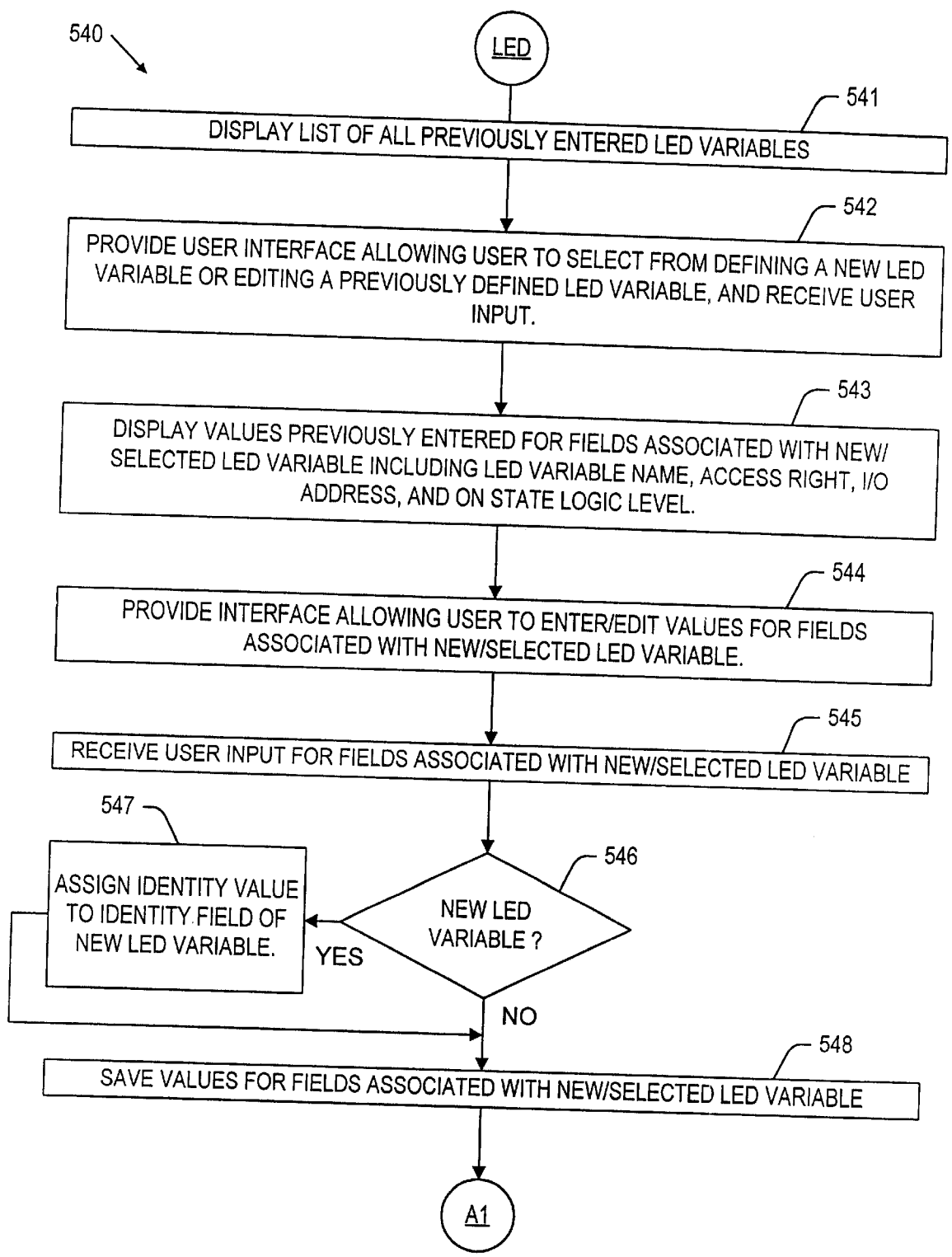

At 434, it is determined whether the user has selected the option of editing front panel LED variables, and if so, the process proceeds to "LED" (to FIG. 11). At 436, the programming process determines whether the user has selected the option of editing panel switch variables, and if so, the process proceeds to "PS" (to FIG. 12). From 436, the process proceeds to 438 at which it is determined whether the user has selected the option of editing program variables, and if so, the process proceeds to "PV" (to FIG. 13). At 440, the programming process determines whether the user has selected the option of editing digital variables, and if so, the process proceeds to "DV" (to FIG. 14). At 442, it is determined whether the user has selected the option of editing timer variables, and if so, the process proceeds to "T" (to FIG. 15). Finally at 444, it is determined whether the user has selected the option of editing PID variables, and if so, the process proceeds to "PID" (to FIG. 16), and if not, the depicted process ends.

Figure 7:
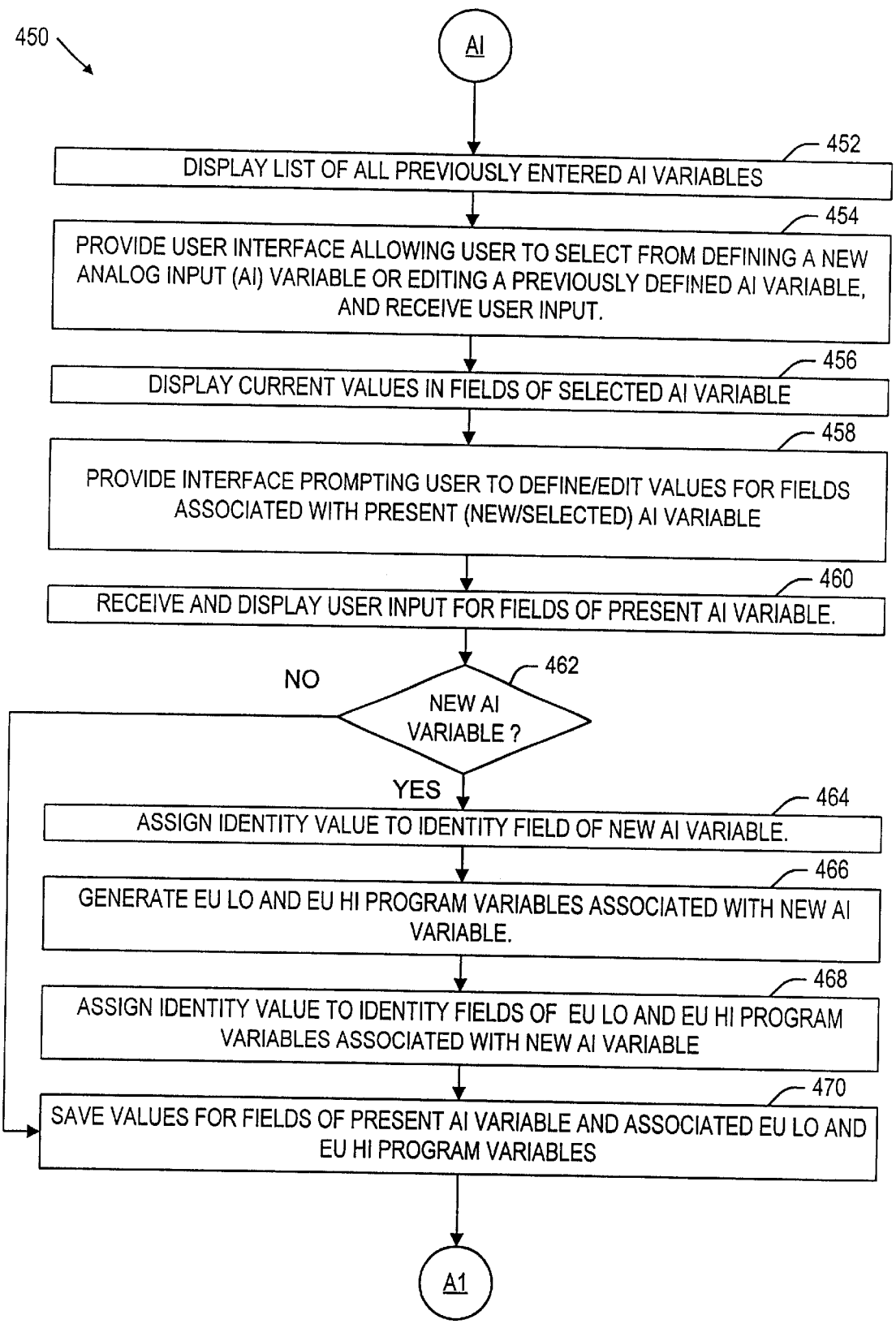
FIGS. 7–16 are flow diagrams illustrating sub-processes of the programming process of the present invention for editing variables including analog input and output variables, digital input and output variables, program variables, digital variables, front panel LED variables, panel switch variables, timer variables, and proportional integral derivative (PID) variables.

FIG. 7 shows a flow diagram at 450 illustrating a sub-process of the programming process of the present invention for editing an analog input variable (AI variable) 200 (FIG. 4A). The depicted proceeds from "AI" (from FIG. 6) to 452 at which the programming system displays a list of all previously defined analog input variables. In step 454, the programming system: provides a user interface allowing the user to select from the options of defining a new analog input variable, or editing a previously defined analog input variable; and receives a corresponding user in put. In step 456, the programming system displays current values for all of the fields 202–211 (FIG. 4A) of the new/selected present analog input variable 200 (FIG. 4A). If the present analog input variable is a new variable, then the fields 202–211 (FIG. 4A) are undefined and no entry is displayed for each field. From step 456, the depicted process proceeds to step 458 in which the programming system provides an interface allowing the user to edit/define the fields 202–211 (FIG. 4A) of the present analog input variable, and also edit/define fields of the associated EU low program variable 225 (FIG. 4A) and EU high program variable 227. In step 460, the programming system receives and displays the user input for each of the fields 202–211 (FIG. 4A) of the present analog input variable.

In step 462, the programming system determines whether the user has selected the option of defining a new analog input variable. If it is determined at 462 that the user has selected the option of defining a new analog input variable, the depicted process proceeds to step 464 in which the programming system automatically assigns an analog input variable identity value to ID field 202 (FIG. 4A) of the present analog input variable 200. Values are assigned to the ID field 202 of each new analog input variable by reading from the float type variable counter value stored in the variable flies of the internal files 132 (FIG. 3) which is increased each time a new float type variable is defined. From step 464, the process proceeds to step 466 in which the programming system EU generates a new EU low program variable 225 (FIG. 4A) and a new EU high program variable 227 from the sub-fields 210–220 and 221–224 respectively of the EU low field 210 and EU high field 211 of the associated analog input variable 200 (FIG. 4A). In step 468. the programming system automatically assigns identity values to ID fields 226 and 228 (FIG. 4A) of the new EU low program variable 225 and new EU high program variable 227 respectively by reading from the float type counter value. From step 468, the process proceeds to step 470 in which the programming system saves the new/edited values for the fields of the present analog input variable, and the fields of the EU low variable and EU high variable associated with the present analog input variable. If it is determined at 462 that the user has not selected the option of defining a new analog input variable, bust has selected the option of editing a previously defined analog input variable, the depicted process proceeds from 462 directly to execute step 470 as described above.

Figure 8:
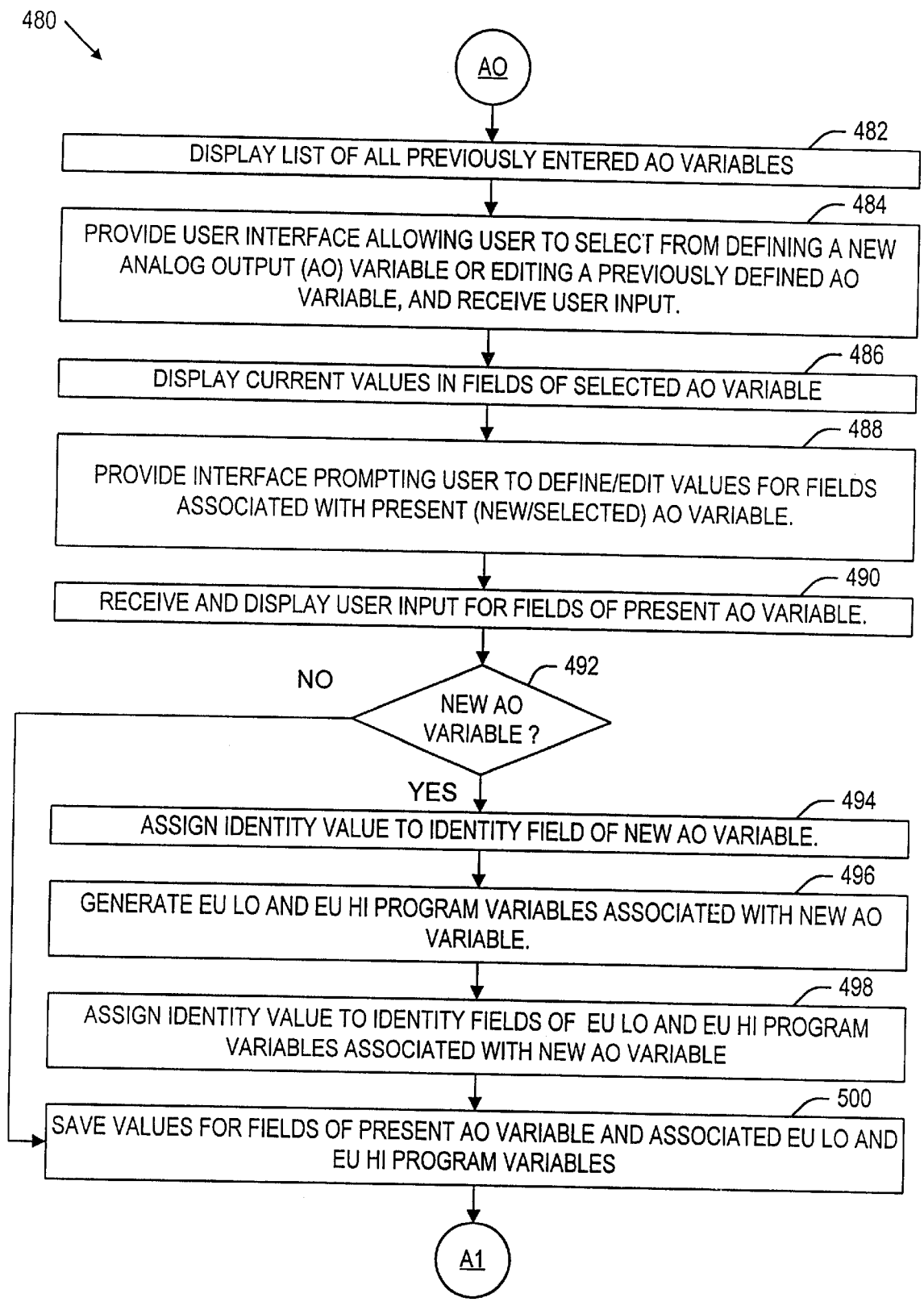

FIG. 8 shows a flow diagram at 480 illustrating a sub-process of the programming process of the present invention for editing an analog output variable (AO variable) 230 (FIG. 4B). The depicted proceeds from "AO" (from FIG. 6) to 482 at which the programming system displays a list of all previously defined analog output variables. In step 484, the programming system: provides a user interface allowing the user to select from the options of defining a new analog output variable, or editing a previously defined analog output variable, and receives a corresponding use input. In step 486, the programming system displays current values for all of the fields (FIG. 4B) of the new/selected present analog output variable 230 (FIG. 4B). If the present analog output variable is a new variable, then the corresponding fields of the analog output variable (FIG. 4B) are undefined and no entry is displayed for each field. From step 486, the depicted process proceeds to step 488 in which the programming system provides an interface allowing the user to edit/define the fields of the present analog output variable 230 (FIG. 4B), and also edit/define fields of the associated EU low program variable 236 (FIG. 4B) and EU high program variable 238. In step 490, the programming system receives and displays the user input for each of the fields (FIG. 4B) of the present analog output variable.

In step 492, the programming system determines whether the user has selected the option of defining a new analog output variable. If it is determined at 492 that the user has selected the option of defining a new analog output variable, the depicted process proceeds to step 494 in which the programming system automatically assigns an analog output variable identity value to ID field (FIG. 4B) of the present analog output variable 230. Values are assigned to the ID field of each new analog output variable by reading from the float type variable counter value stored in the variable files of the internal files 132 (FIG. 3) which is increased each time a new float type variable is defined. From step 494, the process proceeds to step 496 in which the programming system generates a new EU low program variable 236 (FIG. 4B) and a new EU high program variable 238 from the sub-fields and of the EU low field 232 and EU high field 234 respectively of the associated analog output variable 230 (FIG. 4B). In step 498, the programming system automatically assigns identity values to ID fields 237 and 239 (FIG. 4B) of the new EU low program variable 236 and new EU high program variable 238 respectively by reading from the float type counter value. From step 498, the process proceeds to step 500 in which the programming system saves the new/edited values for the fields of the present analog output variable, and the fields of the EU low variable and EU high variable associated with the present analog output variable. If it is determined at 492 that the user has not selected the option of defining a new analog output variable, bust has selected the option of editing a previously defined analog output variable, the depicted process proceeds from 492 directly to execute step 500 as described above.

Figure 9:
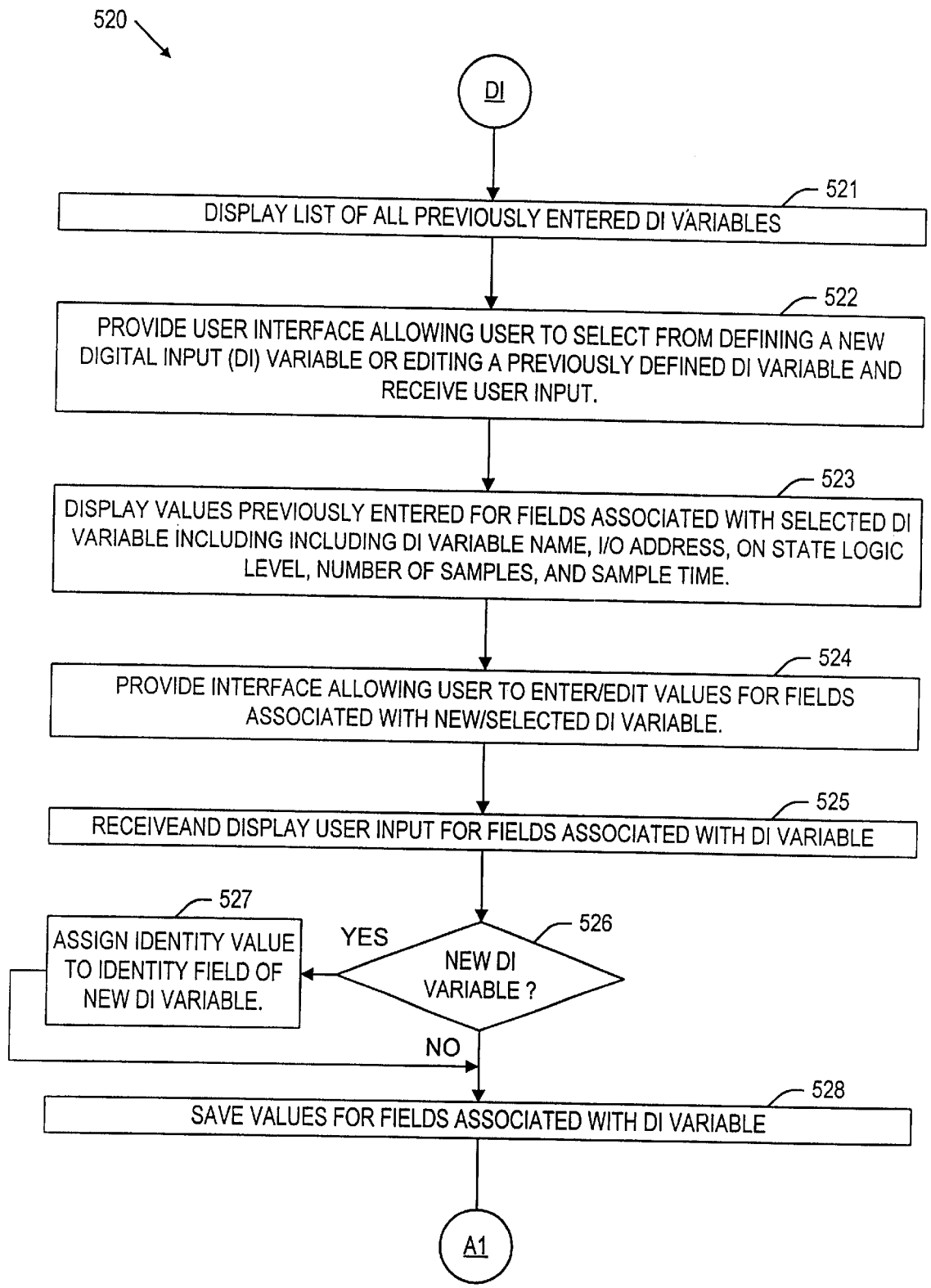

FIG. 9 shows a flow diagram at 520 illustrating a sub-process of the programming process of the present invention for editing a digital input variable (DI variable) 246 (FIG. 4C). The depicted process proceeds from "DI" (from FIG. 6) to 521 at which the programming system displays a list of all previously defined digital input variables. In step 522, the programming system: provides a user interface allowing the user to select from the options of defining a new digital input variable, or editing a previously defined digital input variable; and receives a corresponding user input. In step 523, the programming system displays values previously entered for all of the fields (FIG. 4C) of the digital input variable selected in step 522, the fields including the DI variable name field, I/O address field, ON state logic program level field, sample number field, and sample time field (FIG. 4C). If the present digital input variable is a new variable, then the fields of the digital input variable (FIG. 4C) are undefined and no entry is displayed for each field.

In step 524, the programming system provides an interface allowing the user to edit/define the fields (FIG. 4C) of the present digital input variable. In step 525, the programming system receives and displays the user input for each of the fields (FIG. 4C) of the present digital input variable. The depicted process proceeds from step 525 to 526 at which the programming system determines whether the user has selected the option of defining a new digital input variable. If it is determined at 526 that the user has selected the option of defining a new digital input variable, the process proceeds to step 527 in which the programming system automatically assigns a digital input variable identity value to the ID field (FIG. 4C) of the present digital input variable. Values are assigned sequentially to the ID field of each new digital input variable by reading from the digital type variable counter value which is increased each time a new digital type variable is defined. From step 527, the process proceeds to step 528 in which the programming system saves the new/edited values for the fields of the present digital input variable. It it is determined at 526 that the user has not selected the option of defining a new digital input variable, the process proceeds directly to execute step 528 as described above, after which the process returns to "A1" (to FIG. 6).

Figure 10:
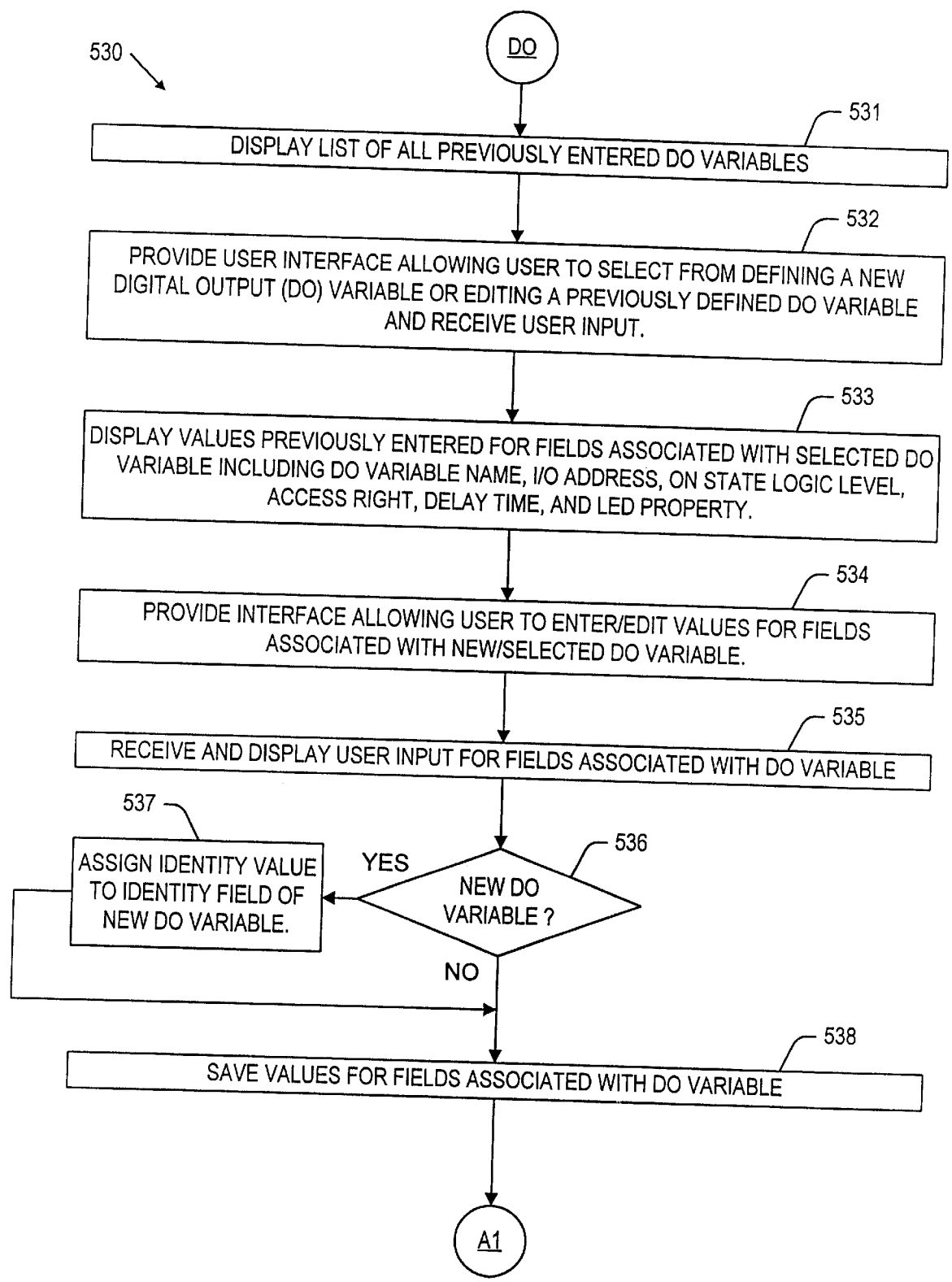

FIG. 10 shows a flow diagram at 530 illustrating a sub-process of the programming process of the present invention for editing a digital output variable (DO variable) 254 (FIG. 4D). The depicted proceeds from "DO" (from FIG. 6) to 531 at which the programming system displays a list of all previously defined digital output variables. In step 532, the programming system: provides a user interface allowing the user to select from the options of defining a new digital output variable, or editing a previously defined digital output variable; and receives a corresponding user input. In step 533, the programming system displays values previously entered for all of the fields (FIG. 4D) of the new/ selected digital output variable including the digital output variable name field, I/O address field, access right, ON state logic program level field, delay 258, and LED property 260 (FIG. 4D). If the present digital output variable is a new variable, then the fields of the digital output variable (FIG. 4D) are undefined and no entry is displayed for each field.

In step 534, the programming system provides an interface allowing the user to edit/define the fields (FIG. 4D) of the present digital output variable. In step 535, the programming system if receives and displays the user input for each of the fields (FIG. 4D) of the present digital output variable. The depicted process proceeds from step 535 to 536 at which the programming system determines whether the user has selected the option of defining a new digital output variable. If it is determined that the user has selected the option of defining a new digital output variable, the process proceeds to step 537 in which the programming system automatically assigns a digital output variable identity value to the ID field (FIG. 4D) of the present digital output variable. Values are assigned to the ID field of each new digital output variable by reading from the digital type variable counter value which is increased each time a new digital type variable is defined. From step 537, the process proceeds to step 538 in which the programming system saves the new/edited values for the fields of the present digital output variable. If it is determined at 536 that the user has not selected the option of defining a new digital output variable, the process proceeds directly to execute step 538 as described above, after which the process returns to "A1" (to FIG. 6).

FIG. 11 shows a flow diagram at 540 illustrating a sub-process of the programming process of the present invention for editing a front panel LED variable 262 (FIG. 4E). The depicted proceeds from "LED" (from FIG. 6) to 541 at which the programming system displays a list of all previously defined LED variables. In step 542, the programming system: provides a user interface allowing the user to select from the options of defining a new LED variable, or editing a previously defined LED variable; and receives a corresponding user input. In step 523, the programming system displays values previously entered for all of the fields (FIG. 4E) of the new/selected front panel LED variable including the variable name field, I/O address field, access right, and ON state logic program level field (FIG. 4E).

In step 524, the programming system provides an interface allowing the user to edit/define the fields (FIG. 4E) of the present LED variable. In step 525, the programming system receives and displays the user input for each of the fields (FIG. 4E) of the present LED variable. The depicted process proceeds from step 525 to 526 at which the programming system determines whether the user has selected the option of defining a new LED variable. If it is determined at 526 that the user has selected the option of defining a new LED variable, the process proceeds to step 527 in which the programming system automatically assigns an LED variable identity value to the ID field (FIG. 4C) of the present digital input variable. Values are assigned to the ID field of each new front panel LED variable by reading from the digital type variable counter value. From step 527, the process proceeds to step 528 in which the programming system saves the new/edited values for the fields of the present LED variable. If it is determined at 526 that the user has not selected the option of defining a new LED variable, the process proceeds directly to execute step 528 as described above, after which the process returns to "A1" (to FIG. 6).

Figure 12:
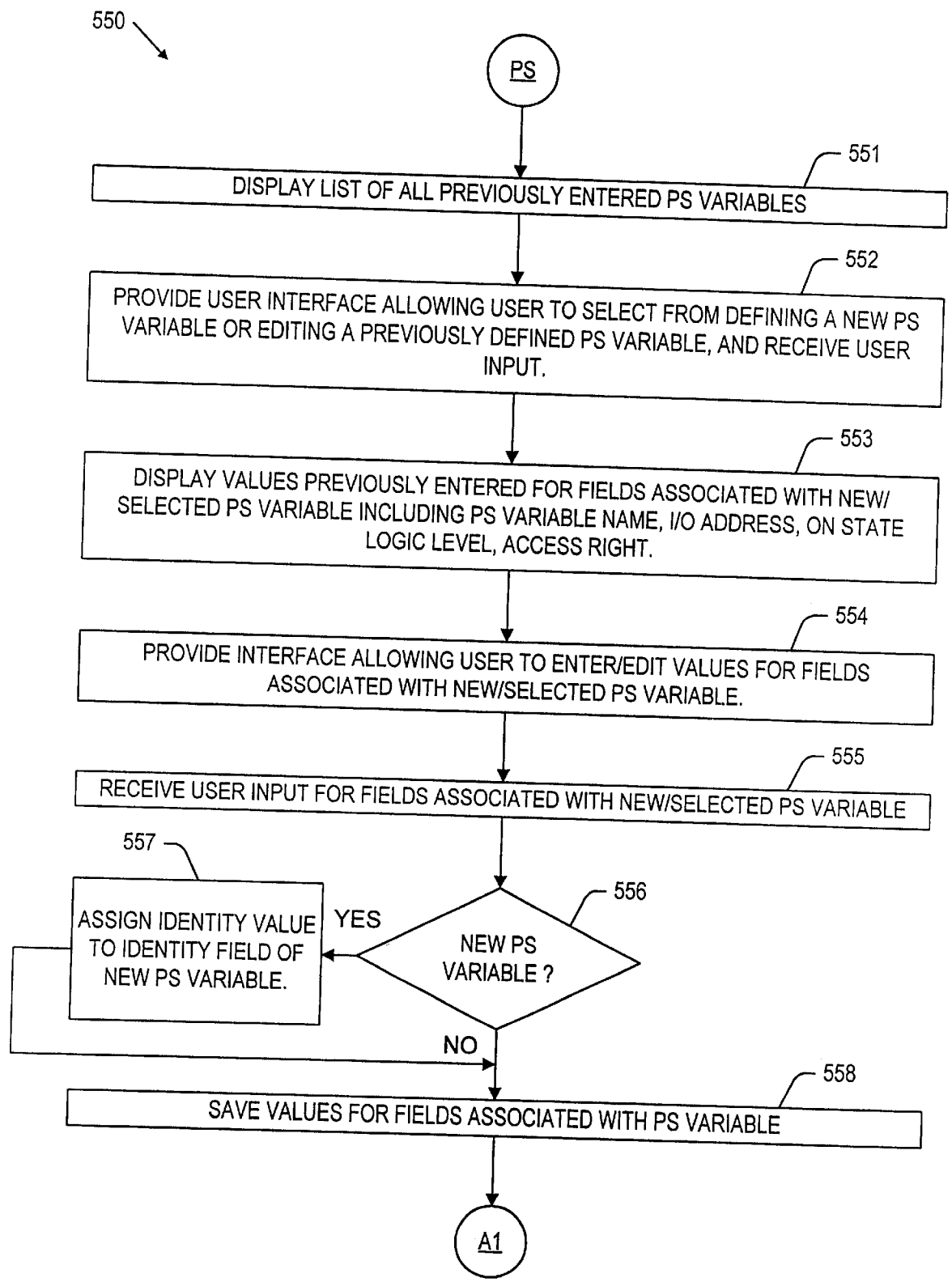

FIG. 12 shows a flow diagram at 550 illustrating a sub-process of the programming process of the present invention for editing a panel switch variable 264 (FIG. 4F). The depicted proceeds from "PS" (FROM FIG. 6) to step 551 at which the programming system displays a list of all previously defined panel switch variables. In step 552, the programming system: provides a user interface allowing the user to select from the options of defining a new panel switch variable, or editing a previously defined panel switch variable; and receives a corresponding user input. In step 553, the programming system displays values previously entered for all of the fields (FIG. 4F) of the new/selected panel switch variable including the panel switch variable name field, I/O address field, access right, and ON state logic program level field (FIG. 4F).

In step 554, the programming system provides an interface allowing the user to edit/define the fields (FIG. 4F) of the new/selected panel switch variable. In step 555, the programming system receives and displays the user input for each of the fields (FIG. 4F) of the present panel switch variable. The depicted process proceeds from step 555 to 556 at which the programming system determines whether the user has selected the option of defining a new panel switch variable. If it is determined at 556 that the user has selected the option of defining a new panel switch variable, the process proceeds to step 557 in which the programming system automatically assigns a panel switch variable identity value to the ID field (FIG. 4F) of the present digital input variable. Values are assigned to the ID field of each new panel switch variable by reading from the digital type variable counter value. From step 557, the process proceeds to step 558 in which the programming system saves the new/edited values for the fields of the present panel switch variable. If it is determined at 556 that the user has not selected the option of defining a new panel switch variable, the process proceeds directly to execute step 558 as described above, alter which the process returns to "A1" (to FIG. 6).

Figure 13:
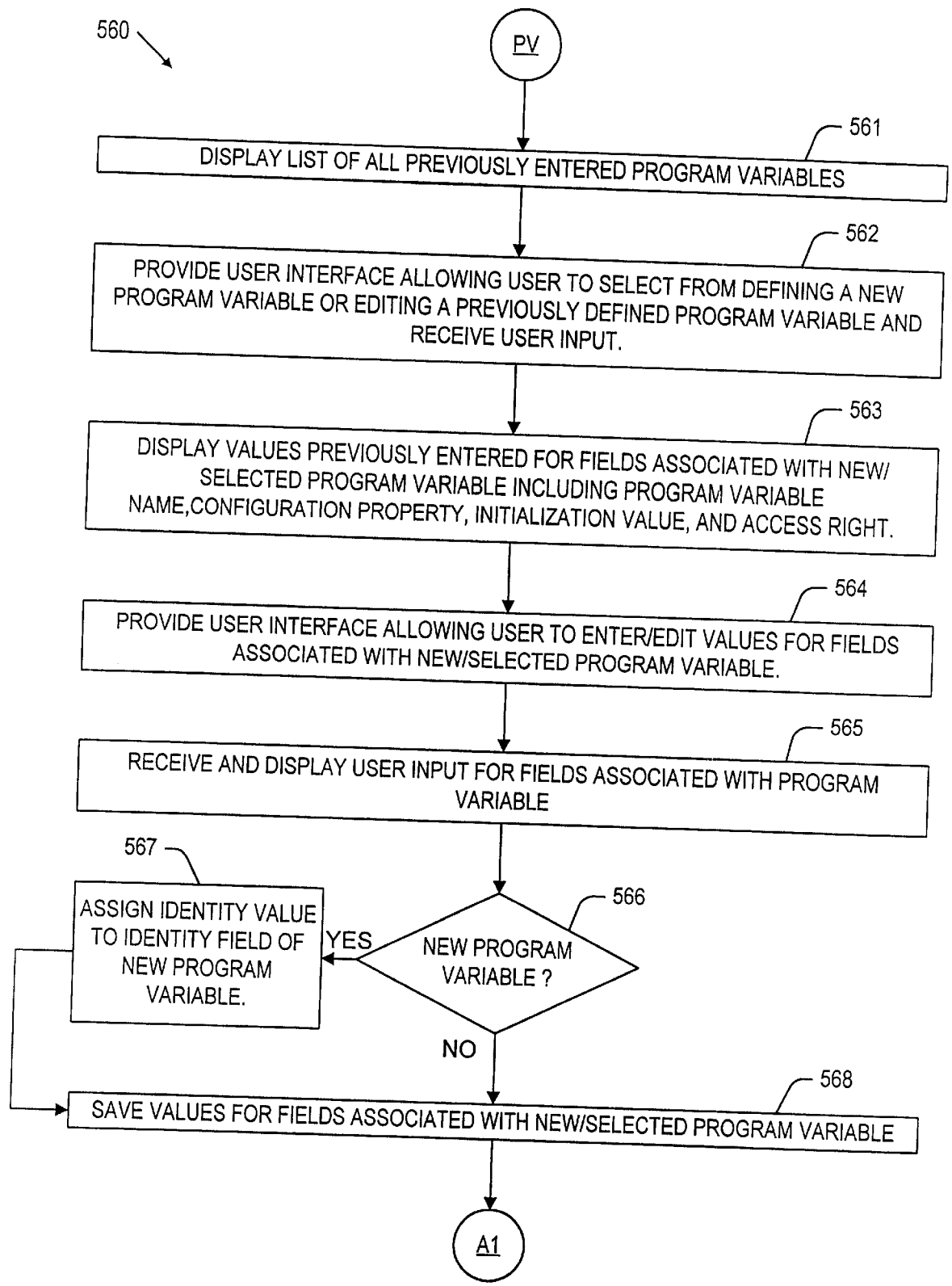

FIG. 13 shows a flow diagram at 560 illustrating a sub-process of the programming process of the present invention for editing a program variable 266 (FIG. 4G). The depicted proceeds from; "PV" (from FIG. 6) to step 561 in which the programming system displays a list of all previously defined program variables. In step 562, the programming system: provides a user interface allowing the user to select from the options of defining a new program variable, or editing a previously defined program variable; and receives a corresponding user input. In step 563, the programming system displays values previously entered for all of the fields (FIG. 4G) of the new/selected program variable including the program variable name field, configuration property field 268. initialization value field 270, and access right field (FIG. 4G).

In step 564, the programming system provides an interface allowing the user to edit/define the fields (FIG. 4G) of the new/selected program variable. In step 565, the programming system receives and displays the user input for each of the fields (FIG. 4G) of the present program variable. The depicted process proceeds from step 565 to 566 at which the programming system determines whether the user has selected the option of defining a new program variable. It it is determined at 566 that the user has selected the option of defining a new program variable, the process proceeds to step 567 in which the programming system automatically assigns a program variable identity value to the ID field (FIG. 4G) of the present program variable. Values are assigned sequentially to the ID field of each new program variable by reading from the float type variable counter value stored in the variable files of the internal files 332 (FIG. 3) which is increased each time a new float type variable is defined. From step 567, the process proceeds to step 568 in which the programming system saves the new/edited values for the fields of the present program variable. If it is determined at 566 that the user has not selected the option of defining a new program variable, the process proceeds directly to execute step 568 as described above, after which the process returns to "A1" (to FIG. 6).

Figure 14:
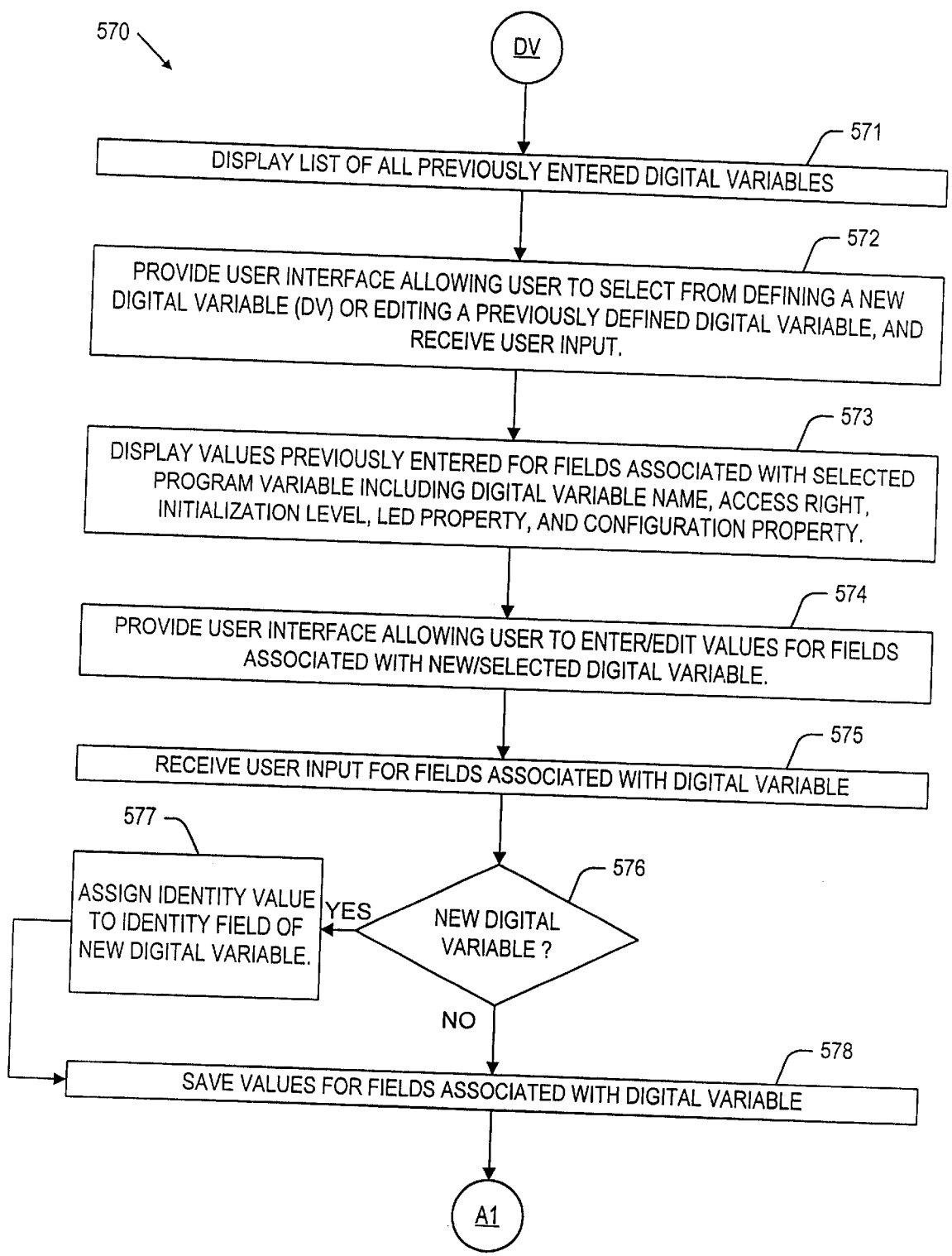

FIG. 14 shows a flow diagram at 570 illustrating a sub-process of the programming process of the present invention for editing a digital variable 272 (FIG. 4H). The depicted proceeds from "DV" (from FIG. 6) to step 571 in which the programming system displays a list of all previously defined digital variables. In step 572, the programming system: provides a user interface allowing the user to select from the options of defining a new digital variable, or editing a previously defined digital variable; and receives a corresponding user input. In step 573, the programming system displays values previously entered for all of the fields (FIG. 4H) of the selected digital variable including the digital variable name field, configuration property field, initialization value field 274, access right field, and LED property field 276 (FIG. 4H).

In step 574, the programming system provides an interface allowing the user to edit/define the fields (FIG. 4H) of the present digital variable. In step 575, the programming system receives and displays the user input for each of the fields (FIG. 4H) of the present digital variable. The depicted process proceeds from step 575 to 576 at which the programming system determines whether the user has selected the option of defining a new digital variable. If it is determined at 576 that the user has selected the option of defining a new digital variable, the process proceeds to step 577 in which the programming system automatically assigns a digital variable identity value to the ID field (FIG. 4H) of the present digital variable. Values are assigned to the ID field of each new digital variable by reading from the digital type variable counter value. From step 577, the process proceeds to step 578 in which the programming system saves the news/edited values for the fields of the present digital variable. If it is determined at 576 that the user has not selected the option of defining a new digital variable, the process proceeds directly to execute step 578 as described above, after which the process returns to "A1" (to FIG. 6).

Figure 15:
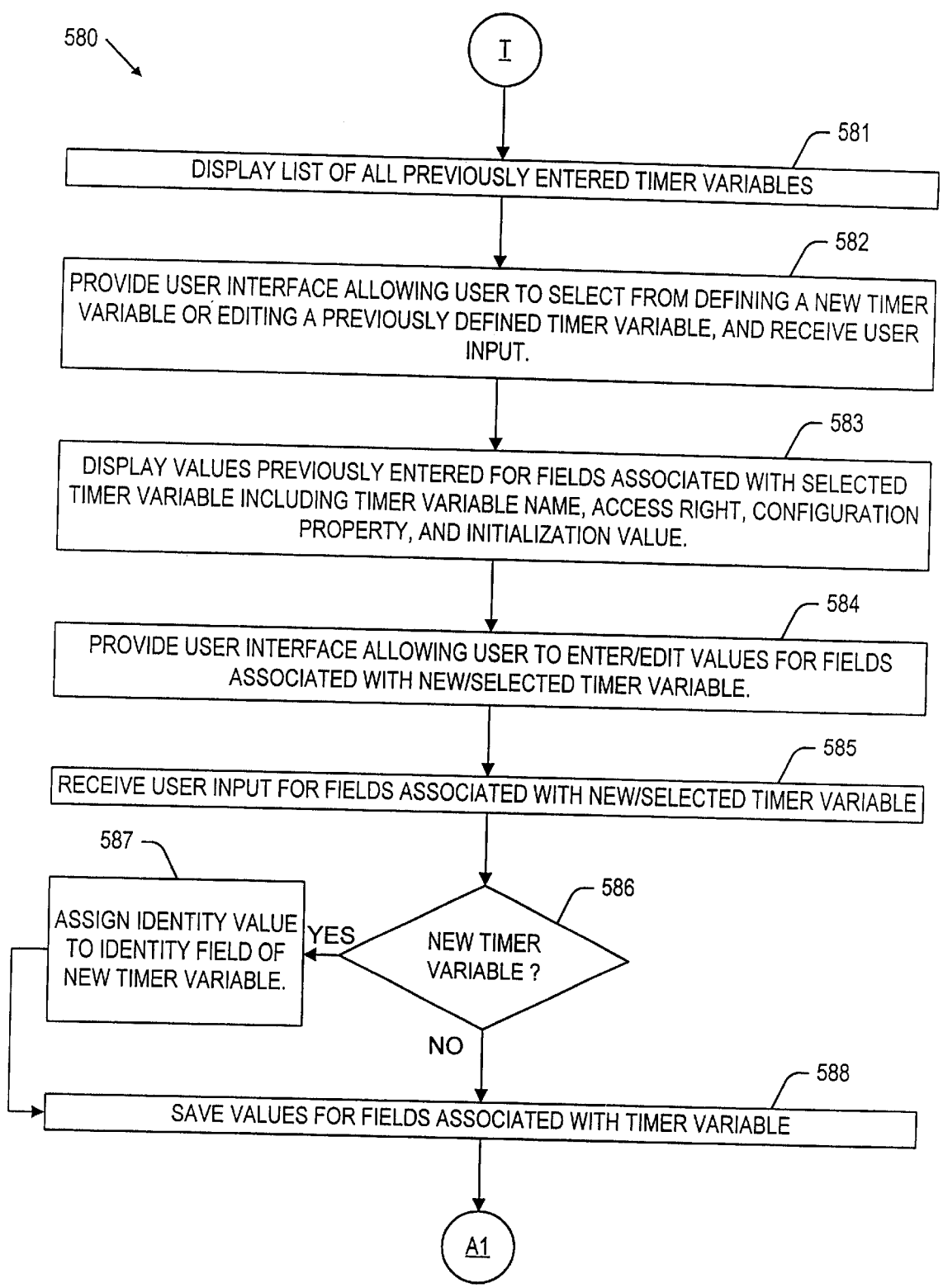
Figure 16:
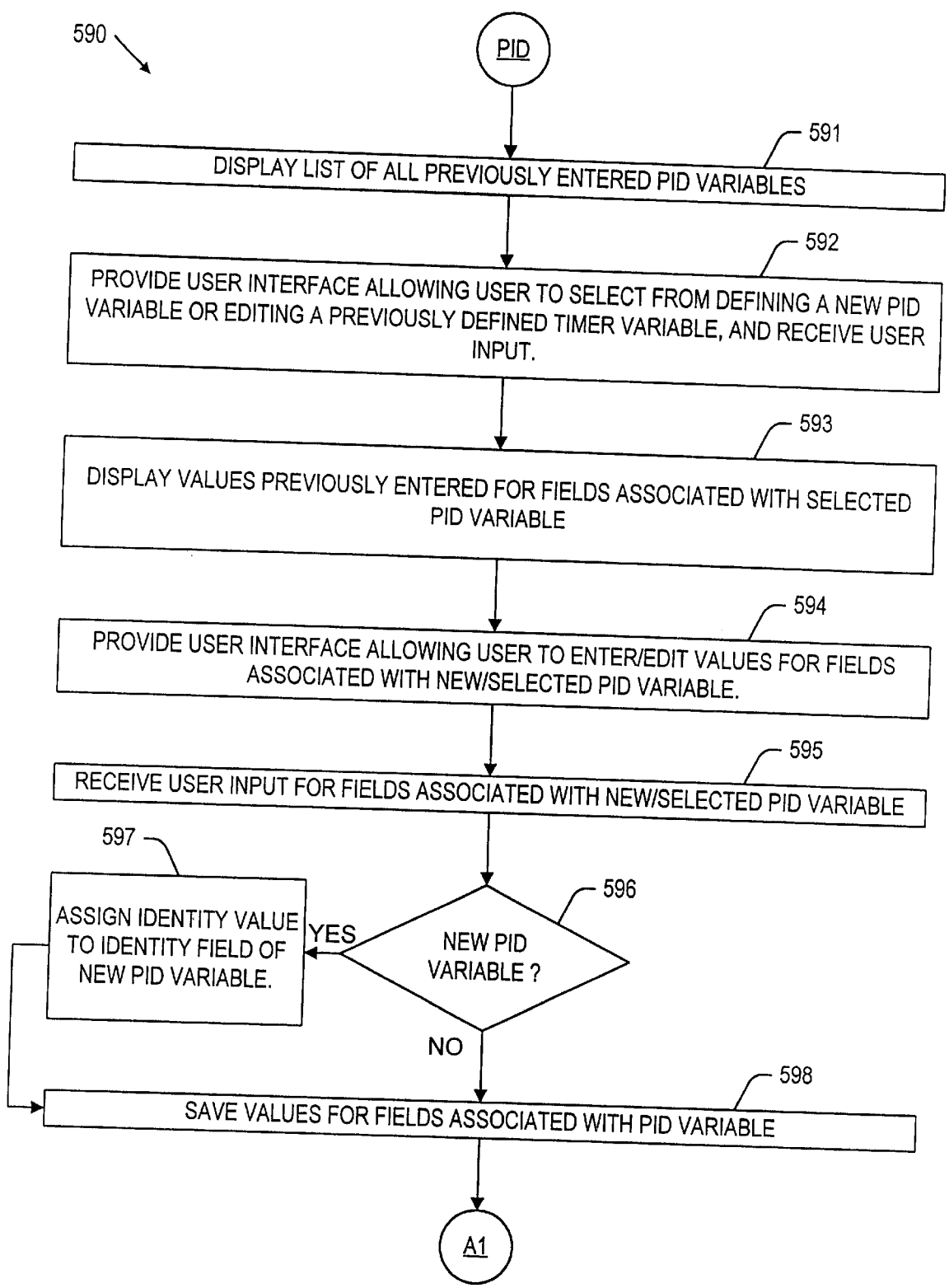

FIG. 15 shows a flow diagram at 580 illustrating a sub-process of the programming process of the present invention for editing a timer variable 278 (FIG. 4I). The depicted proceeds from "T" (from FIG. 6) to 581 at which the programming system displays a list of all previously defined timer variables. In step 582, the programming system: provides a user interface allowing the user to select from the options of defining a new timer variable, or editing a previously defined timer variable, and receives a corresponding user input. In step 583, the programming system displays values previously entered for all of the fields (FIG. 4I) of the selected timer variable including, the timer variable name field, configuration property field, initialization value field 280, and access right field (FIG. 4I).

In step 584, the programming system provides an interface allowing the user to edit/define the fields (FIG. 4I) of the new/selected timer variable. In step 585, the programming system receives and displays the user input for each of the fields (FIG. 4I) of the present timer variable. The depicted process proceeds from step 585 to 586 at which the programming system determines whether the user has selected the option of defining a new timer variable. If it is determined at 586 that the user has selected the option of defining a new timer variable, the process proceeds to step 587 in which the programming system automatically assigns a timer variable identity value to the ID field (FIG. 4I) of the present timer variable. Values are assigned to the ID field of each new timer variable by reading from the long type variable counter value. From step 587, the process proceeds to step 588 in which the programming system saves the new/edited values lot the fields of the present timer variable. If it is determined at 586 that the user has not selected the option of defining a new timer variable, the process proceeds directly to execute step 588 as described above, after which the process returns to "A1" (to FIG. 6).

As mentioned above, proportional integral derivative (PID) variables may also be defined in the programming process of present invention for creating a control program for execution by the LCU 12 (FIG. 1) to control a system having closed loop feed back. For controlling such systems, the LCU 12 (FIG. 1) includes additional software modules which are responsive to the PID variables of the control program loaded to the LCU.

The PID fields include: a PID name field; a time sampling interval field for creating a corresponding timer variable having an identity field carrying an identity value which identifies the timer variable and specifies the length of an associated data field to be allocated by the LCU for the timer variable, a configuration sub-field, and an access right sub-field; a conversion mode field for indicating one of three conversion modes, the conversion mode field having a configuration field and an access right sub-field.

The PID fields also include: a proportional coefficient field for creating a corresponding program variable having an identity field carrying an identity value which identifies the program variable and specifies the length of an associated data field to be allocated by the LCU for the program variable, a configuration field, and an access right field; an integral coefficient field for creating a corresponding program variable having an identity field carrying an identity value which identifies the program variable and specifies the length of an associated data field to be allocated by the ECU for the program variable, a configuration field, and an access right field; a differential coefficient field for creating a corresponding program variable having an identity field carrying an identity value which identifies the program variable and specifies the length of an associated data field to be allocated by the LCU for the program variable, a configuration field, and an access right field; and a hysteresis field for creating a corresponding program variable having an identity field carrying an identity value which identifies the program variable and specifies the length of an associated data field to be allocated by the LCU for the program variable, a configurational field, and an access right field.

The PID fields further include: a process variable delay field for creating a corresponding timer variable having an identity field carrying an identity value which identifies the timer variable and specifies the length of an associated data field to be allocated by the LCU for the timer variable, a configuration field, and an access right field; a process variable average field for creating a corresponding timer variable having an identity field carrying an identity value which identifies the timer variable and specifies the length of an associated data field to be allocated by the ICU or the timer variable, a configuration field, and an access right field; an output upper limit percentage field for creating a corresponding program variable having an identity field carrying an identity value which identifies the program variable and specifies the length of an associated data field to be allocated by the LCU for the program variable, a configuration field, and an access right field; an output lower limit percentage field for creating a corresponding program variable having an identity field carrying an identity value which identifies the program variable and specifies the length of an associated data field to be allocated by the LCU for the program variable, a configuration field, and an access right field; a digital output signal field which must be predefined; and a hardware I/O PID manual mode field which must be predefined.

The PID field further include: a hardware I/O PID/manual mode field for creating a digital variable; a set point hardware I/O field which must be predefined; a set point field for creating a program variable; a process hardware I/O field which must be predefined; a process field for creating a program variable; a manual output percentage hardware I/O field which must be predefined; a manual output percentage field for creating a program variable; an analog output hardware I/O field which must be predefined; an analog output hardware I/O field for creating a program variable; and a pulse length for creating a corresponding program variable having an identity field carrying all identity value which identifies the program variable and specifies the length of an associated data field to be allocated by the LCU for the program variable, a configuration field, and an access right field.

The PID fields further include: a frequency match to maximum output field for creating a corresponding program variable having an identity field carrying an identity value which identifies the program variable and specifies the length of an associated data field to be allocated by the LCU for the program variable, a configuration field, an access right field, and a pulse frequency mode field; a minimum frequency allowed field for creating a corresponding program variable having an identity field carrying an identity value which identifies the program variable and specifies the length of an associated data field to be allocated by the LCU for the program variable, a configuration field, an access right field, and a pulse frequency mode field; a maximum frequency allowed field for creating a corresponding program variable having an identity field carrying an identity value which identifies the program variable and specifies the length of an associated data field to be allocated by the LCU for the program variable, a configuration field, an access right field, and a pulse frequency mode field; and a pulse period field for creating a corresponding program variable having an identity field carrying an identity value which identifies the program variable and specifies the length of an associated data field to be allocated by the LCU for the program variable, a configuration field, an access right field, and a pulse length mode field.

FIG. 15 shows a flow diagram at 590 illustrating a sub-process of the programming process of the present invention for editing a PID variable. The depicted proceeds from "PID" (from FIG. 6) to 591 at which the programming system displays a list of all previously defined PID variables. In step 592, the programming system: provides a user interface allowing the user to select from the options of defining a new PID variable, or editing a previously defined PID variable; and receives a corresponding user input. In step 593, the programming system displays values previously entered for all of the fields of the selected PID variable including the PID variable name field, configuration property field, initialization value field 280, and access right field.

In step 594, the programming system provides an interface allowing the user to edit/define the fields of the new/ selected PID variable. In step 595, the programming system receives and displays the user input for each of the fields of the present PID variable. The depicted process proceeds from step 595 to 596 at which the programming system determines whether the user has selected the option of defining a new PID variable. If it is determined at 596 that the user has selected the option of defining a new PID variable, the process proceeds to step 597 in which the programming system automatically assigns a PID variable identity value to the ID field of the present PID variable. Values are assigned sequentially to the ID field of each new PID variable by reading from a PID variable counter value stored in the variable files of the internal files 332 (FIG. 3) which is increased each time a new PID variable is defined. From step 597, the process proceeds to step 598 in which the programming system saves the new/edited values for the fields of the present PID variable. If it is determined at 596 that the user has not selected the option of defining a new PID variable, the process proceeds directly to execute step 598 as described above, alter which the process returns to "A1" (to FIG. 6).

In the preferred embodiment of the present invention, each of the above described variable editing processes is implemented using a windows type user interface which allows the user to select functions including save, delete, and cancel at any time during the variable editing sub-process. The save, delete, and cancel functions respectively allow for saving fields entered for a variable, deleting a previously defined variable, and canceling edits made to fields of a variable. Also, the user interface for each of the above described editing processes provides the user with an option to select a move function allowing the user to rearrange the order of the variables displayed in steps 452, 482, 521, 531, 541, 551, 561, 571, 581, 591 of the variable editing sub-processes.

Figure 17:
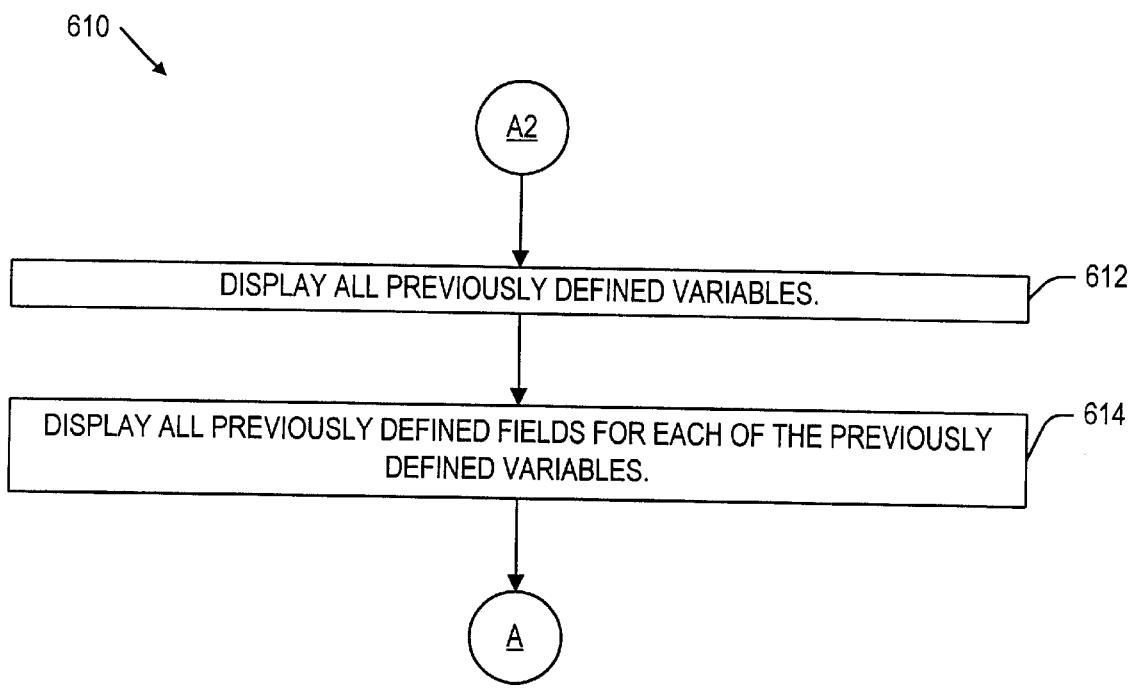
FIG. 17 is a flow diagram illustrating a sub-process for generating a listing of variables previously defined for a particular control program created using the programming process.

FIG. 17 shows a flow diagram at 610 illustrating a sub-process for generating a variable listing in the programming process of the present invention. The depicted process proceeds from "A2" (from FIG. 5) to step 612 in which the programming system displays (via the display unit 83 of the programming system 80 (FIG. 1) or via a printer coupled with the programming system 80) all variables previously defined for a present control program. In step 614, the programming system displays values entered for all of the fields associated with the previously defined variables. The depicted proceeds from step 614 back to "A" (to FIG. 5).

Editing Program Levels, States, and Conditions

As mentioned above, in the programming process of the present invention, a plurality of program levels, states and conditions are defined by the user to create a control program based on a modified state machine theory. Each program level, which defines a sub-process of the control program includes a plurality of states which the control program is to operate in. There are two types of program levels that may be defined in the programming process including a task program level, and a sub-routine program level. Each task program level created in the programming process defines a major sub-process, or thread, of the control program which is to be asynchronously executed by the LCU 12 (FIG. 1). In the preferred embodiment of the programming process, the first program level defined must be a task program level. The operating system kernel 182 (FIG. 3B) is a multitasking system in that if the operating system receives a request from two or more program levels simultaneously, the highest program level is given priority in competing for the processing resources of the CPU 90 (FIG. 2) of the UCB 88.

It is good programming practice for the user to define a single task program level including all states which define "normal" operating conditions of the process under control. Also in accordance with good programming practice, the user may wish to specify additional task program levels of the control program to describe alarm conditions of the process under control. Typically, subroutine program levels are used in the programming process to define sub-processes of the control program which are to be called many times from another one of the program levels. Each subroutine program level is called from one, and only one, calling program level of the control program which may be a task program level or another sub-routine program level. Also, each subroutine program level defines a sub-process of the control program which is executed by the LCU 12 (FIG. 1) in the thread of the sub-process defined by the calling program level. Details related to calling a subroutine program level and returning from a subroutine program level are described in further detail below.

For each program level, a plurality of states associated with the program level are defined by the user. Each state assigns user specified values to user specified variables, thereby defining a state of operation of the system under the control of the control program. During execution of the control program by the LCU 12 (FIG. 1), there is always one state which is active in each program level, even though the active state may be an idle, or waiting, state. Each state must include at least one condition for transition from the corresponding state to a destination state. Transition from a source state to a destination state takes place during execution of the control program when the relevant user defined condition is satisfied. As further explained below, user defined conditions test the value of specified variables, and also specify a transition from a present state to a destination state if the condition is determined to be true. The starting point for the user in the programming process is at the first program level and first state of a control program.

In accordance with an addressing scheme of the programming process of the present invention, the user can use either an address or descriptive name to identify each program level, state, and condition. The programming process, when executed by the programming system 80 (FIG. 1) automatically generates an address for each new state and each new condition of the control program. Each program level is assigned a program level address, or program level number, X, by the user. The program level numbers, X, for a particular control program are user specified and need not be numbered sequentially. Each state of a particular program level is assigned a state number, Y, and therefore each state has a unique state address, X:Y. The state numbers, Y, are assigned sequentially to each state of a particular program level in the programming process as further explained below. Each condition of a particular state is assigned a condition number, Z, and therefore each condition has a condition address, X:Y:Z, where Z is a condition number of a condition in state Y and program level X. The condition numbers, Z, are assigned sequentially for each state Y of each program level X in accordance with the programming process. The address of each user defined program level, state, and condition is stored in the source file of the internal files 132 (FIG. 3A), and then passed to the LCU 12 (FIG. 1) via the compiler 136, data converter 164, and data loader 172 (FIG. 3A).

In accordance, with the present invention, as further described below, a user specified condition may specify the calling of a particular subroutine program level upon satisfaction of the specified condition. In defining this type of condition in a calling program level of the control program, the user is required to specify: a destination state address of a destination state residing in the subroutine program level; as well as a subroutine state address of a state residing in the calling to which the control program is to proceed after execution of the subroutine program level. Each subroutine program level must include at least one condition which, if determined to be true during execution of the control program, indicates a return to the calling program level associated with the subroutine program level.

Figure 18:
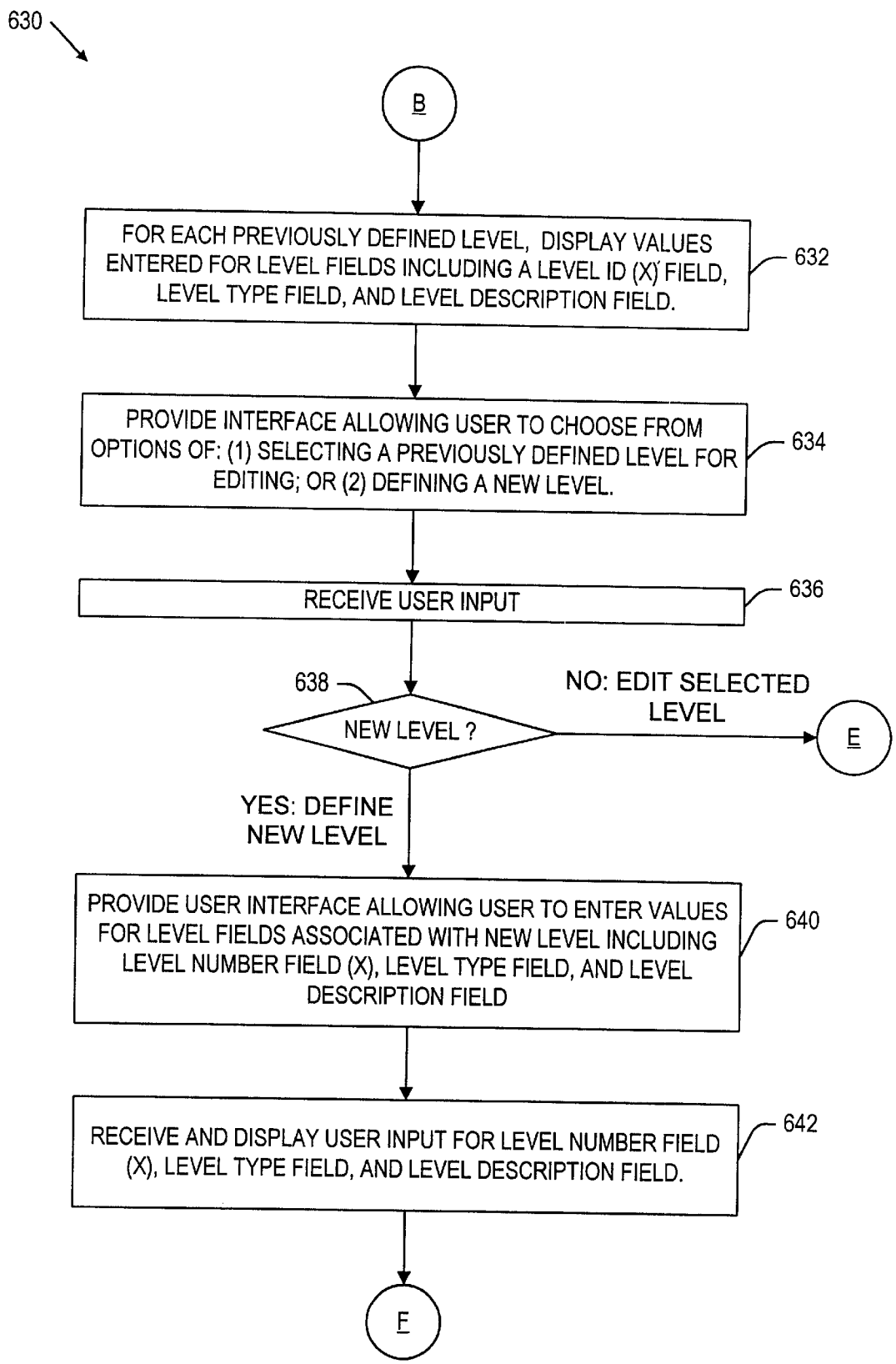
FIG. 18 is a flow diagram illustrating a sub-process for creating and editing program levels, states, and conditions of a user-specified control program in the programming process of the present invention.

FIG. 18 shows a flow diagram at 630 illustrating a sub-process for editing program levels, states, and conditions of a user specified control program created via the programming process of the present invention. The depicted process proceeds from "B" (from FIG. 5) to step 632 in which, for each previously defined program level, the programming system displays values entered for associated program level fields including a program level ID field which carries the user specified program level number, 'X', a program level type field which carries a value indicative of whether the corresponding program level is a task program level or a sub-routine program level, and a program level description field which carries a user specified character string descriptive of the function of the corresponding program level of the control program. In step 634, the programming system provides an interface allowing the user to choose from: a first option of selecting one of the previously defined program levels displayed in step 632, for editing; or a second option of defining a new program level.

In step 636, the programming system receives a user input based on the choices provided in step 634, after which the process proceeds to 638 at which it is determined whether the user has chosen the option of defining a new program level. If it is determined at 638 that the user has not chosen the option of defining a new program level, but rather has chosen the option of selecting a previously defined program level for editing, the depicted process proceeds to "E" (to FIG. 19) to execute a sub-process for editing a program level as further described below.

If it is determined at 638 that the user has chosen the option of defining a new program level, the depicted process proceeds to step 640 in which the programming system provides a user interface allowing the user to enter values for the program level fields associated with the new program level including the program level number field, program level description field, and program level type field. In step 642, the programming system receives and displays the user input for the program level number field, program level description field, and program level type field. After executing, step 642, the depicted process proceeds to "F" (to FIG. 20) to execute a state editing sub-process providing a user interface allowing the user to define states of the new program level as further described below.

Figure 19:
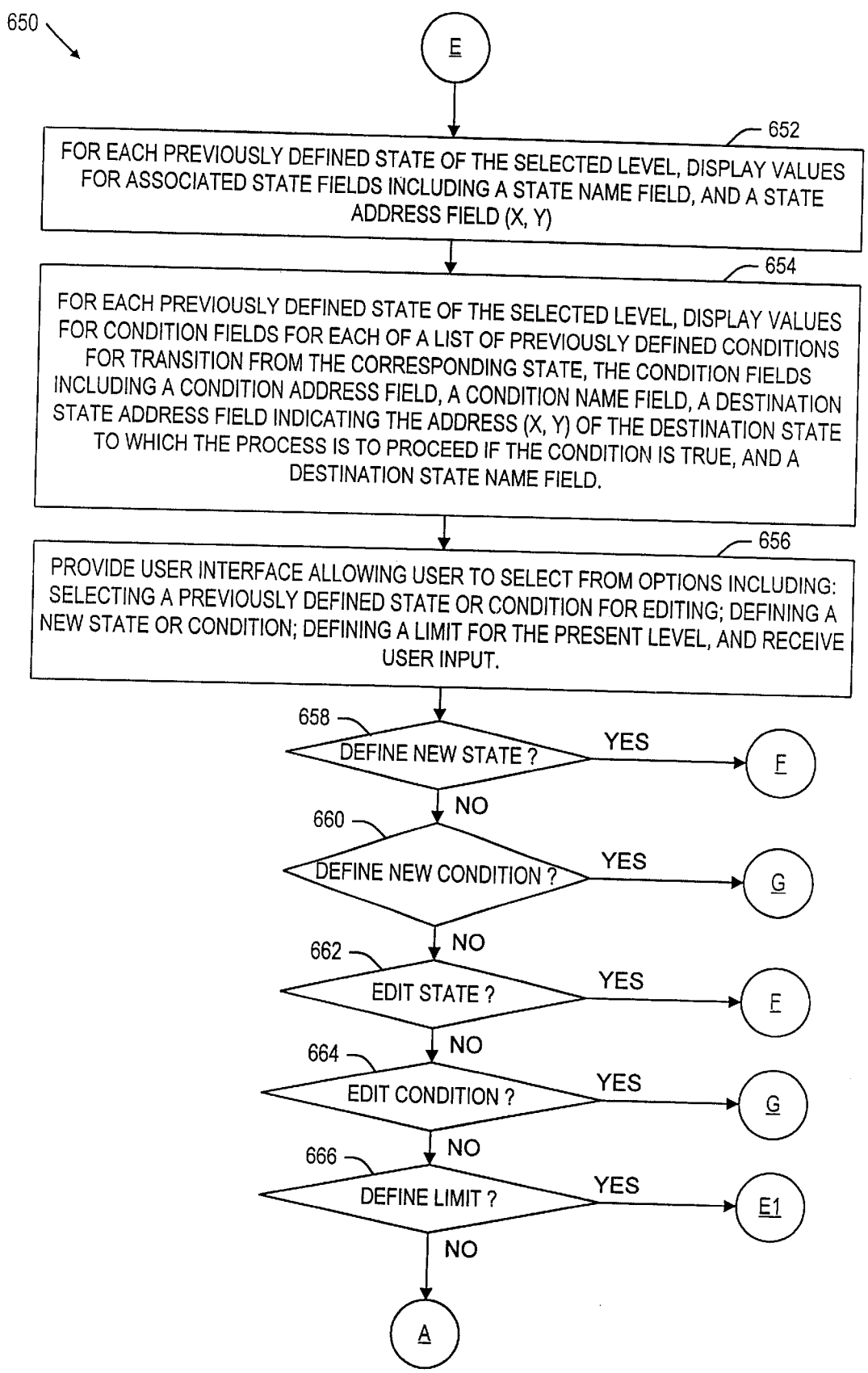
FIG. 19 is a flow diagram illustrating a program level editing sub-process for editing a selected program level of the control program.

FIG. 19 shows a flow diagram at 650 illustrating a program level editing sub-process for editing a previously defined program level. The depicted process proceeds from "E" (from FIG. 18) to step 652 in which, for each previously defined state of the program level selected for editing in step 636 (FIG. 18), the programming system displays associated values for state fields including a state name field, and a state address field which carries an associated state address X:Y. In the preferred embodiment, the user interface provided by the program level editing sub-process provides the user with an option to select a "MOVE" function allowing the user to rearrange the order of the states displayed in step 652.

In step 654, for each of the previously defined states of the selected program level, the programming system displays values for condition fields for each of a list of previously defined conditions for transition from the corresponding state. The condition fields include: a condition address field carrying a condition address (X:Y:Z) indicative of the corresponding condition; a condition name field carrying a user specified character string descriptive of the corresponding condition; a destination state address field carrying a user specified destination state address (X, Y) of a user specified destination state to which the process is to proceed if the corresponding condition is true; and a destination state name field carrying a user specified character string descriptive of the destination state.

In step 656, the programming process; provides an interface allowing the user to select from the options of defining a new state or a new condition, or selecting from the previously defined states and conditions of the program level selected in step 636 (FIG. 18); and receives a corresponding user input. After executing step 656, it is determined at 658 whether the user has selected the option of defining a new state, and if so, the depicted process proceeds to "F" (to FIG. 20) to execute a state editing sub-process providing a user interface allowing the user to define a new state as further described below. It is then determined at 660 whether the user has selected the option of defining a new condition, and if so, the depicted process proceeds to "G" (to FIG. 26) to execute a condition editing sub-process providing a user interface allowing the user to define a new condition as further explained below.

It is then determined at 662 whether the user has selected the option of editing a previously defined state, and if so, the depicted process proceeds to "F" (to FIG. 20) to execute the state editing sub-process to edit the state selected by the user in step 656. It is then determined at 664 whether the user has selected the option of editing a new condition, and if so, the depicted process proceeds to "G" (to FIG. 26) to execute the condition editing sub-process to edit the condition selected by the user in step 656. Finally, it is determined at 666 whether the user has selected the option of defining a limit for the present program level, and if so, the process proceeds to "E1" (to FIG. 25) to execute a limit defining process as described above.

Figure 20:
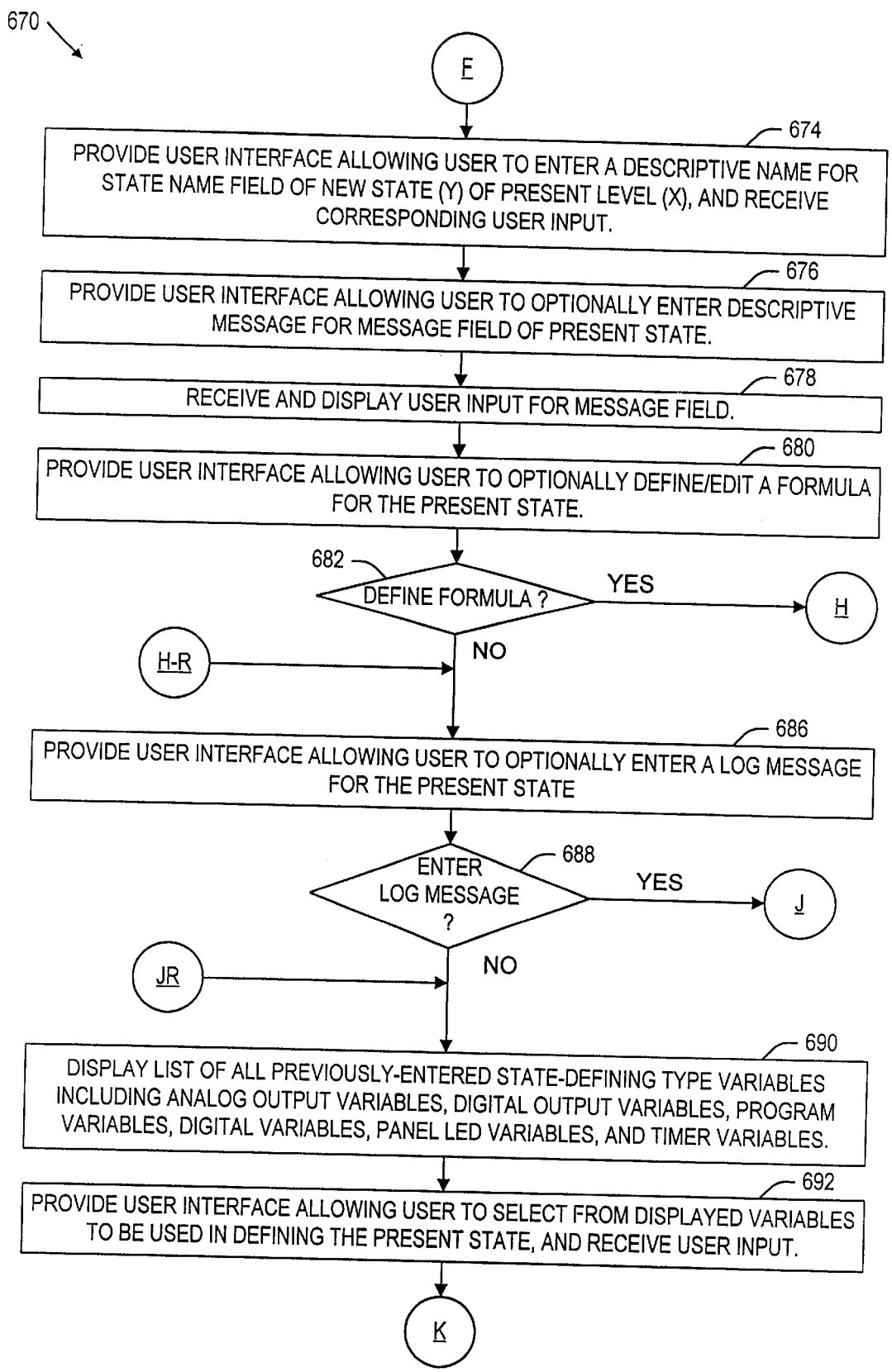
FIG. 20 is a flow diagram illustrating a state editing sub-process for implementing a user interface allowing the user to define and edit states of a program level of the control program.

FIG. 20 shows a flow diagram at 670 illustrating a state editing sub-process for implementing a user interface allowing the user to edit states of a present program level of the control program. In the preferred embodiment of the present invention, the state editing sub-process 670 is implemented using a windows type user interface which allows the user to select functions including save, delete, and cancel at any time during editing of the new/selected state of the control program. The save, delete, and cancel functions respectively allow for saving fields entered for a state, deleting a previously defined state of the control program, and canceling edits made to fields of a state. In the preferred embodiment, the user interface provides for: a first interface (e.g. a cursor location at which text may be entered) allowing the user to enter text only for a message; and a second interface means allowing the user to enter text and variables for the message as further described below.

The depicted process proceeds from "F" (from FIG. 19), and proceeds to step 674 in which the programming system: provides a user interface allowing the user to enter a descriptive name associated with the new/selected present state of the present program level; and receives the corresponding user input. If the present state is a previously defined state which has been selected to be edited, the programming system initially displays the previous entry for the name field. If the present state is a new state, the programming system initially displays no entry. In step 676, the programming system provides a user interface allowing the user to optionally enter a character string forming a descriptive message for a text only message field associated with the new/selected state. In step 678, the programming system receives and displays the user input for the message field.

In step 680, the programming system provides an interface allowing the user to optionally define/edit a formula for the new/selected state. From step 680, the process proceeds to 682 at which it is determined whether the user has selected the option of defining a formula for the present state. It fit is determined at 682 that a formula is to be defined, the depicted process proceeds to "H" (to FIG. 23) to execute a state formula editing process as described further below, after which the process proceeds to step 686. If it is determined at 682 that a formula is not to be defined, the depicted process proceeds directly to step 686 in which the programming system provides a user interface allowing the user to optionally enter a log message for the present state. It is then determined at 688 whether the user has selected the option of entering a log message, and if so, the depicted process proceeds to "J" (to FIG. 20) to execute a log message editing process as further described below, after which the process proceeds to step 690. If it is determined at 688 that the user has not selected the option of entering a log message, then the process proceeds directly from 688 to step 690.

In step 690, the programming system displays a list of all previously entered state-defining type variables including the analog output variables, digital output variables, program variables, digital variables, front panel LED variables, and timer variables. In the preferred embodiment, the user interface of the state editor provides the user with an option to select a view function allowing the user to display, in step 690, only those variables previously selected to be used in the present state. In the preferred embodiment, the user interface provided by the state editing sub-process provides the user with an option to select a "MOVE" function allowing the user to rearrange the order of the states displayed in step 654 (FIG. 19). In step 692, the programming system provides a user interface allowing the user to select from the variables displayed in step 690, after which the depicted process proceeds to "K" (to FIG. 21).

Figure 21:
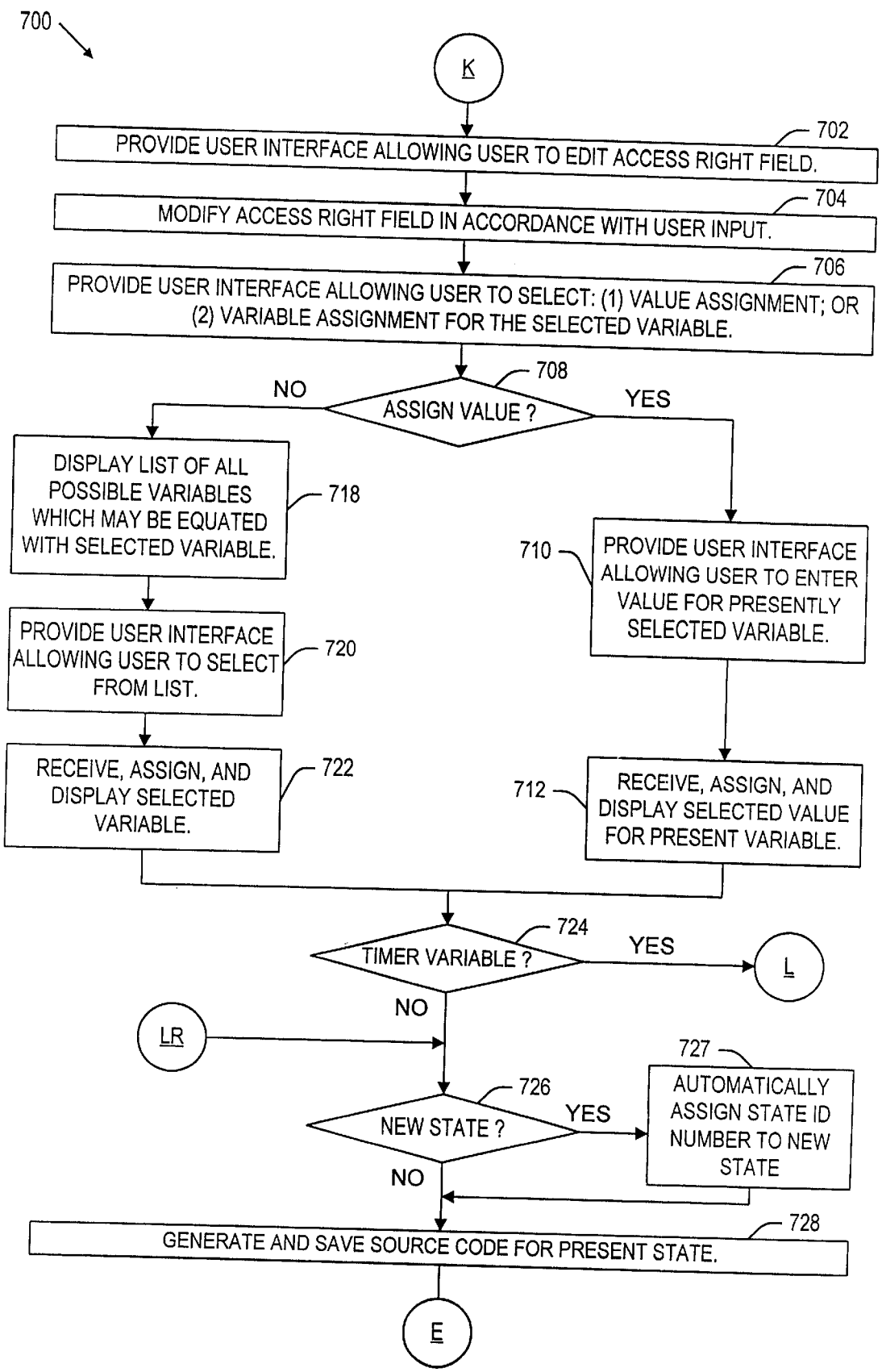
FIG. 21 is a flow diagram illustrating steps of the state editing sub-process for implementing a user interface allowing the user to define values to be assigned to selected variables upon transition to a particular state of the control program.

FIG. 21 shows a flow diagram at 700 illustrating further steps of the state editing sub-process illustrated in FIG. 20. The depicted steps allow the user to define and edit values to be assumed by selected variables upon transition of the control program to the present state during execution of the control program. The depicted process proceeds from "K" (from FIG. 20) to step 702 in which the programming system: provides a user interface allowing the user to over-ride the default value entered for the access right field of the variable selected in step 686 (FIG. 20); and receives a corresponding user input. For example, the default value previously entered for an access right field of a particular variable may be read only. Step 702 allows the user to configure the logic control unit 12 (FIG. 1) such that this particular variable is accessible from the end user GUI 65 (FIG. 1) as a read/write variable while the control program is operating in the state presently being edited. The depicted process proceeds from step 702 to step 704 in which the programming system modifies the access right field in accordance with the user input received in step 702.

In step 706, the programming system provides a user interface allowing the user to select from the options of: (1) assigning a value to the selected variable; or (2) assigning another variable to the variable selected in step 692 (FIG. 20). The process proceeds from step 706 to 708 at which the programming system determines whether the user has selected the option of assigning a value to the selected variable. If the user has selected the option of assigning a value to the selected variable, the depicted process proceeds to execute steps 710 and 712 in which the programming system: provides a user interface allowing the user to enter a value for the selected variable; and receives, assigns, and displays the entered value.

If it is determined at 708 that the user has selected the option of assigning another variable to the present selected variable, the depicted process proceeds to step 718 in which the programming system displays a list of all possible variables which may be assigned to the present variable selected in step 692 (FIG. 20). The present variable may be assigned the value of any other variable for which the same type of data field (i.e., long value, floating point value, and digital value) is to be allocated by the LCU 12 (FIG. 1) during execution of the control program. Additionally, a long value type variable may be assigned the value of a floating point type variable, and vice versa. In step 720, the programming system provides a user interface allowing the user to select from the list of variables displayed in step 718. In step 722, the programming system receives, assigns, and displays the variable selected to be assigned to the present variable selected in step 692 (FIG. 20).

The depicted process proceeds from step 722 to 724 at which it is determined whether a timer variable has been selected in step 692 (FIG. 20) for the present state. If it is determined at 724 that a timer variable has been selected in step 692 (FIG. 20) to be used in defining the present state, the process proceeds to "L" (to FIG. 22) to execute a sub-process of configuring control of a timer associated with the present timer variable, after which the process proceeds to 726. If it is determined at 724 that a timer variable has not been selected in step 692 (FIG. 20), the process proceeds from 724 directly to 726 at which it is determined whether the present state is a new state or a previously defined state.

If it is determined at 726 that the present state is a new state, the process proceeds to 727 in which the programming system automatically assigns a state number, Y, to the state number field of the present state, after which the process proceeds to step 728 in which the programming system generates and saves source code for the present state based on the user input described above. If it is determined at 726 that the present state is not a new state, but is rather a previously defined state, the process proceeds directly from 726 to execute step 728 as described above.

Figure 22:
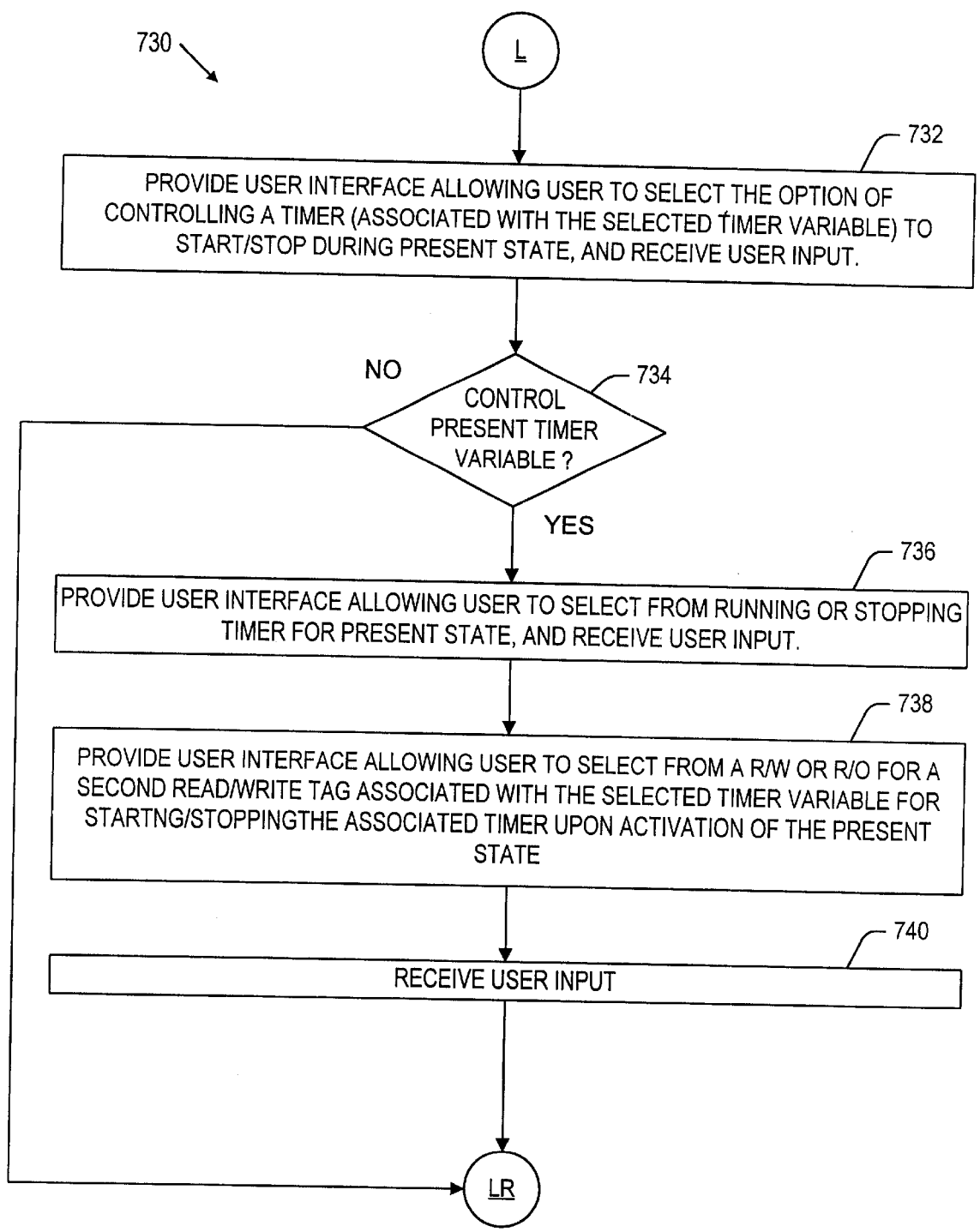
FIG. 22 is a flow diagram illustrating steps of the programming process for implementing a user interface allowing the user to configure a timer, associated with a timer variable, to run or stop while the control program operates in a particular state.

FIG. 22 shows a flow diagram at 730 illustrating a timer configuring sub-process of the programming process for configuring the control of a timer associated with the timer variable selected in step 692 (FIG. 20) for use in the present state of the control program. The depicted process proceeds from "L" (from FIG. 21) to step 732 in which the programming system provides a user interface allowing the user to select the option of controlling a timer, associated with the timer variable selected in step 692 (FIG. 20), to start or stop upon activation of the present state. From step 732, the process proceeds to 734 at which the programming system determines whether the user has selected the option of controlling the timer, associated with the present timer variable, to run/stop during the present state, and if so, the process proceeds to step 736. Otherwise, the process proceeds directly to "LR" (to FIG. 21) to resume editing of the present state.

In step 736, the programming system provides a user interface allowing the user to select from the options of running, or stopping the timer associated with the present timer variable upon activation of the present state during execution of the control program by the LCU 12 (FIG. 1). Each timer variable has a timer start/stop field associated with it. In step 738, the programming system provides a use interface allowing the user to select from read/write (R/W) or read only (R/O) for a second access right field associated with the selected timer variable, and also associated with the present state. In step 738, the programming system receives user input corresponding with the user interface provided in step 738. For example, if the user selects "running " the timer associated with the present timer variable during the present state, and also selects read/write for the second access right field associated with the present timer variable, then the end user may overwrite the timer start/stop field to stop the timer associated with the present timer variable upon activation of the present state. From step 740, process proceeds to "LR" as described above.

Figure 23:
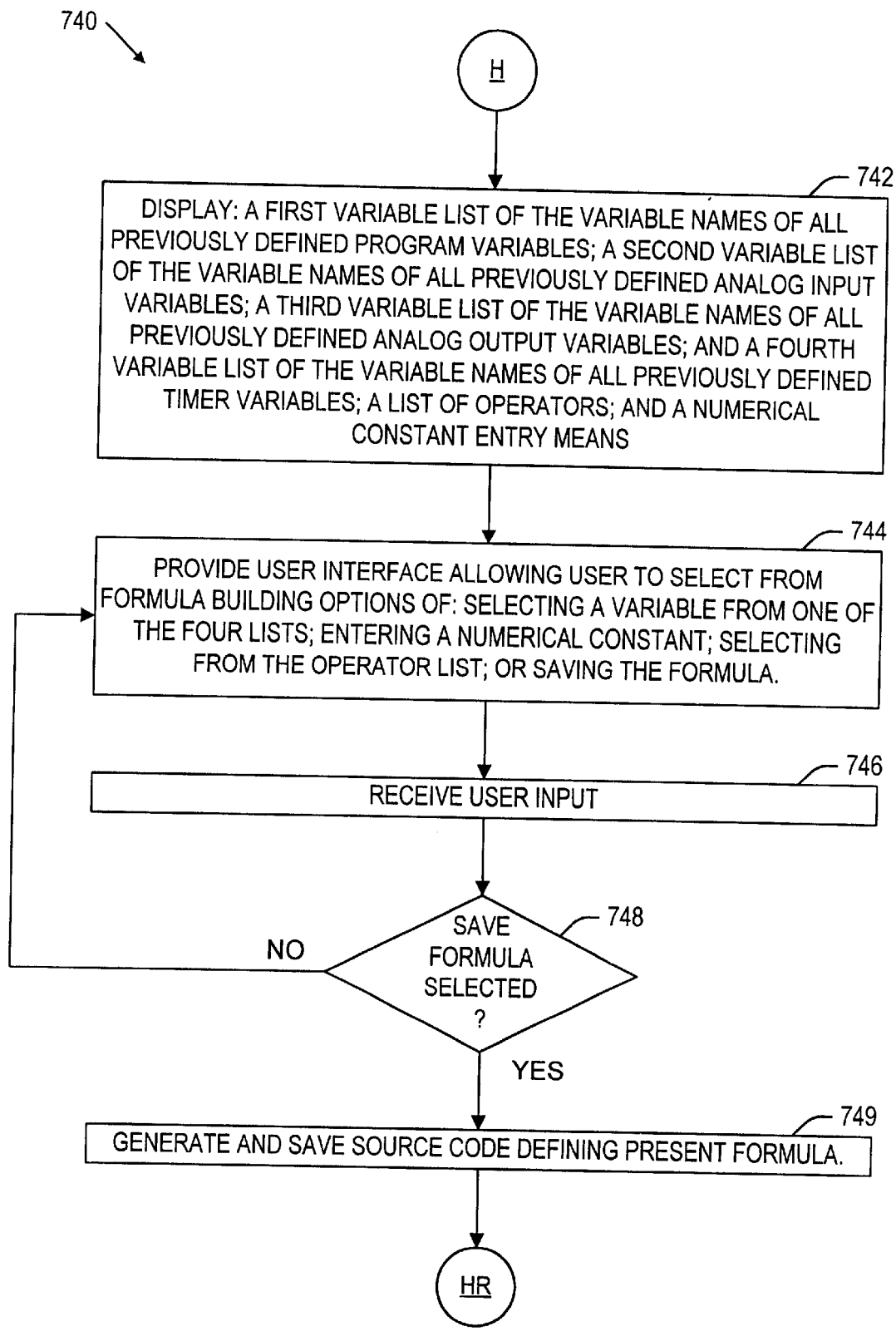
FIG. 23 is a flow diagram illustrating a sub-process for implementing a user interface allowing the user to define a formula associated with a state of the control program.

FIG. 23 shows a flow diagram at 740 illustrating a formula editing sub-process for implementing a user interface allowing the user to define a formula associated with a state of the control program. In the preferred embodiment of the present invention, the formula editing process is implemented using a windows type user interface which allows the user to select functions including save, delete, and cancel at any time during the variable editing sub-process. The save, delete, and cancel functions respectively allow for saving fields entered for a formula, deleting a previously defined formula, and canceling edits made to fields of a formula.

The depicted process proceeds from "H" (from FIG. 20), and proceeds to step 742 in which the programming system displays: a first variable list of the variable names of all previously defined program variables; a second variable list of the variable names of all previously defined analog input variables; a third variable list of the variable names of all previously defined analog output variables; a fourth variable list of the variable names of all previously defined timer variables; a list of operators; and a numerical constant entry means (i.e., a cursor location at which numbers may be entered via the keyboard). In a preferred embodiment, the list of operators includes the mathematical operators: add, subtract, multiply, divide, equals, greater of, and least of, The depicted process proceeds from step 742 to step 744 in which the programming system provides a user interface allowing the user to select from formula building options including: selecting a variable from one of the four lists displayed in step 742; entering a numerical constant (including fractional numbers) using the entry means provided in step 742; selecting from the list of operators; or saving the formula. The process proceeds from step 744 to step 746 in which the programming system receives the user input via the interface provided in step 744. It is then determined at 748 whether the user has selected the option of saving the formula, and if so, the process proceeds to "HR" (to FIG. 20) to resume editing of the present state. If it is determined at 748 that the user has selected an option other than saving the formula via the interface provided in step 744, the depicted process executes steps 744 and 746 allowing further editing of the present formula for the present state until the user selects the option of saving the formula in step 746, after which the process proceeds to step 749. In step 749, the programming system generates source code defining the present formula, and saves the present formula to the source file of the internal files 132 (FIG. 3A). From step 749, depicted process proceeds to "HR" (to FIG. 20) to resume editing the present state.

Figure 24:
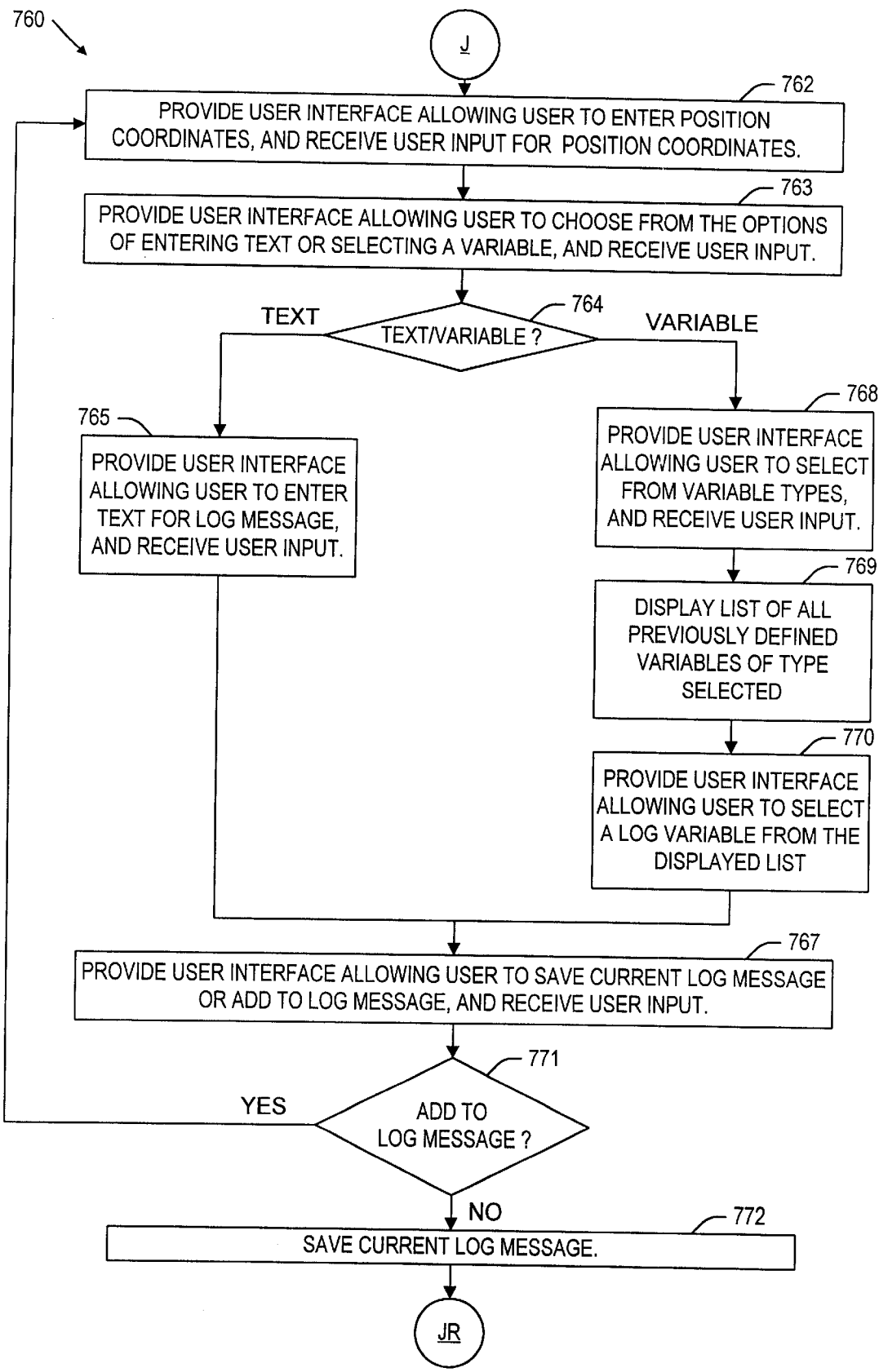
FIG. 24 is a flow diagram illustrating steps of the programming process for implementing a user interlace allowing a user to enter a log message associated with a state of the control program.

FIG. 24 shows a flow diagram at 760 illustrating steps of a log message editing sub-process for implementing a user interface allowing a user to edit a log message associated with a particular state of the control program. The depicted process proceeds from "J" (from FIG. 20), and proceeds to step 762 in which the programming system: provides a user interface allowing the user to enter position coordinates for display of a log message; and receives user input for the position coordinates. File position coordinates are indicative of a position on the LCD 56 of the end user front panel 50 (FIG. 1) at which the present log message is to be displayed during execution of the control program by the LCU 12 (FIG. 1). Log messages may also be displayed via the graphics display unit 74 (FIG. 1) of the end user GUI 65. In step 763, the programming system: provides a user interface allowing the user to select from the options of entering text for the log message, or selecting a variable to be displayed as part of the log message for the present state; and receives a corresponding user input. From step 763, the depicted process proceeds to 764 at which the programming system determines whether the user has selected the option of entering text, or the option of selecting a variable. If it is determined at 764 that the user has selected the option of entering text, the depicted process proceeds to step 765 in which the programming system: provides a user interface allowing the user to enter text for the log message; and receives use input. From step 765, the process proceeds to step 767 in which the programming system: provides a user interface allowing the user to either save the current log message, or add additional text or variables to the current log message; and receives a corresponding user input.

If it is determined at 764 that the user has chosen the option of selecting a variable to be displayed with the log message, the depicted process proceeds from 764 to step 768 in which the programming system: provides a user interface allowing the user to select one from a list of the variable types including analog input variables, analog output variables, digital input variables, digital output variables, program variables, digital variables, panel LED variables, panel switch variables, time variables, and PID variables; and receives a corresponding user input indicating a selected variable type. In step 769, the programming process displays a list of all previously defined variables of the type selected by the user in step 768. In step 770, the programming system provides a user interface allowing the user to select a log variable from the list displayed in step 769. The depicted process proceeds from step 770 to execute step 767 as described above.

From step 767, the depicted process proceeds to step 771 in which it is determined whether the user has chosen the option of selecting an additional log variable or text string, and if so, the depicted process repeats steps 763, 764, 765, 767, 769, and 770 until the user selects the option of saving the current log message in step 767. If it is determined at 767 that the user has selected the option of saving the current log message, the process proceeds to step 772 in which the programming system generates source code representing the present log message, and saves the present lot message to the source file of the internal files 132 (FIG. 3A), after which the process proceeds to "JR" (to FIG. 20) to resume editing of the present state.

Figure 25:
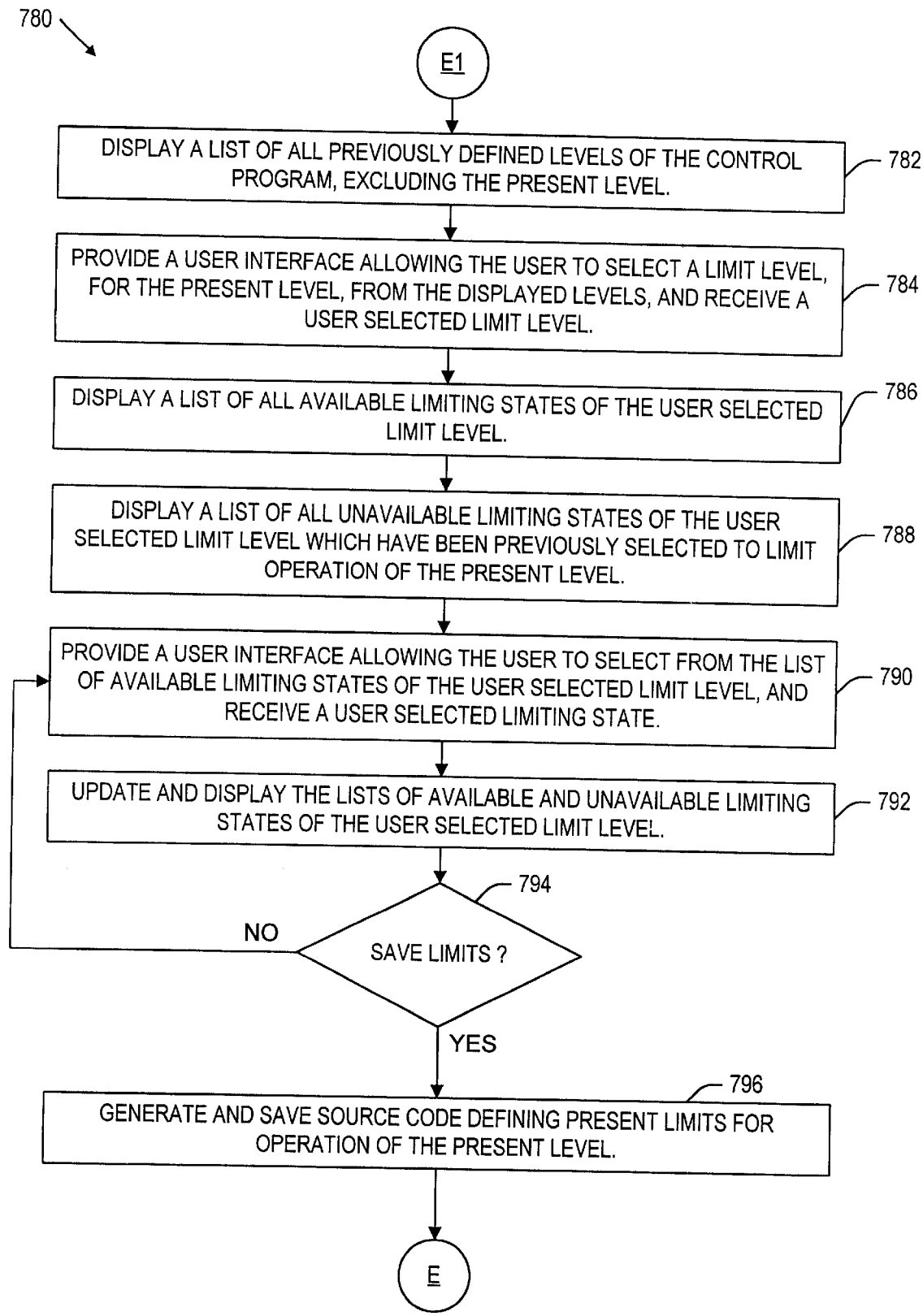
FIG. 25 is a flow diagram illustrating a limit editing sub-process for implementing a user interface allowing the user to define limits for a program level of the control program.

FIG. 25 shows a flow diagram at 780 illustrating a process for implementing a user interface allowing the user to define limits for the present program level of the control program. The depicted process proceeds from "E1" (from FIG. 19) and proceeds to step 782 in which the programming system displays a list of all previously defined program levels of the control program, excluding the present program level. From step 782, the process proceeds to step 784 in which the programming system: provides a user interface allowing the user to select a limit program level for the present program level from the program levels displayed in step 782; and receives a user selected limit program level. In step 786, the programming system displays a list of all "available" limiting states of the user selected limit program level, the available states being those states not previously selected as limiting states for limiting operation of the present program level. In step 788, the programming system displays a list of all "unavailable" limiting states of the user selected limit program level, the unavailable limiting states being those which have been previously selected to limit operation of the present program level.

In step 790, the programming system: provides a user interface allowing the user to select from the list of available limiting states of the user selected limit program level; and receives a user selected limiting state. In step 792, the programming system updates and displays the lists of available and unavailable limiting states of the user selected limit program level. From step 792, the process proceeds to 794 at which the programming system determines whether the user has selected the option of saving the limits defined for the present program level, and if so, the process proceeds to step 796 in which the programming system generates and saves source code defining present limits for operation of the present program level. From step 796, the process proceeds to "E" (to FIG. 19) to continue editing of the present program level. If it is determined at 794 that the user has not selected the option of saving the limits for the present program level, the process proceeds to re-execute steps 790 and 792 allowing the user to define further limiting states of the user selected limit program level, until the user selects the option of saving the limits, after which the process executes step 796 as described above.

When a control program includes a limit for a particular program level, the limit being defined using a limiting state of a limit program level, then the LCU 12 (FIG. 1) executing the control program will activate the particular program level to run only when the corresponding limit program level is currently activated to run in the corresponding limiting state.

Figure 26:
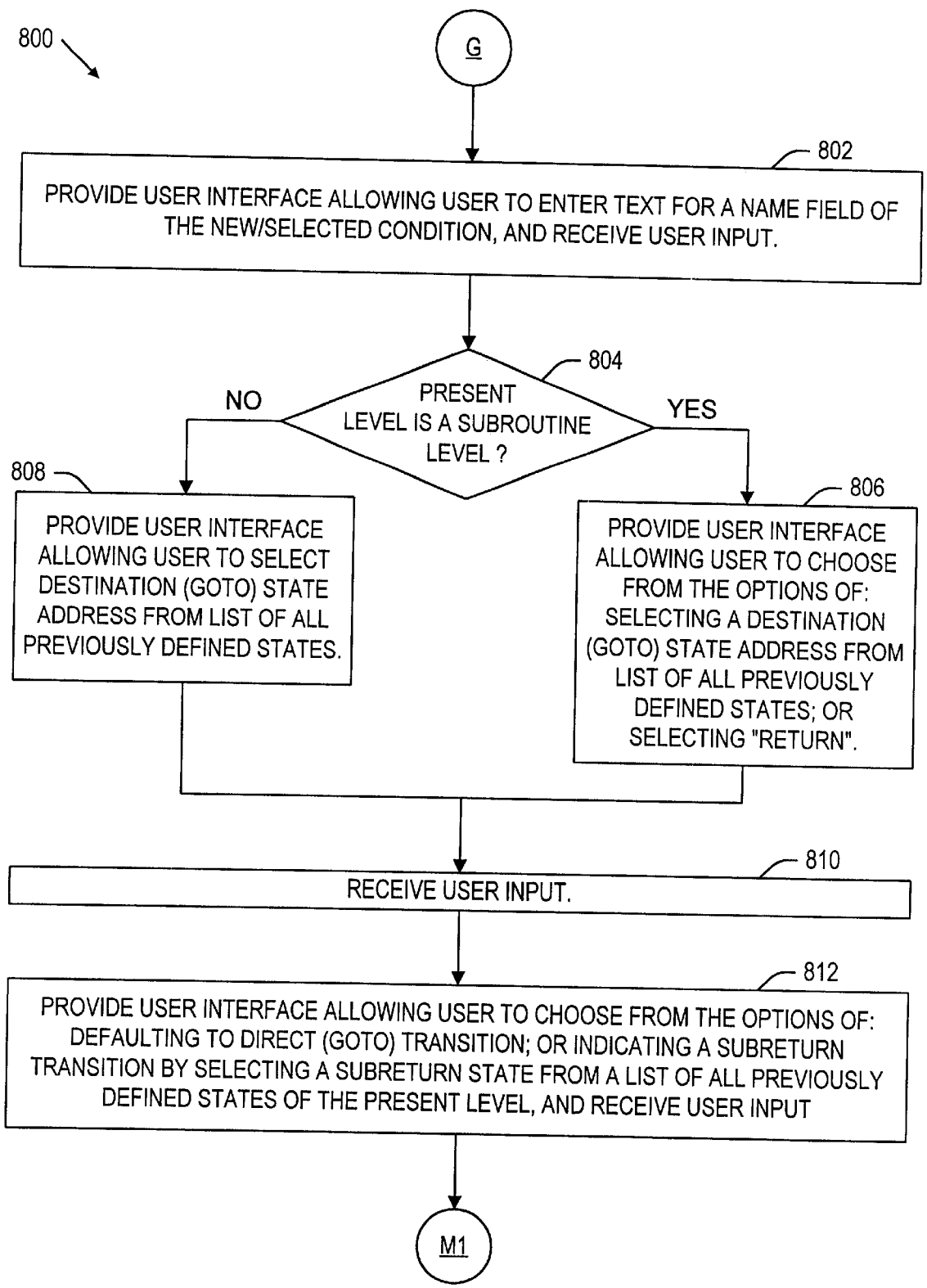
FIG. 26 is a flow diagram illustrating a condition editing process for implementing a user interface allowing, a user to define and edit conditions for transition of the control program from one state to another.

FIG. 26 shows a flow diagram at 800 illustrating a condition editing sub-process for implementing a user interface allowing the user to define and edit conditions of the present state and program level. The depicted process proceeds from "G" (from FIG. 19), and proceeds to step 802 in which the programming system: provides a user interface allowing the user to enter text for a condition name field of the new/selected condition; and receives a corresponding user input.

As mentioned above, a subroutine call condition specifies the calling of a particular subroutine program level upon satisfaction of the terms of the condition. In defining a subroutine call condition, the user is required to specify: a destination state address of a destination state residing in the subroutine program level; as well as a return state address of a return state residing in the calling program level to which the control program is to proceed after execution of the specified subroutine program level. Each subroutine program level must include at least one condition which, if determined to be true during execution of the control program, indicates a "RETURN" to the calling program level associated with the subroutine program level. Because conditions associated with a state of a subroutine program level may specify a "RETURN" to the calling program level while conditions associated with a state of a task program level do not, the condition editing sub-process varies dependent upon whether the present program level is a subroutine program level or a task program level.

The process proceeds from step 802 to 804 at which it is determined whether the present program level is a subroutine program level. If it is determined at 804 that the present program level is a subroutine program level, the depicted process proceeds to step 806 in which the programming system provides a user interface allowing the user to choose from the options of: selecting a destination state address (X:Y) from a list of all previously defined states in all program levels of the control program; or selecting "RETURN". From step 806, the depicted process proceeds to step 810 in which the programming system receives the corresponding user input.

If it is determined at 804 that the present program level is not a subroutine program level, the depicted process proceeds to step 808 in which the programming system provides a user interface allowing the user to select a destination state address (X:Y) from a list of all previously defined states in all program levels of the control program. From step 808, the depicted process proceeds to step 810 in which the programming system receives the corresponding user input.

In step 812 the programming system: provides a user interface allowing the user to select from the options of deflating to direct, or go to type transition (as opposed to a subroutine type transition), or indicating a call transition by selecting a return state address (X:Y) of a state from a list of all previously defined states of the present program level; and receives a corresponding user input. From step 812, the depicted process proceeds to "M1" (to FIG. 27). In the preferred embodiment, the use interface includes a pull down window labeled "SUB-RETURN" which, when clicked on, displays a list of all previously defined states of the present program level, and allows the user to select the return state from those displayed.

Figure 27:
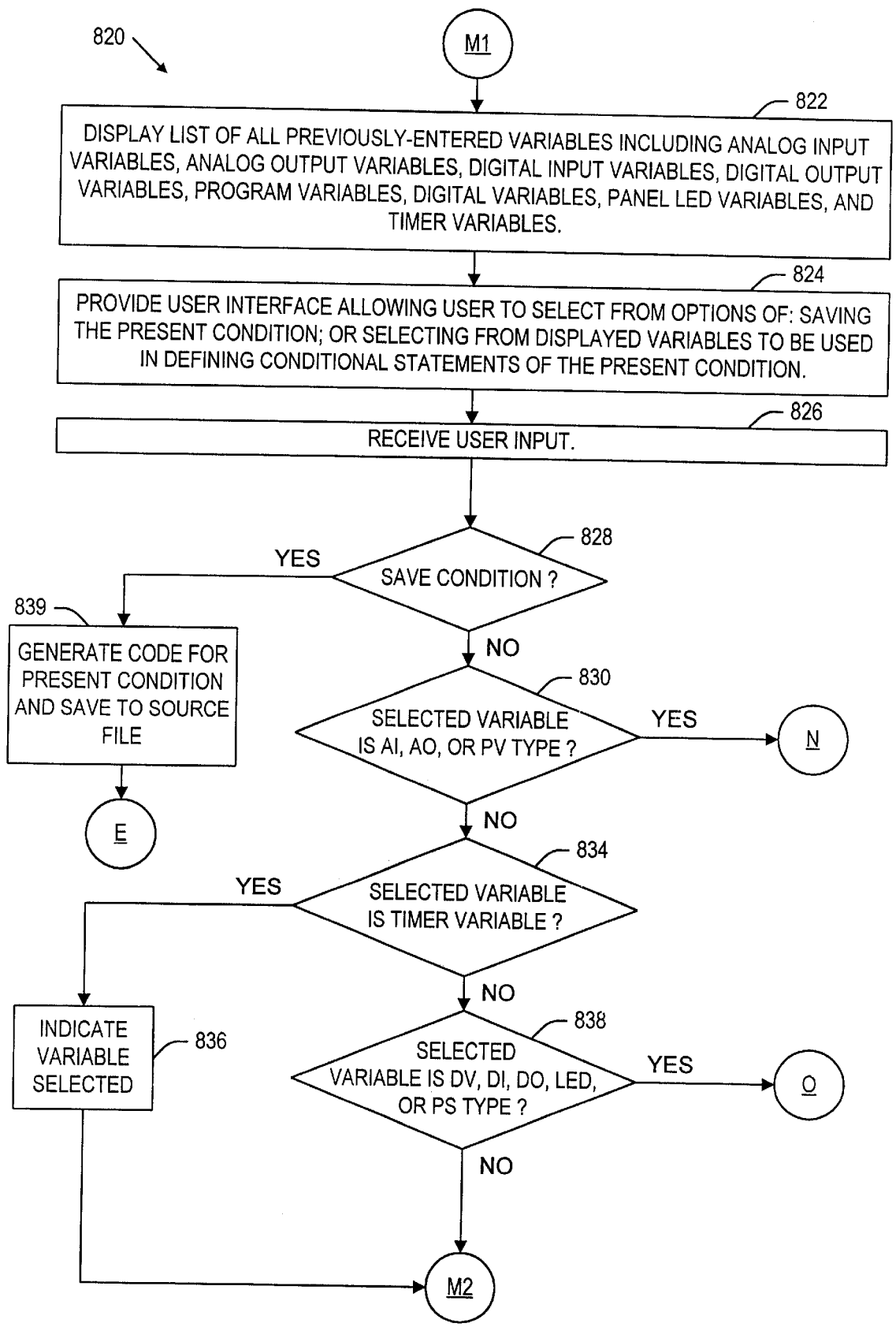
FIG. 27 is a flow diagram illustrating further steps of the condition editing process of FIG. 25.

FIG. 27 shows a flow diagram at 820 illustrating further steps of the condition editing sub-process process of FIG. 26. The depicted process proceeds from "M1" (from FIG. 26), and proceeds to step 822 in which the programming system displays a list of all previously entered variables including analog input variables, analog output variables, digital input variables, digital output variables, programing variables, digital variables, front panel LED variables, timer variables, and PID variables. In step 824, the programming system provides a user interface allowing the user to select from the options of: saving the present condition; or selecting from displayed variables to be used in defining condition statements of the present condition. In step 826, the programming system receives a user input based on the options provided in step 824. It is then determined at 828 whether the user has selected the option of saving the present condition.

If it is determined at 828 that the user has not selected the option of saving the present condition, the process then determines at 830 whether the user has chosen the option of selecting one of the variables from the variable types including analog input variables, analog output variables, or program variables, and if so, the process proceeds to "N" (to FIG. 29) to implement a sub-process, after which the process proceeds to 834. If it is determined at 830 that the user has not selected one of the analog input variables, analog output variables, or program variables, the process proceeds directly to 834.

Figure 28:
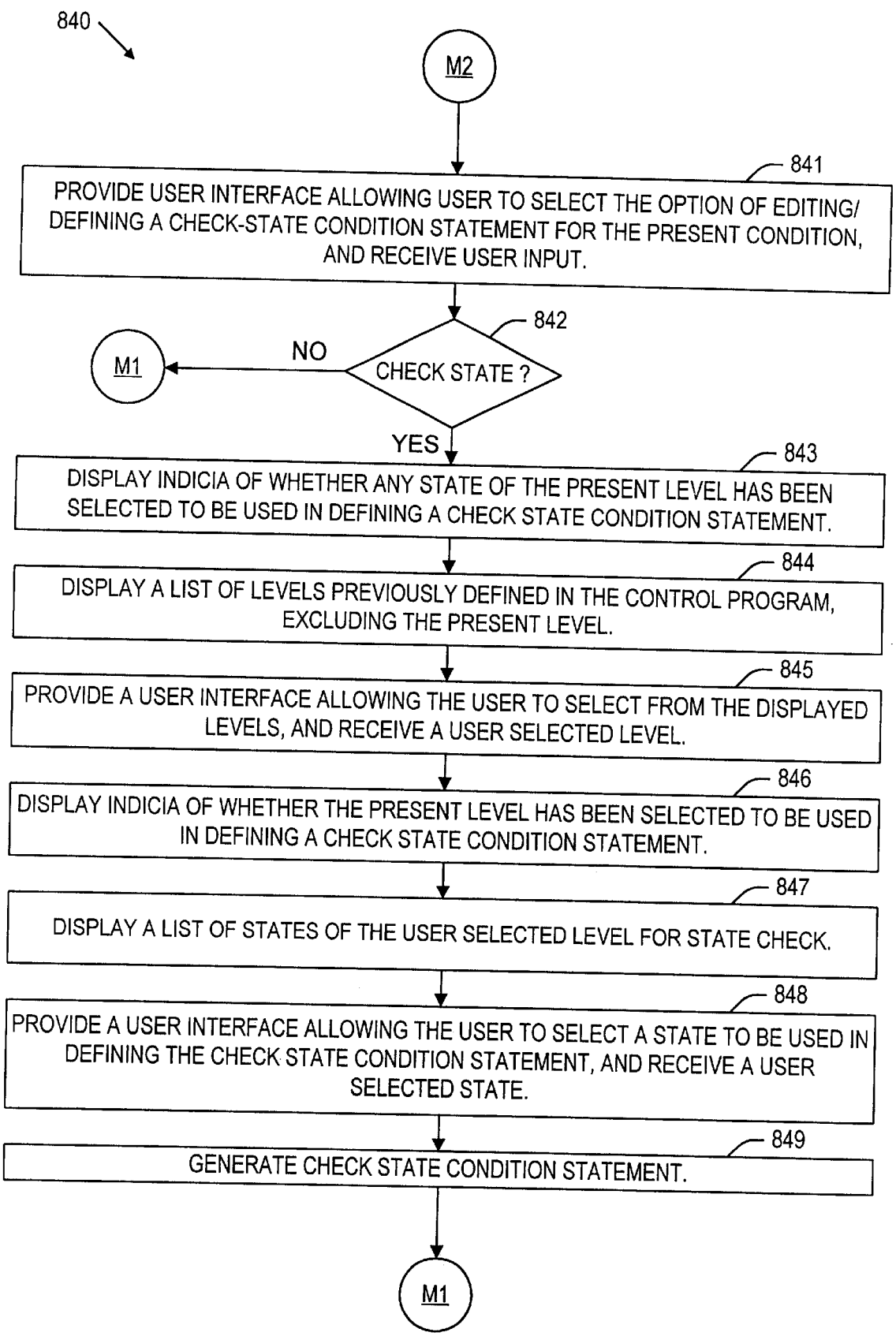
FIG. 28 is a flow diagram illustrating a sub-process of the condition editing process of FIG. 25 for generating a check-state condition statement which is a function of the present active state of a program level other than the present program level.

It is then determined at 834 whether the user has chosen the option of selecting a timer variable, and if so, the process proceeds to step 836 in which the programming system indicates the name and ID value of the timer variable selected, after which the process proceeds to "M2" (to FIG. 28). If it is determined at 834 that the user has not selected a timer variable, the depicted process proceeds to determine at 838 whether the user has selected a variable from the variable types including the digital variables, digital input variables, digital output variables, front panel LED variables, or panel switch variables, and if so the process proceeds to "O" (to FIG. 32). If it is determined at 828 that the user has selected the option of saving the present condition in step 826, the process proceeds to step 840 in which the programming system generates source code defining the present condition, and saves the present condition to the source file of the internal files 132 (FIG. 3A).

FIG. 28 shows a flow diagram at 840 illustrating a sub-process for defining check-state condition statements. The depicted process proceeds from "M2" (from FIG. 27), and proceeds to step 841 in which the programming system: provides a user interface allowing the user to select the option of editing/defining a check-state condition statement for the present condition; and receives a user input. The process proceeds from step 841 to 842 at which the programming system determines whether the user has selected the option of editing or defining a check-state condition statement. If it is determined at 842 that the user has not selected the option of editing a check-state condition statement, the process proceeds directly to "M1" (to FIG. 27).

If it is determined at 842 that the user has selected the option of editing a check-state condition statement for the present condition, the process proceeds to step 843 in which the programming system displays indicia of whether any state of the present program level has been selected to be used in defining a check-state condition statement. In step 844, the programming system displays a list of program levels previously defined in the control program, excluding the present program level. In step 845, the programming system: provides a user interface allowing the user to select from the program levels displayed in step 844; and receives a user selected program level for defining a check-state condition statement. In step 846, the programming system displays indicia of whether the present state has been selected to be used in defining a check-state condition statement. In step 847, the system displays a list of states of the user selected program level for editing/defining a check-state condition statement. In step 848, the system: provides a user interface allowing the user to select a state to be used in defining a check-state condition statement; and receives a user selected state. In step 849, the programming system generates a check-state condition statement based on the user selected state received in step 848. The check-state condition statement specifies a criterion that the user selected state must be active, or running for the present condition to be true.

In the preferred embodiment of the present invention, the above described steps of the condition editing sub-process 800 are implemented using a windows type user interface which allows the user to select functions including save, delete, and cancel at any time during editing of the conditions of the control program. The save, delete, and cancel functions respectively allow for saving fields entered for conditions, deleting previously defined conditions of the control program and canceling edits made to fields of a condition. Also, the user interface of the condition editor provides the user with an option to select a move function allowing the user to rearrange the order of the conditions displayed in step 654 (FIG. 19), and the order of the variables displayed in step 822 (FIG. 27). Further, the user interface of the state editor provides the user with an option to select a view function allowing the user to display, in step 822 (FIG. 20), only those variables previously selected for use in the present condition.

Figure 29:
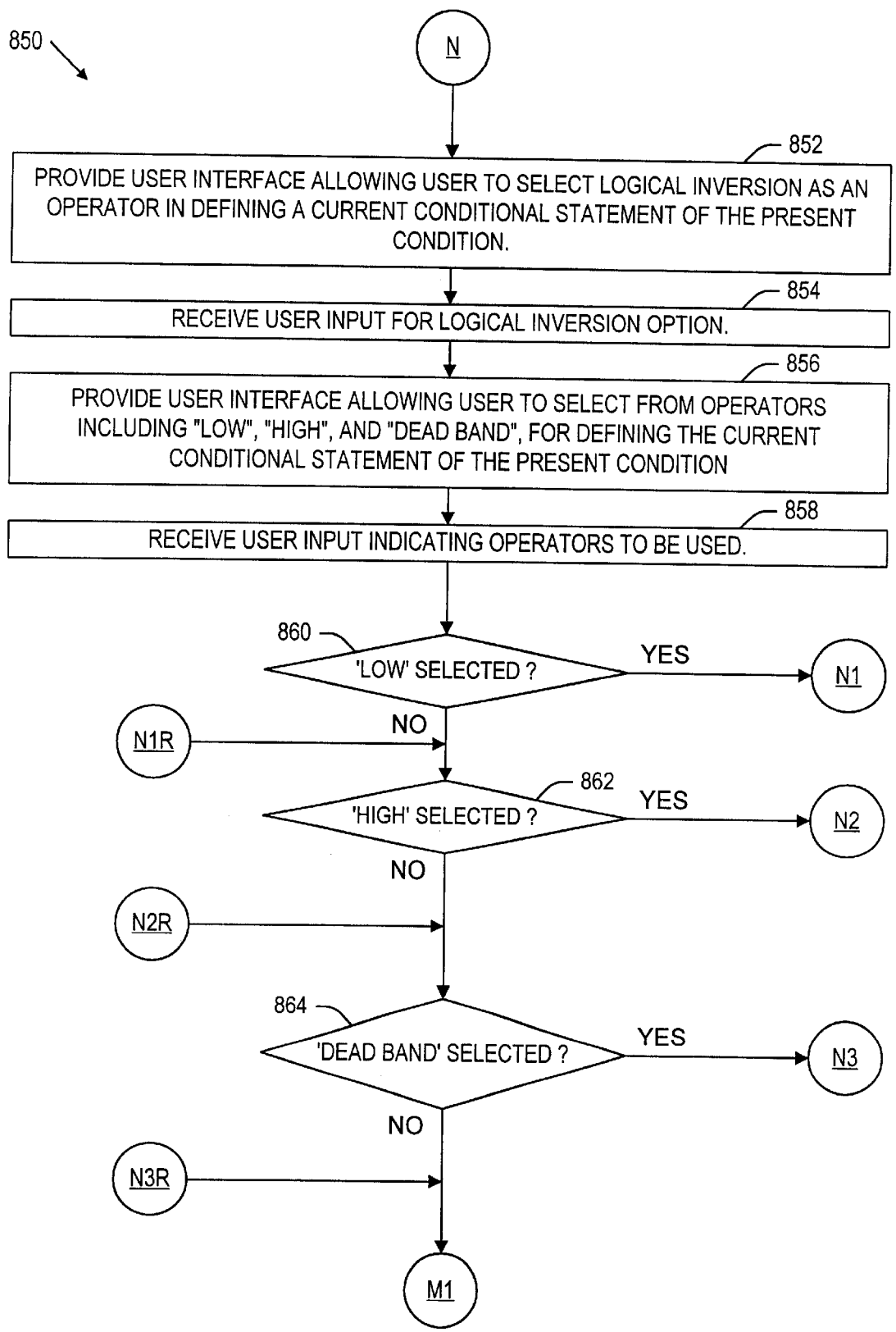
FIG. 29 is a flow diagram illustrating a sub-process of the condition editing process for generating a condition statement which is a function of the present value of an analog input variable, analog output variable, or program variable.

FIG. 29 shows a flow diagram at 850 illustrating steps of the condition editing sub-process process for conditioning a state transition on the present value of an analog input variable, analog output variable, or program variable. The process proceeds from "N" (from FIG. 27), and proceeds to step 852 in which the user is provided with an interface allowing the user to select logical inversion as an operator in defining a current condition statement of the present condition. The logical inversion option, if selected, provides for logical inversion of the value of the variable selected in step 824 (FIG. 27) for purposes of defining a present condition statement for the present condition. In step 854, the programming system receives a user input for the logical inversion option. In step 856, the user is provided with an interface allowing the user to select from operators including "LOW", "HIGH", and "DEAD BAND", for defining the current condition statement of the present condition. In step 858, the programming system receives a corresponding user input It is then determined at 860 whether the user has selected the "LOW" operator, and if so, the process proceeds to "N1" (to FIG. 30A) to implement a "less than" condition statement editing sub-process, further described below, after which the process proceeds to 862. If it is determined at 860 that the user has not selected the "LOW" operator, the process proceeds directly to 862 to determine whether the user has selected the "HIGH" operator. If it is determined at 862 that the user has selected the "HIGH" operator, the process proceeds to "N2" (to FIG. 30B) to implement a "greater than" condition statement editing sub-process, further described below, after which the process proceeds to 864. If it is determined at 862 that the user has not selected the "HIGH" operator, the process proceeds directly to 864 to determine whether the user has selected the "DEAD BAND" operator.

If it is determined at 864 that the user has selected the "DEAD BAND" operator, the process proceeds to "N3" (to FIG. 31) to implement a dead band condition statement editing sub-process, further described below, after which the process proceeds to "M1" (to FIG. 27). If it is determined at 860, 862, and 864 that the user has not selected any of the options, the process proceeds back to "M1" (to FIG. 27).

Figure 30A:
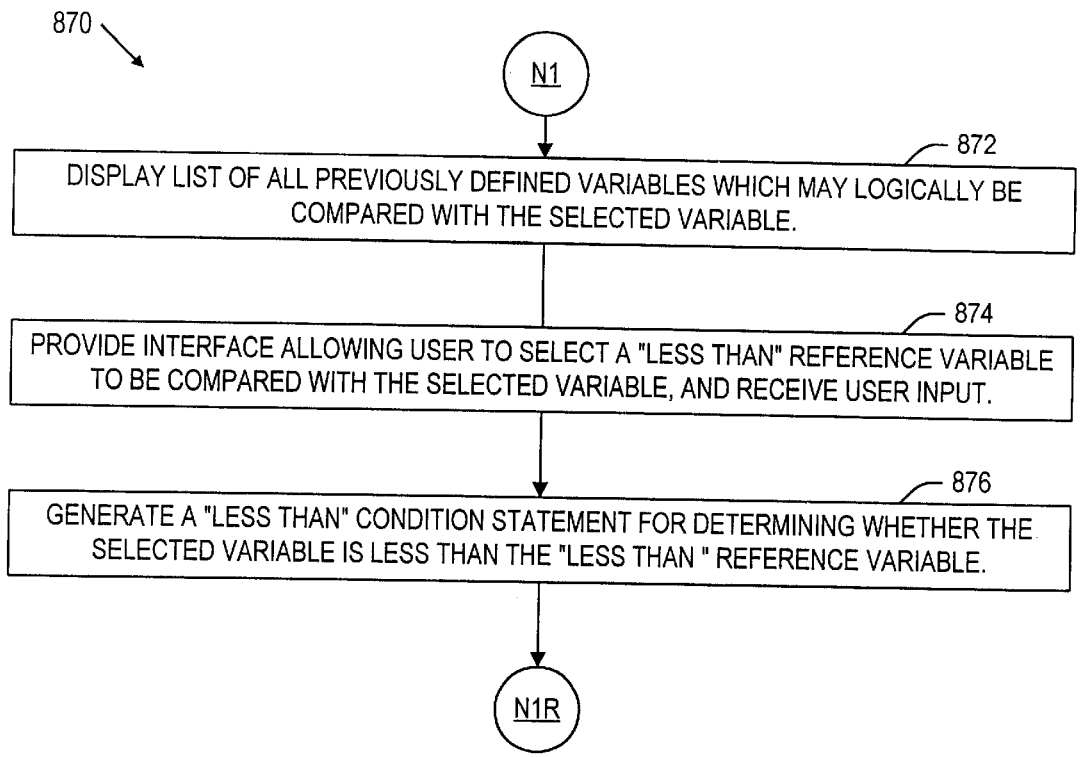
FIGS. 30A, 30B and 31 are flow diagrams illustrating sub-processes of the condition editing process for generating various types of condition statements which are functions of the current values of an analog input variable, analog output variable, or digital variable.

FIG. 30A shows a flow diagram at 870 illustrating a "less than" condition statement editing sub-process of the process 850 (FIG. 8) for conditioning a state transition on the current value of an analog input variable, analog output variable, or program variable. The depicted process proceeds from "N1" (from FIG. 29), and proceeds to step 872 in which the programming system displays a list of all previously defined variables which may logically be compared with the variable selected in step 824 (FIG. 27). The variables displayed in step 872 include all previously defined analog input variables, analog output variables, and program variables. In step 874, the programming system: provides a user interface allowing the user to select a "less than" reference variable from the variables displayed in step 872; and receives a corresponding user input. In step 876, the programming system generates a "less than" condition statement for determining whether the selected variable is less than the "less than" reference variable selected in step 874, after which the process proceeds to "N1R" (to FIG. 29).

Figure 30B:
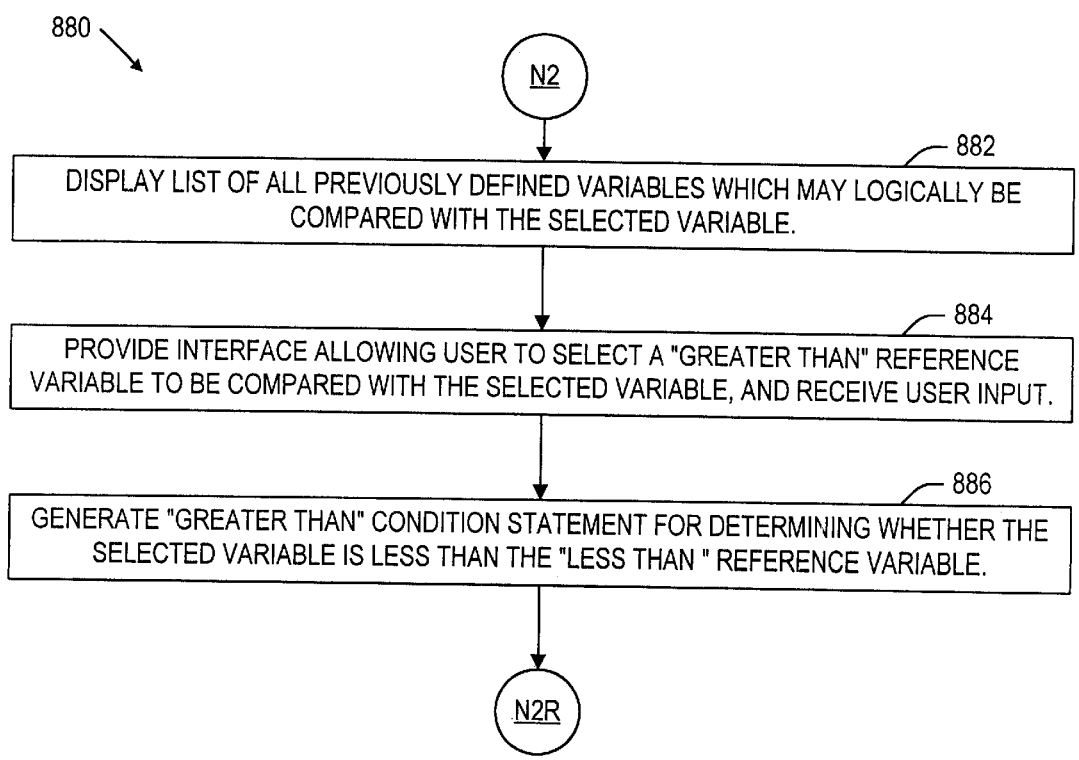

FIG. 30B shows a flow diagram at 880 illustrating a "greater than" condition statement editing sub-process of the process 850 (FIG. 8) for conditioning a state transition on the current value of an analog input variable, analog output variable, or program variable. The depicted process proceeds from "N2" (from FIG. 29), and proceeds to step 882 in which the programming system displays a list of all previously defined variables which may logically be compared with the variable selected in step 824 (FIG. 27). The variables displayed in step 882 include all previously defined analog input variables, analog output variables, and program variables. In step 884, the programming system: provides a user interface allowing the user to select a "greater than" reference variable from the variables displayed in step 882; and receives a corresponding user input. In step 886, the programming system generates a "greater than" condition statement for determining whether the selected variable is greater than the "greater than" reference variable selected in step 884, after which the process proceeds to "N2R" (to FIG. 29).

Note that if the user defines both a "less than" condition statement and a "greater than" condition statement in the condition editing sub-process 850 (FIG. 29), then the present condition specifies that the currently selected variable must be between "greater than" reference variable and the "less than" reference variable. Also, in the programming process, in order to create a condition statement comparing a program variable with a constant, the user may initialize another program variable to a constant value. Note also that if the access right field of the program variable 266 (FIG. 4G) carries a read/write value indicating that the program variable may be written to via the end user GUI 65 (FIG. 1), then the initialized program variable may be changed during execution of the control program.

Figure 31:
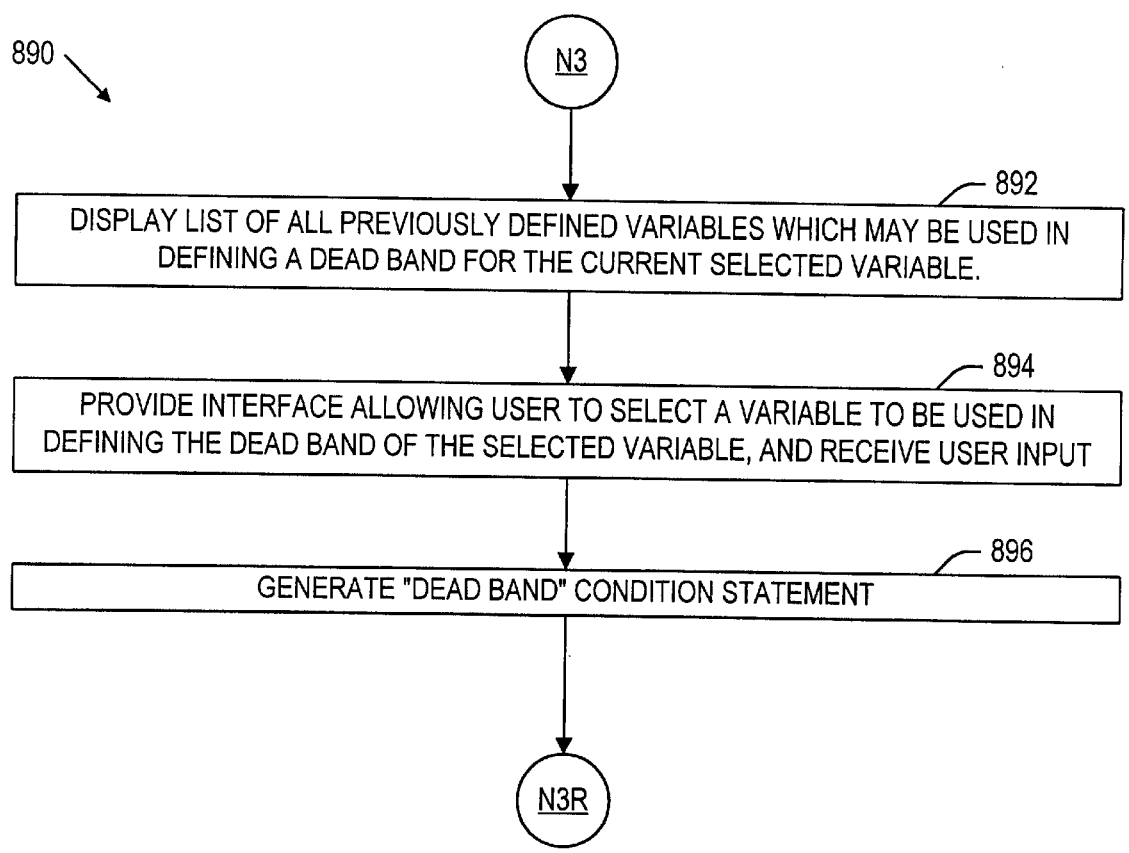

FIG. 31 shows a flow diagram at 890 illustrating a "dead band" condition statement editing sub-process of the process 850 (FIG. 29) for conditioning a state transition on the variation of the value of an analog input variable, analog output variable, or program variable during a given sample period. As explained further below, a "dead band" condition statement is used to modify a corresponding "less than" condition statement, and/or a corresponding "greater than" condition statement to allow for a dead band in which state transition will not be triggered. Each "dead band" condition statement must be complemented by a "less than" condition statement or a "greater than" condition statement defined in the condition editing sub-process 850 (FIG. 29) for the same condition. Otherwise, an error code is generated to alert the user to further define the present condition.

The depicted process proceeds from "N3" (from FIG. 29), and proceeds to step 892 in which the programming system displays a list of all previously defined variables which may be used in defining a dead-band range for the current selected variable. The variables displayed in step 892 include all previously defined analog input variables, analog output variables, and program variables. In step 894, the programming system: provides a user interface allowing the user to select a "dead-band" reference variable from the variables displayed in step 892; and receives a corresponding user selected reference variable. The user initializes another program variable to a consistent value and uses the initialized program variable as the selected reference variable. in step 896, the programming system generates a "dead band" condition statement based on the user input received in step 892, after which the process proceeds to "N3R" (to FIG. 29).

For example, a "greater than" condition statement may specify that the selected variable must be greater than a reference variable having a user-assigned value of 100. If a corresponding dead-band condition statement specifies a dead-band reference variable having a user-assigned value of 2, then the corresponding selected variable must be greater than 101 for the logic control unit 12 (FIG. 1) to determine that a state transition is to occur. In this case, a dead-band lies in the range between 100 and 101.

Note also that if the access right field of the program variable 266 (FIG. 4G) carries a read/write value indicating that the initialized program variable may be written to via the end user GUI 65 (FIG. 1), then the initialized program variable may be changed during execution of the control program, thereby changing the corresponding dead-band condition statement.

Figure 32:
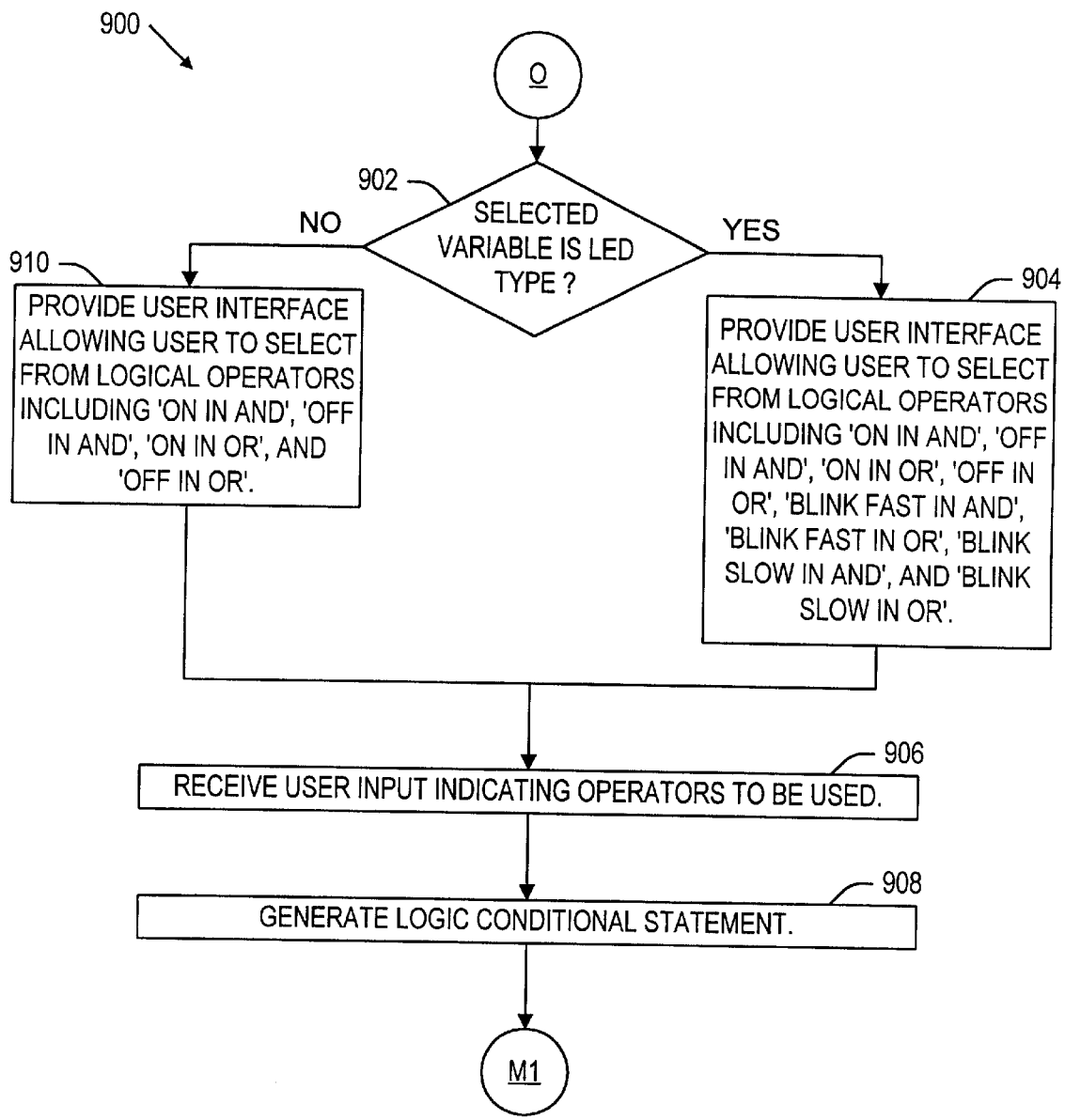
FIG. 32 is a flow diagram illustrating a sub-process of the condition editing process for generating a logic type condition statement which is a function of the current value of a digital variable, digital input variable, digital output variable, front panel LED variable, or panel switch variable.

FIG. 32 shows a flow diagram at 900 illustrating steps of the condition editing sub-process for conditioning a state transition on the current value of a digital variable, digital input variable, digital output variable, front panel LED variable, or a switch panel variable. The process proceeds from "O" (from FIG. 27), and proceeds to 902 at which the programming system determines whether the user selected variable (determined at 838 of FIG. 27 to be a digital value type variable) is an LED type variable. If it is determined at 902 that the user selected variable is all LED type variable, the depicted process proceeds to step 904 in which the programming system provides a user interface allowing the user to select from logical operators including: "ON in AND", "ON in OR", "OFF in AND", "OFF in OR", "BLINK FAST in AND", "BLINK FAST in OR", "BLINK SLOW in AND", and "BLINK SLOW in OR". From step 904, the process proceeds to step 906 in which the programming system receives a user input indicating an operator to be used in defining a logic condition statement. From step 906, the process proceeds to step 908 in which the programming system generates a logic condition statement based on the user input received in step 906, after which the process proceeds back to "M1" (to FIG. 27) to continue editing the present condition.

If it is determined at 902 that the user selected variable is not an LED type variable, the depicted process proceeds to step 910 in which the programming system provides a user interface allowing the user to select from logical operators including: "ON in AND", "ON in OR", "OFF in AND", "OFF in OR", "BLINK FAST in AND", "BLINK FAST in OR", "BLINK SLOW in AND", and "BLINK SLOW in OR". From step 910, the process proceeds to execute steps 906 and 908 as described above, after which the process proceeds back to "M1" (to FIG. 27) to continue editing the present condition.

If a plurality of logic condition statements are defined for a particular condition, then the statements are combined to define a single condition statement having a plurality of criteria. For example, if the use selects "ON in AND" for a first user selected variable, and then saves the condition (in step 828 of FIG. 27) without defining any further condition statements, then the condition will be satisfied if the first user selected variable is determined to be ON. As another example, if the user selects "ON in AND" for a first user selected variable, and selects "OFF in AND" for a second user selected variable, then the "AND" operator takes precedence, and the corresponding condition will be satisfied if the first user selected variable is determined to be ON (to have a high value) AND the second user selected variable is determined to be OFF.

If a plurality of condition statements (including dead band statements, "greater than" statements, "less than" statements, and check-state statements) are defined for a particular condition, then the statements are combined to define a single condition having a plurality of criteria.

Figure 33:
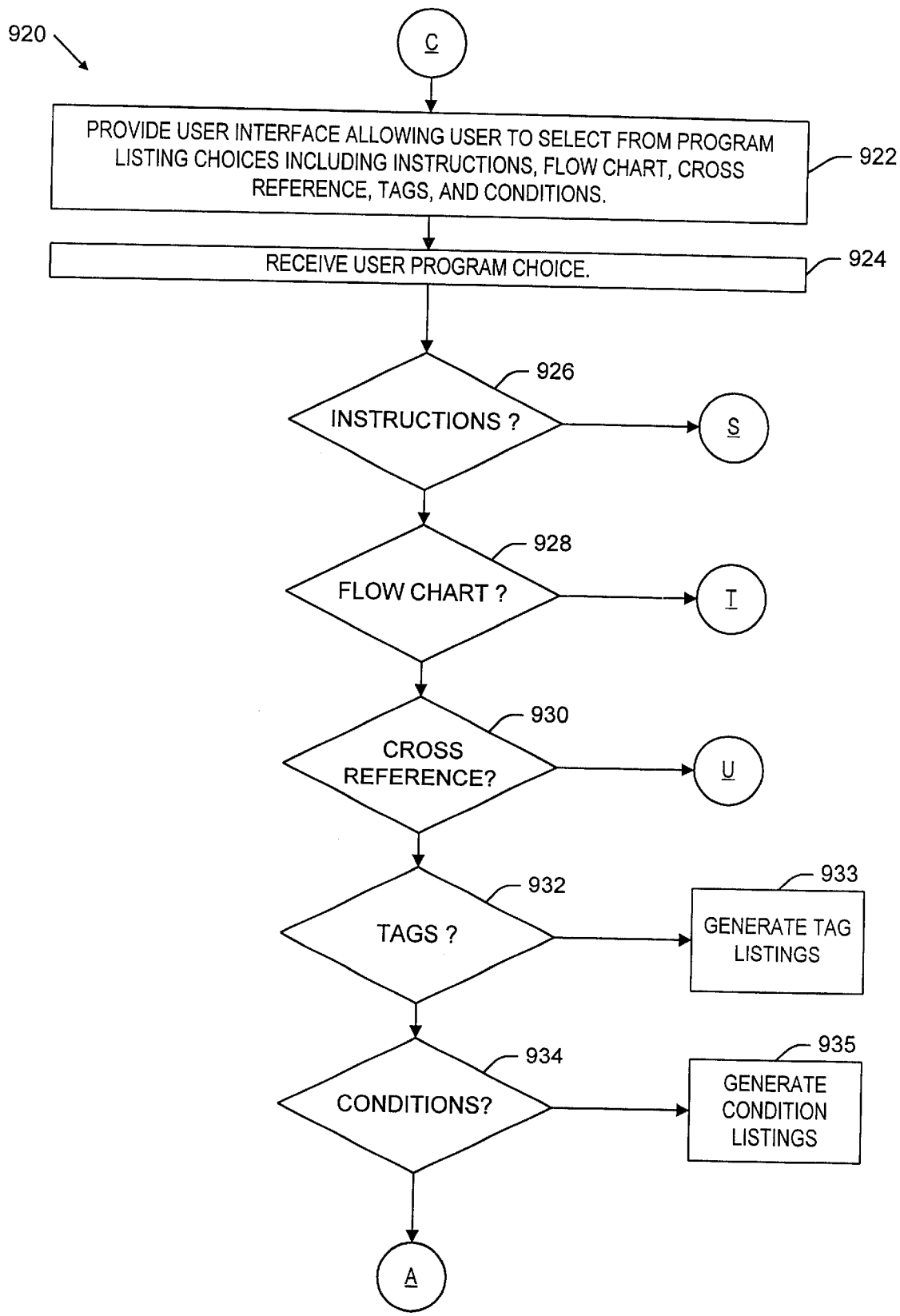
FIG. 33 is a flow diagram illustrating steps of a sub-process for generating program listings of program levels, states, conditions, and variables according to the present invention.

FIG. 33 shows a flow diagram at 920 illustrating steps of a sub-process for generating program listings of program levels, states, conditions, and variables of a control program created in accordance with the programming process of the present invention. The depicted process proceeds from "C" (from FIG. 5), and proceeds to step 922 in which the programming system provides a user interface allowing the user to select from program listing choices including instruction listings, flow chart listings, cross-reference listings, tag listings, conditions listings, and a listing of compiled data. In step 924, the programming system receives a user selection based on the choices provided in step 922. It is then determined at 926 whether the user has selected the option of generating an instruction listing, and if so the process proceeds to "S" (to FIG. 35) to implement a process of generating instruction listings. It is subsequently determined at 928 whether the user has selected the option of generating flow chart listings, and if so, the process proceeds to "T" (to FIG. 39) to implement a process of generating flow chart listings. It is determined at 930 whether the user has selected the option of generating cross-reference listings, and if so, the process proceeds to "U" (to FIG. 47) to implement a process of generating cross-reference listings. The programming system then determines at 932 whether the user has selected the option of generating tag listings, and if so, the process proceeds to step 933 to generate tag listings which comprise a list of all variables previously defined for a control program, and the values entered for all fields of each of the variables. This listing is particularly valuable for use by the end user who may use the tag listing to determine the access rights to each variable from the end user GUI 65 (FIG. 1). Finally, it is determined at 934 whether the user has selected the option of generating condition listings, and if so, the process proceeds to step 935 generate condition listings as further explained below. From 934, the process proceeds to "A" (to FIG. 5).

Figure 34:
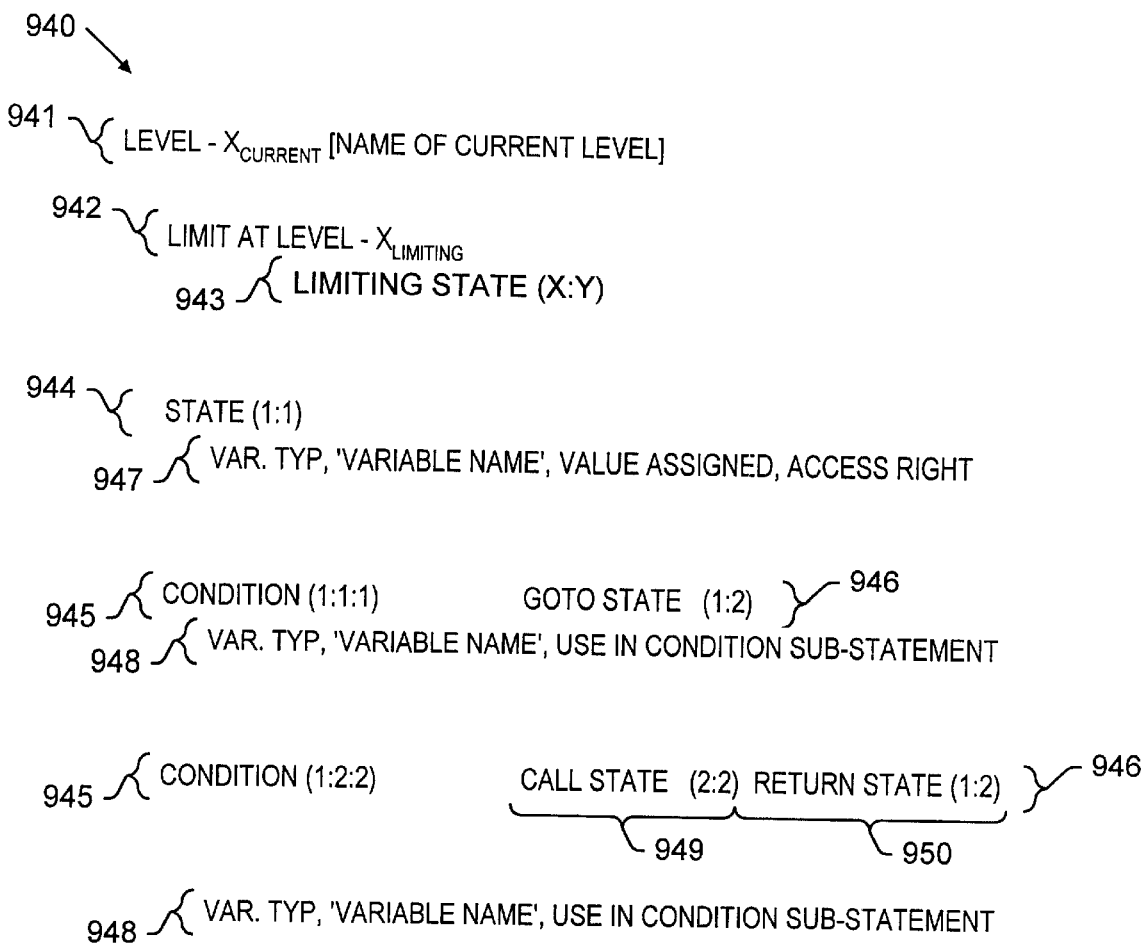
FIG. 34 is a block diagram of an exemplary instruction listing generated using the programming system of the present invention.

FIG. 34 shows an exemplary instruction listing at 940 generated by the programming system of the present invention from the internal files 132 (FIG. 3A). The instruction listing at 940 includes: an entry 941 indicating the name and program level number of a current program level; an entry 942 indicating the name and address of a limiting program level defined for the current program level indicated at 941 (if there is one defined); a plurality of entries 943 each indicating the name and address of a limiting state of the limiting program level indicated at entry 942; a plurality of entries 944 each indicating the name and address of a state of the current program level indicated at entry 941; a plurality of entries 945 each indicating the name and address of a condition of the corresponding state identified in the corresponding above listed entry 944; and a plurality of entries 946, each corresponding with one of the entries 945 and each providing an indication of the type of transition specified by the corresponding condition, and the name and address of a destination state.

Below each entry 944, which includes the name and address of a state, the instruction listing further includes a plurality of entries 947 each indicating a variable type, a variable name of a corresponding variable defined in the state identified in the corresponding entry 944, a value assigned by the corresponding state, and the value previously entered in the access right field of the corresponding variable. Below each entry 945, which includes the name and address of a condition, the instruction listing further includes a plurality of entries 948 each indicating a variable type, a variable name of a corresponding variable used in a conditional statement of the condition identified in the corresponding entry 945, and the corresponding conditional statement. For a condition specifying a subroutine call, the corresponding entry 946 includes: an entry 949 having the name and address of a destination state of a subroutine program level; and an entry 950 having the name and address of a return state of the calling program level.

Figure 35:
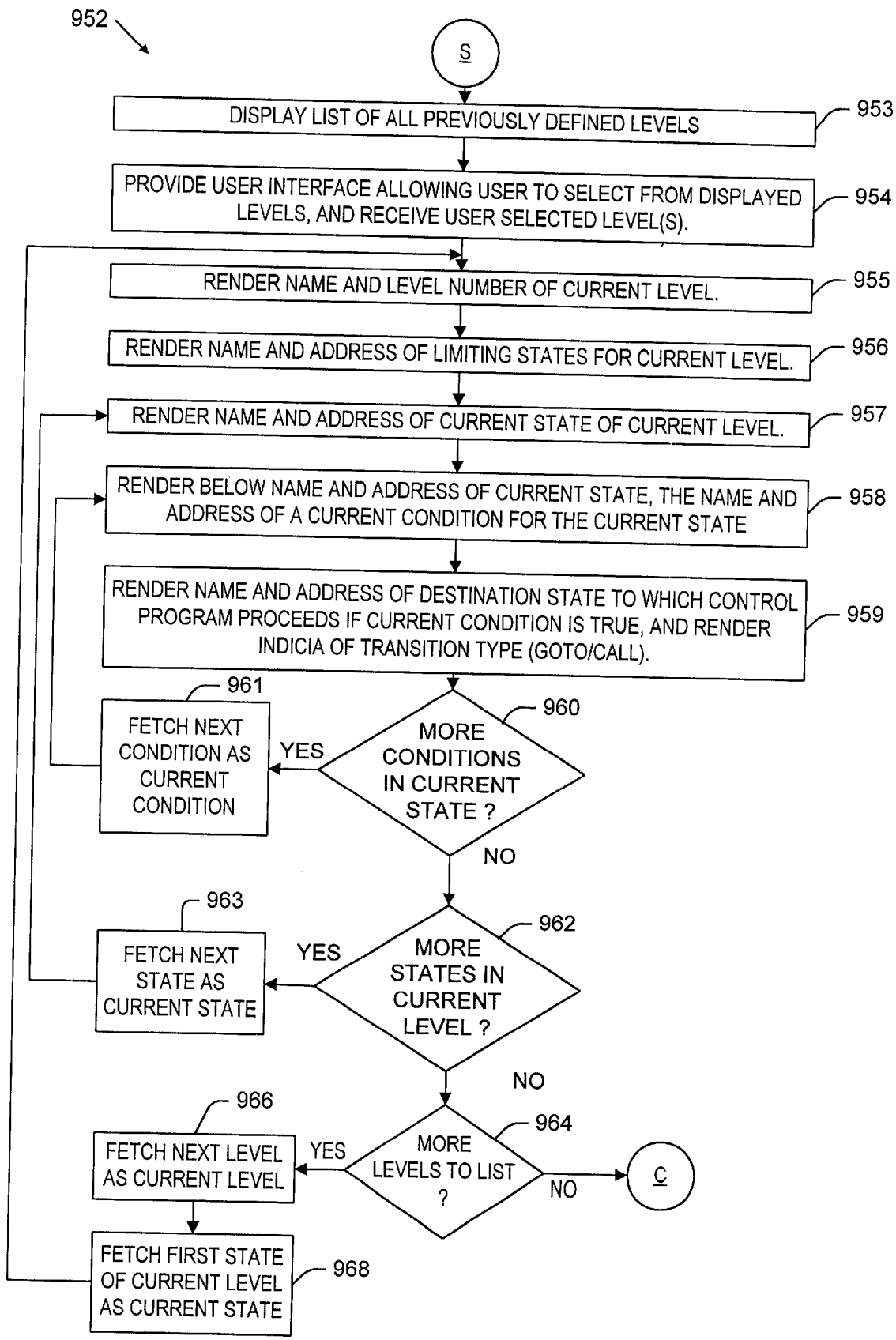
FIG. 35 is a flow diagram illustrating steps of a process of generating the instruction listing of FIG. 34 in the programming system of the present invention.

FIG. 35 shows a flow diagram at 952 illustrating a process of the present invention for generating an instruction listing.

The depicted process proceeds from "S" (from FIG. 33), and proceeds to step 953 in which the programming system displays a list of all previously defined program levels. In step 954, the programming system: provides a user interface allowing the user to select from displayed program levels; and receives one or more user selected program levels. In step 955, the programming system renders the name and program level number of the current program level. In step 956, the programming system renders the name and address of limiting states previously defined for the current program level. In step 957, the programming system renders the name and address of a current state of the current program level. In step 958, the programming system renders, below the name and address of the current state, the name and address of the current condition for transition from the current state.

In step 959, the programming system renders the name and address of a destination state to which the control program is to proceed if the current condition is true, and also renders indicia of the transition type specified by the current condition. In the preferred embodiment the programming renders "GOTO" for a direct type transition, and "CALL" for a call transition to a subroutine state. The process then proceeds to 960 at which the programming system reads the source file of the internal files 132 (FIG. 3A) to determine whether there are more conditions defined for the current state. If it is determined at 960 that there are more conditions defined for the current state, the process proceeds to step 961 in which the system reads the source file to fetch the next condition as the current condition, after which the process proceeds to re-execute steps 958 and 959 as described above. If it is determined at 960 that there are not more conditions previously defined for the current state, the programming system reads the source files to determine at 962 whether there are more states previously defined for the current program level. If it is determined at 962 that there are more states defined for the current program level, the process proceeds to step 963 in which the programming system reads the source file to fetch the next state as the current state, after which the process proceeds back to step 957 as described above.

If it is determined at 962 that there are not more states previously defined for the current program level, the process proceeds to 964 at which the programming system determines, based on the user selected program levels received in step 954, whether there are more program levels for which to venerate instruction listings. If it is determined at 964 that there are more program levels, the process proceeds to step 966 in which the programming system reads the source file of the internal files 132 (FIG. 3A) to fetch the next program level as the current program level. From step 966, the process proceeds to step 968 in which the programming system reads the source file to fetch the first state of the current program level as the current state, after which the process proceeds to step 955 as described above. If it is determined at 964 that there are not more program levels to be listed, the process proceeds to "C" (to FIG. 33).

With reference back to FIG. 33, the step 935 which calls for generating condition listings (not shown) is implemented by a process similar to the process 952 (FIG. 35) for generating an instruction listing. Condition listings list a control program by state and show what conditions cause a transition to the corresponding state.

FIG. 36 shows a block diagram at 970 of an exemplary flow chart listing of a first program level of a control program created via the programming system of the present invention. The flow chart listing includes a plurality of state boxes 974 each having a name and address of a state of the control program, and a plurality of condition boxes 975 each having a name and address of a condition of the control program. Each of a plurality of state and condition blocks 976 includes: a state box 974 having a particular state indicated therein; and at least one condition box 975, corresponding with the state box, and having rendered therein a condition for transition from the particular state. The state and condition blocks 976 are disposed alternately in opposite columns consisting of a left column and a right column. Within a single column, adjacent state and condition blocks 976 are separated by a predetermined vertical displacement 977. Each state box 974 has a state box anchor point 979, and each condition box 975 has a condition box anchor point 980.

For a particular condition indicating a direct (or goto) transition to a destination state within the same program level as the source state corresponding to the particular condition, wherein the destination state is indicated in a state box 974 on the same page but in the opposite column from the state box for the source state, a straight line connector 981 is rendered from the condition box anchor point 980 of the particular condition to the state box anchor point 979 of the destination state. For a particular condition indicating a direct (or goto) transition to a destination state within the same program level as the source state corresponding to the particular condition, wherein the destination state is indicated in a state box 974 on the same page and in the same column as the state box for the source state, a side-to-same-side line 982 is rendered from the condition box anchor point 980 of the particular condition to the state box anchor point 979 of the destination state.

The depicted flow chart listing 970 includes a page break 983 which divides the third and fourth state and condition blocks 976, corresponding with states 1:3 and 1:4, from the fifth and sixth state and condition blocks 976, corresponding with states 1:5 and 1:6 of the first program level of the control program. For a particular condition indicating a direct (or goto) transition to a destination state within the same program level as the source state corresponding to the particular condition, wherein the destination state is indicated in a state box 974 on a different page from the state box for the source state, an indication 984, including an arrow and the corresponding destination state address. are rendered inside the condition box 975. For example, the condition 1:3:3 indicates a direct transition to state 1:6, which is in the same program level but on a different page and therefore the condition box 975 for condition 1:3:3 includes an indication 984 including an arrow and the state address 1:6 of the destination state address. If the condition 1:3:3 and the destination state 1:6 were disposed on the same page, then the flow chart listing 970 would include a line rendered from the condition box anchor point to the destination state box anchor point as indicated by the dashed line.

For a particular condition indicating a direct (or goto) transition to a destination state within a program level different from the program level of the source state corresponding to the particular condition, an indication 985, including an arrow and the corresponding destination state address, are rendered inside the condition box 975. For example, the condition 1:6:3 indicates a direct transition to state 2:1 , which is in program level 2, and therefore the condition box 975 for condition 1:6:3 includes an indication 985 including an arrow and the state address 2:1 of the destination state address.

For a particular condition indicating a call, or subroutine, transition to a destination state of a subroutine program level, a first call indication 986 including an arrow and the corresponding destination state address is rendered inside the condition box 975, and a second call indication 987 including an arrow and the corresponding return state address is rendered outside the condition box 975.

FIG. 37 shows an exemplary flow chart listing at 988 of a second task program level of a control program generated in accordance with the programming process of the present invention wherein the control program is partially coded in that destination states for particular conditions have not yet been specified by the user. In the depicted flow chart listing at 988, no destination state is specified for condition 2:2:2, and the programming system renders a "?" within the corresponding condition box at 989 to indicate that no destination state has been specified.

FIG. 38 shows a flow chart listing at 990 of a sub-routine program level of a control program (generated in accordance with the programming process of the present invention. As mentioned above, each sub-routine program level includes at least one "return condition" indicating that the sub-routine program level is to return to the return state of the calling program level. In the depicted example, the condition box indicating condition 3:2:2 has "RETURN" rendered therein at 992 to indicate that when condition 3:2:2 is satisfied, the subroutine program level is to return to the return state of the calling program level. With reference back to FIG. 36, condition 1:5:2 specifies a call transition to state 3:1 of subroutine program level 3, and a return to state 1:1 of the calling program level 1 when the subroutine program level 3 (FIG. 38) returns, that is upon satisfaction of condition 3:2:2.

FIG. 39 shows a flow diagram at 1000 illustrating a process of generating arrays of position information for use in generating a flow chart listing in accordance with the programming process of the present invention. The depicted process proceeds from "T" (from FIG. 33), and proceeds to step 1002 in which the programming system displays a list of all previously defined program levels of a control program. In step 1004, the programming system: provides a user interface allowing the user to select from the program levels displayed in step 1002; and receives a user selected program level having a program level number, N. In step 1006, the programming system: sets a first vertical position value, Y1, representing the vertical coordinate position in a first column of the flow chart listing, to zero; and also sets a second vertical position value, Y2, representing the vertical coordinate position in a second column of the flow chart listing, to zero. The first and second vertical coordinate position values are independent of each other, and each of the values spans multiple pages of a flow chart listing. Dividing either of the vertical coordinate position values by the number of vertical coordinates in a page yields a page number corresponding to the vertical coordinate position value. A vertical coordinate position value of zero corresponds to the top of a first page.

In step 1008, the programming system sets the current state to state N:1, which is the first state of the user selected program level received in step 1004 as explained above. The depicted process proceeds from step 1008 to 1010 at which the programming system reads the source file of the internal files 32 (FIG. 3A) to determine whether the program level number of the current state is equal to the program level number of a previous state. This step is implemented in order to ensure that a page is skipped for a transition from one program level to another, as further explained below. If it is determined at 1010 that the program level number of the current state is not equal to the program level number of the previous state, the process proceeds to "T2" (to FIG. 41) to implement a process of advancing to the top of a next page before rendering the current condition.

If it is determined at 1010 that the program level number of the current state is equal to the program level number of the previous state, the process proceeds to step 1012 in which the programming system reads the source file of the internal files 132 (FIG. 3A) to determine the number of conditions defined for the current state. In step 1014, the programming system selects Y1 or Y2 as the current vertical position value. For example, the programming system may select Y1 to represent the left column of the flow chart listing, and Y2 to represent the right column of the flow chart listing. The depicted process is executed repetitively and the programming system selects Y1 and Y2 as the current vertical coordinate position value for alternate cycles of the process.

In step 1016, the programming system determines the vertical height of the current state/condition group by multiplying the element height, that is the height of the state boxes and condition boxes, by the number of conditions defined for the current state, plus one for the current state. In step 1018, the programming system adds the current vertical height to the current Y position value to determine an advanced Y position value. In step 1020, the programming system divides the current Y position value by a page length and rounds up to the next integer to determine a current page number. In step 1022, the programming system divides the advanced Y position value by the page length and rounds up to the next integer to determine an advanced page number. The depicted process proceeds from step 1022 to 1023 at which the programming system determines whether the current page number is equal to the advanced page number, and if so the process proceeds to "T1" (to FIG. 40). If it is determined at 1023 that the current page number is not equal to the advanced page number, the depicted process proceeds to "T2" (to FIG. 41).

FIG. 40 shows a flow diagram at 1030 illustrating a sub-process of generating array position information for a state/condition group to be rendered on a current page. The depicted process proceeds from "T1" (from FIG. 39) and proceeds to step 1032 in which the programming system determines all (X,Y) coordinate for the current state using the current Y position value. In step 1034, the programming system adds the state address and (X,Y) coordinate of the current state to a state anchor point array stored in memory of the programming system 80 (FIG. 1). In step 1036, the programming system determines, for each of the conditions of the current state, the corresponding (X,Y) coordinates based on the (X,Y) coordinates for the current state. In step 1038, the programming system, for each of the conditions of the current state, adds the condition address and associated (X,Y) coordinate to a condition anchor point array stored in memory of the programming system 80 (FIG. 1). As further explained below, the state anchor point array and condition anchor point array are used during rendering of the flow chart listings (FIGS. 36, 37, and 38).

From step 1038, the depicted process proceeds to 1040 at which the programming system determines whether there are more states previously defined for the current program level. If it is determined at 1040 that there are more states previously defined for the current program level, the process proceeds to step 1042 in which the programming system reads the source file to fetch the next state as the current state, after which the depicted process proceeds to "T3" (to FIG. 39) to repeat the process of generating arrays of position information for use in generating a flow chart listing. If it is determined at 1040 that there are not more states to be defined for the current program level, the depicted process proceeds to 1044 at which the programming system determines whether there are more program levels for which a flow chart is to be listed, and if so, the process proceeds to step 1046 in which the programming system reads the source file to fetch the next program level as the current program level. From step 1046 the process proceeds to step 1048 in which the programming system fetches the first state of the current program level as the current state, after which the process proceeds to "T3" (to FIG. 39). If it is determined at 1044 that there are not more program levels to be listed, the process proceeds to "T4" (to FIG. 42).

FIG. 41 shows a flow diagram at 1050 illustrating a process for generating anchor point array position information for a state/condition group to be rendered on a next page. The depicted process proceeds from "T2" (from FIG. 39), and proceeds to step 1052 in which the programming system sets in (X, Y) coordinate for the current state to be equal to the (X, Y) coordinate at the top of the next page. In step 1054, the programming system adds the state address of the current state and the associated (X, Y) coordinate of the current state to the state anchor point array. In step 1056, the programming system determines, for each of the conditions of the current state. a corresponding (X, Y) coordinate based on the (X, Y) coordinate for the current state. In step 1058, the programming system, for each of the conditions of the current state, adds the condition address and associated (X, Y) coordinate to the condition anchor point array. The process proceeds from 1058 to 1060 at which the programming system determines whether more states halve been previously defined for the current program level. If it is determined at 1060 that more states have been previously defined for the current program level, the process proceeds to step 1062 in which the programming system reads the source file to fetch the next state as the current state, after which the process proceeds to "T3" (to FIG. 39). If it is determined at 1060 that there are not more states previously defined for the current program level, the process proceeds to 1062 at which the programming system reads the source files to determine whether there are more program levels to be listed. If it is determined at 1060 that there are more program levels to be listed, the process proceeds to step 1066 in which the programming system reads the source file to fetch the next program level as the current program level. From step 1066, the process proceeds to step 1068 in which the programming system fetches the first state of the current program level as the current state, after which the process proceeds to "T3" (to FIG. 39).

Figure 42:
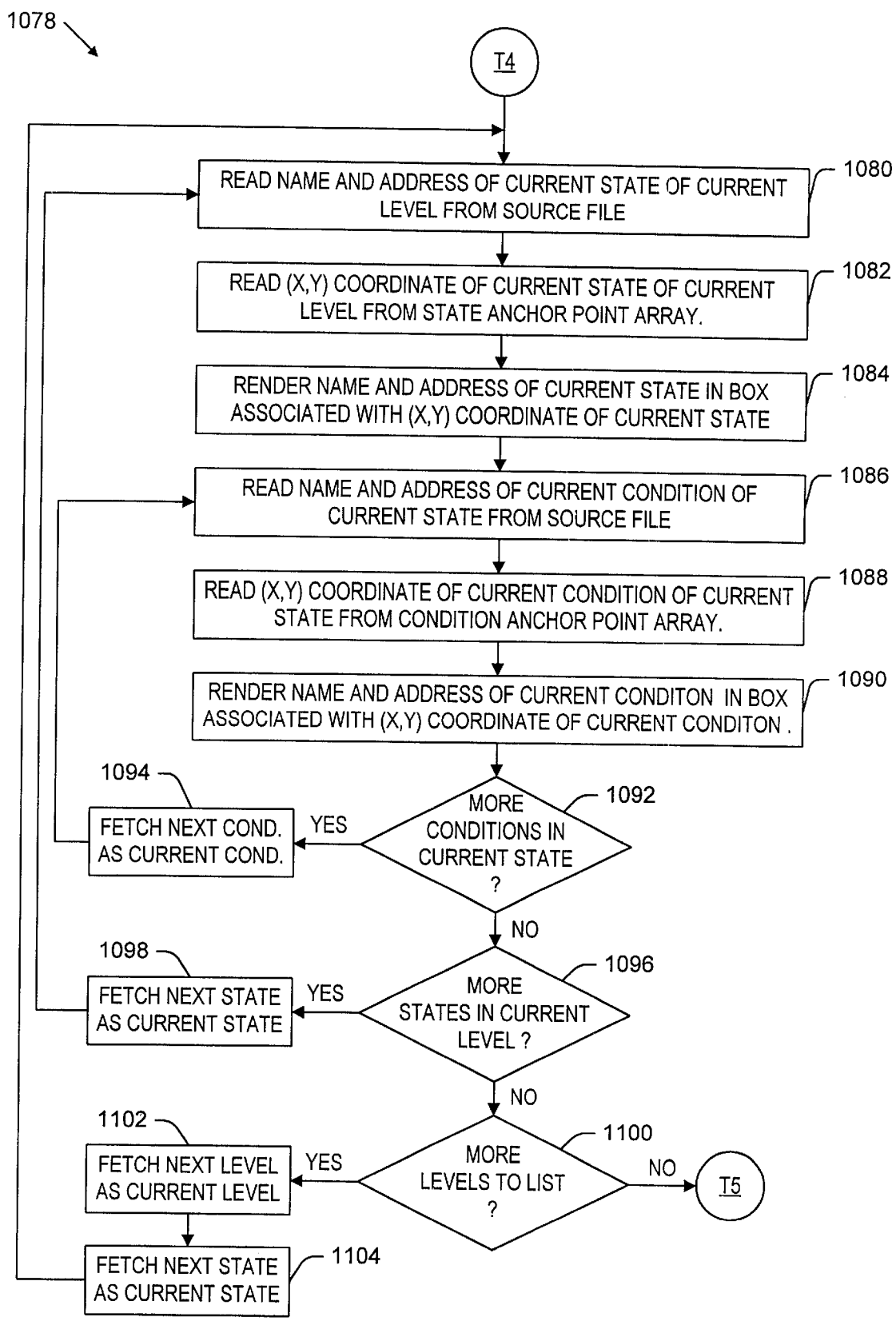

FIG. 42 shows a flow diagram at 1070 illustrating a second pass process for generating a flow chart listing in accordance with the present invention. The depicted process proceeds from "T4" (from FIGS. 40 and 41), and proceeds to step 1080 in which the programming system reads the name and address of the current state of the current program level from the source file. In step 1082, the programming system reads the (X, Y) coordinate of the current state of the current program level from the state anchor point array. In step 1084, the programming system renders the name and address of the current state in the state box associated with the (X, Y) coordinate of the current state. In step 1086, the programming system reads the name and address of the current condition of the current state from the source file. In step 1088, the programming system reads the (X, Y) coordinate of the current condition of the current state from the condition anchor point array. In step 1090, the programming system renders the name and address of the current condition in the condition box associated with the (X, Y) coordinate. From step 1090, the process proceeds to step 1092 at which the programming system reads the source file to determine whether there are more conditions previously defined for the current state, and if so, the process proceeds to step 1094 in which the programming process reads the source file to fetch the next condition as the current condition. If it is determined at 1092 that there are not more conditions not previously defined for the current state, the process proceeds to 1094 at which the programming system reads the source file to determine whether there are more state defined for the current program level. If it is determined at 1096 that there are more states defined for the current program level, the process proceeds to step 1098 in which the programming system reads the source file to fetch the next state as the current state. If it is determined at 1096 that there are not more states defined for the current program level, the process proceeds to 1100 at which the programming system reads the source file to determine whether there are more program levels to be listed, and if so, the process proceeds to step 1102 in which the programming system reads the source file to fetch the next program level as the current program level. From step 1102, the depicted process proceeds to step 1104 in which the programming system reads the source file to fetch the next state as the current state, after which the process proceeds back to step 1080 as described above. If it is determined at 1100 that there are not more programing levels to be listed, the process proceeds to "T5" (to FIG. 43).

Figure 43:
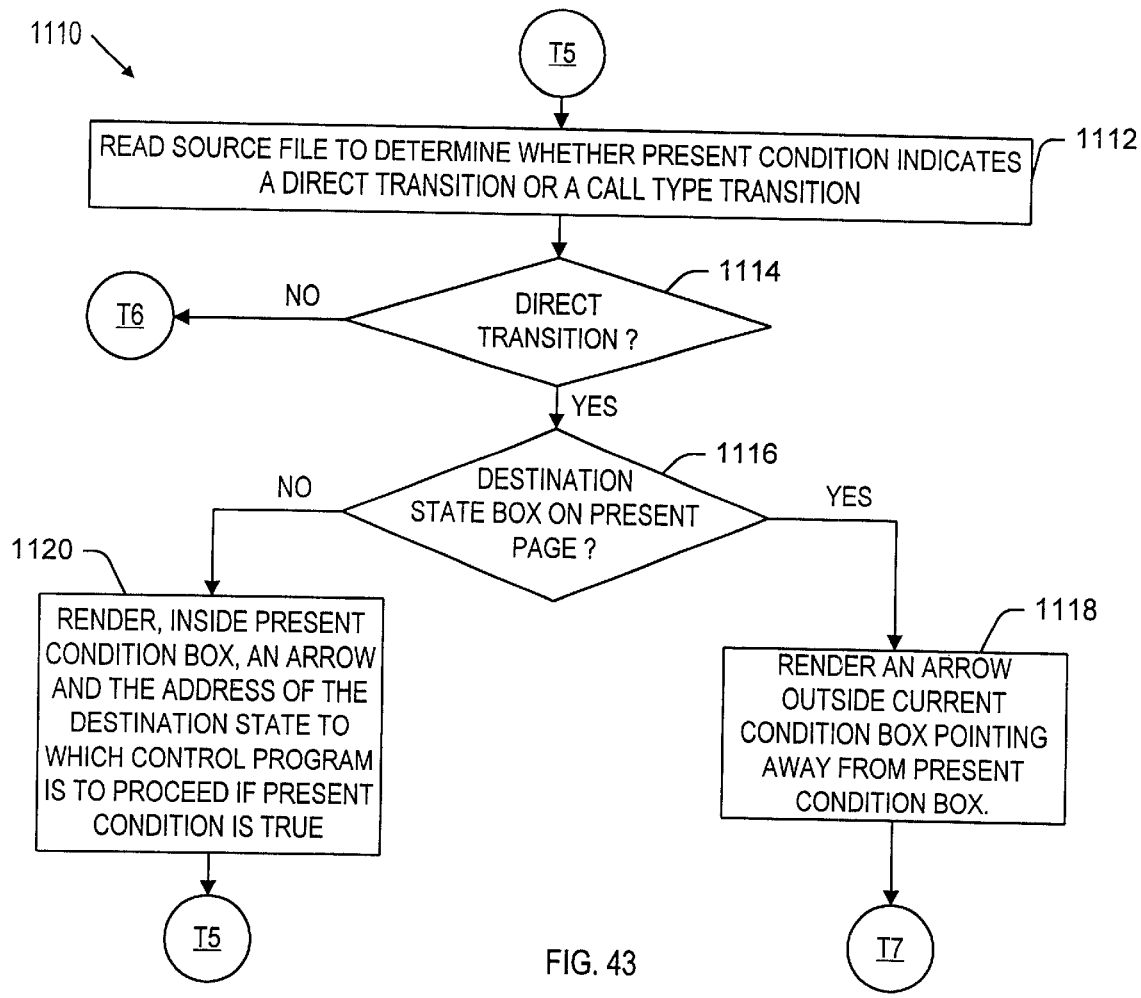

FIG. 43 shows a flow diagram at 1110 illustrating a process for illustrating transitions from a source state to a destination state based on corresponding conditions. The depicted process proceeds from "T5" (from FIG. 42), and proceeds to step 1112 in which the programming system reads the source file to determine whether the present condition indicates a direct (GOTO) transition or a call transition. The process proceeds from step 1112 to 1114 at which the programming system determines whether the present condition indicates a direct (GOTO) transition. If it is determined at 1114 that the present condition does not indicate a direct transition, but rather indicates a call type transition, the process proceeds to "T6" (to FIG. 44). If it is determined at 1114 that the present condition indicates a direct (GOTO) transition, the process proceeds to 1116 at which the programming system determines whether the destination state box of the destination state indicated by the present condition, is on the present page. If it is determined that the destination state box is on the present page, the process proceeds from 1116 to step 1118 in which the programming system renders an arrow outside the current condition box pointing away from the present condition box, after which the process proceeds to "T7" (to FIG. 45). If it is determined at 1116 that the destination state box indicated by the present condition is not on the present page, the process proceeds from 1116 to step 1120 in which the programming system renders, inside the present condition box, an arrow and the address of the destination state to which the control program is to proceed if the present condition is true. From step 1120 the depicted process proceeds to "T1" (to FIG. 40).

Figure 44:
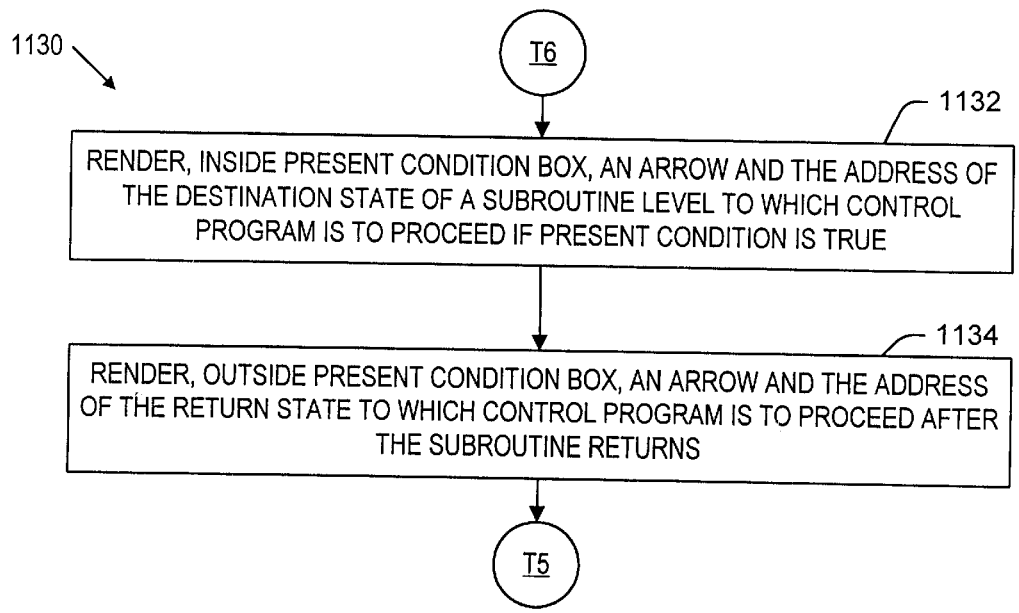

FIG. 44 shows a flow diagram at 1130 illustrating a sub-process for indicating a call transition. The depicted process proceeds from "T6" (from FIG. 43) and proceeds to step 1132 in which the programming system renders, inside the present condition box, an arrow and address of the destination state of a sub-routine program level to which the control program is to proceed if the present condition is true.

From step 1132, the process proceeds to step 1134 in which the programming system renders, outside the present condition box, an arrow and the address of the return state to which the control program is to proceed after the sub-routine returns. From step 1134, the process proceeds to "T5" (to FIG. 43).

Figure 45:
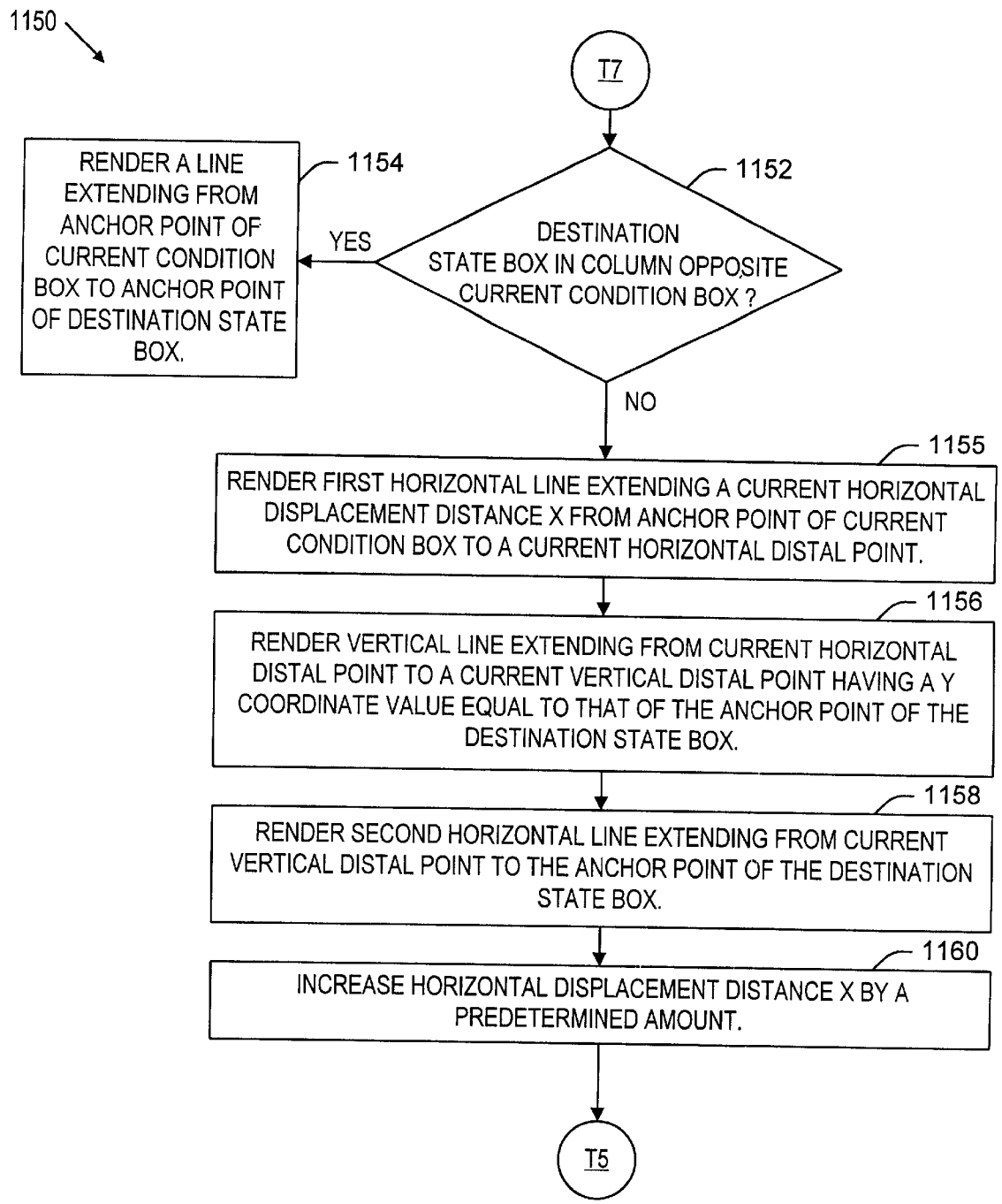

FIG. 45 shows a flow diagram at 1150 illustrating a process of rendering lines indicating transition from a source state to a destination state as a result of condition criteria being satisfied. The depicted process proceeds from "T7" (from FIG. 43), and proceeds to 1152 at which the programming system determines whether the destination state box of the destination state is positioned in the column opposite the current condition box of the current condition. If is determined at 1115 that the destination state box and the current condition box are in opposite columns, the process proceeds to step 1154 in which the programming system renders a line extending from the anchor point of the current condition box to the anchor point of the destination state box. If it is determined at 1152 that the destination state box and the current condition box are not in opposite columns, but rather are in the same column, the process proceeds to step 1154 in which the programming system renders a first horizontal line extending a current horizontal displacement distance X from the anchor point of the current condition box to a current horizontal distal point. From step 1154, the process proceeds to step 1156 in which the programming system renders a vertical line extending from the current horizontal distal point to a current vertical distal point having a Y coordinate value equal to that of the anchor point of the destination state box. From step 1156, the process proceeds to step 1158 in which the programming system renders a second horizontal line extending from the current distal point to the anchor point of the destination state box. From step 1158, the process proceeds to step 1160 in which the programming system increases the horizontal displacement distance X by a predetermined amount. From step 1160, the process proceeds to "T5" (to FIG. 43).

FIG. 46 shows a block diagram of exemplary cross reference listings at 1200, 1202, and 1204 for a digital output variable, a digital input variable, and a timer variable, respectively. The depicted cross reference listings are generated by the program using system of the present invention by reading from the source files of the internal files 132 (FIG. 3A).

The cross reference listing at 1200 includes: an entry 1205 indicating a digital output variable name; an entry 1206 indicating a function performed using the digital output variable upon transition to a corresponding state; an entry 1207 indicating the name of the corresponding state; an entry 1208 indicating the address of the corresponding state; and an entry 1209 indicating the access right value of the digital output variable while the control program operates in the corresponding state. The functions using the digital output variable which may be indicated by entry 1206 include "SET ON", "SET OFF", "ON IN AND", "OFF IN AND", "ON IN OR", "OFF IN OR", "BLINK SLOW IN OR", "BLINK FAST IN OR", "BLINK SLOW IN AND", "BLINK FAST IN AND", "ASSIGN ", "TAG ONLY", "BLINK SLOW", and "BLINK FAST". Cross reference listings similar to the one at 1200 are generated for digital variables and front panel LED variables which may be used in the same type of functions.

Cross reference listings for analog output variables (not shown) and cross reference listings for program variables (not shown) indicate functions which may be performed using the analog output variables and program variables upon transition to a corresponding state. Functions which may be performed using the analog output variables and program variables upon transition to a corresponding state include "SET VALUE", "ASSIGN", "SET TAG ONLY", "REFERENCE", "FORMULA", "TEST >", "TEST<", "TEST BETWEEN", "TEST NOT >", and "TEST NOT BETWEEN".

The cross reference listing at 1202 includes: an entry 1211 indicating a digital input variable name; an entry 1211 indicating a condition statement in which the digital input variable is used; an entry 1212 indicating the name of the corresponding program level, state, and condition in which the condition statement is used; and an entry 1213 indicating the address of the corresponding condition. Condition statements which may be indicated by entry 1211 include "ON IN AND", "OFF IN AND", "ON IN OR", "OFF IN OR", "BLINK SLOW IN OR", "BLINK FAST IN OR", "BLINK SLOW IN AND", and "BLINK FAST IN AND". Cross reference listings, similar to the one at 1202, are generated for front panel switch variables which may be used in the same types of condition statements. Cross reference listings for analog input variables (not shown) indicate condition statements in which the analog input variable is used, the condition statements including "TEST >", "TEST<", "TEST BETWEEN", "TEST NOT >", "TEST NOT BETWEEN", "REFERENCE", and "TEST NOT <".

The cross reference listing at 1204 includes: an entry 1214 indicating a timer variable name; an entry 1215 indicating a function performed with regard to the timer variable upon transition to a corresponding state in which the timer variable is used; an entry 1216 indicating the names of the corresponding program level and state for which the formulas is defined; an entry 1217 indicating the address of the corresponding state; and an entry 1218 indicating the expression of the formula itself. Functions which may be indicated by entry 1215 include "SET VALUE", "ASSIGN", "SET TAG ONLY", "SET RUN ON", "SET RUN OFF", "FORMULA", and "TEST".

Figure 47:
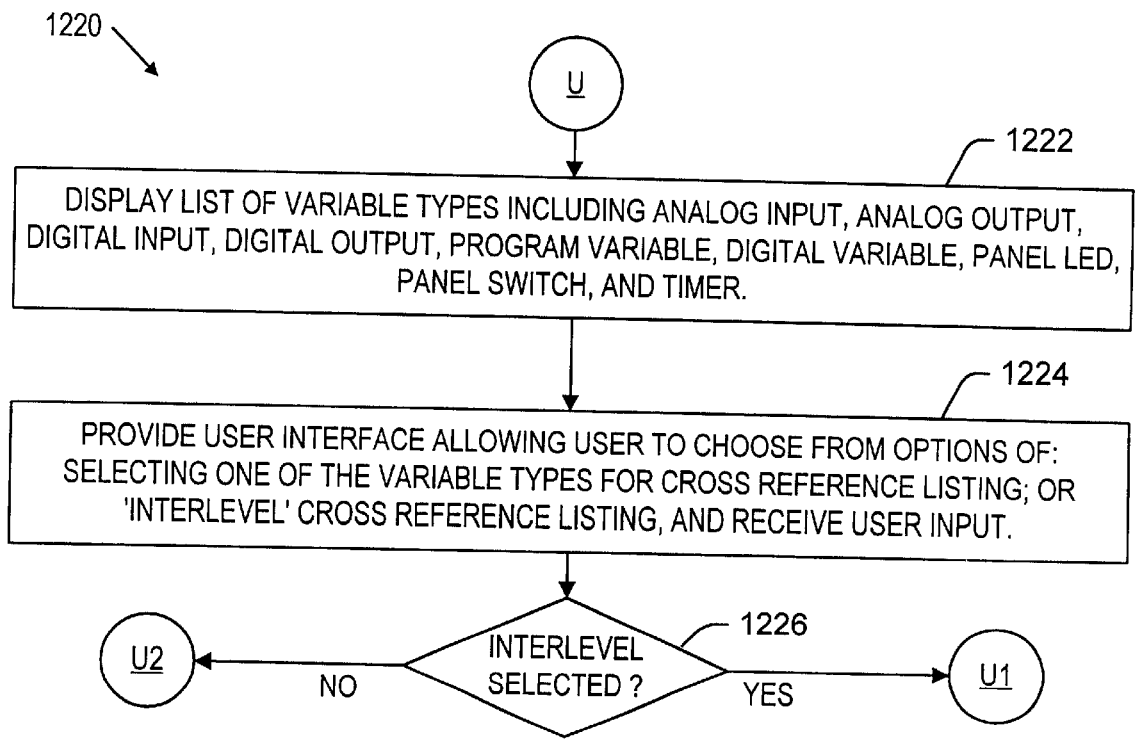

FIG. 47 shows a flow diagram at 1220 depicting a process for generating a cross-reference listing. The depicted process proceeds from "U" (from FIG. 33) and proceeds to step 1222 in which the programming system displays a list of variable types including analog input, analog output, digital input, digital output, program variable, digital variable, panel LED variable, panel switch variable, and timer variable. In step 1224, the system provides a user interface allowing the user to choose from the options of: selecting one of the variable types for cross-reference listing; or selecting "interprogram level" cross-reference listing; and receives a corresponding user input. The process proceeds from step 1224 to 1226 at which the system determines whether the interprogram level option has been selected, and if so, the process proceeds to "U1" (to FIG. 48). If it is determined at 1226 that the user has not selected the interprogram level option, the process proceeds to "U2" (to FIG. 49).

Figure 48:
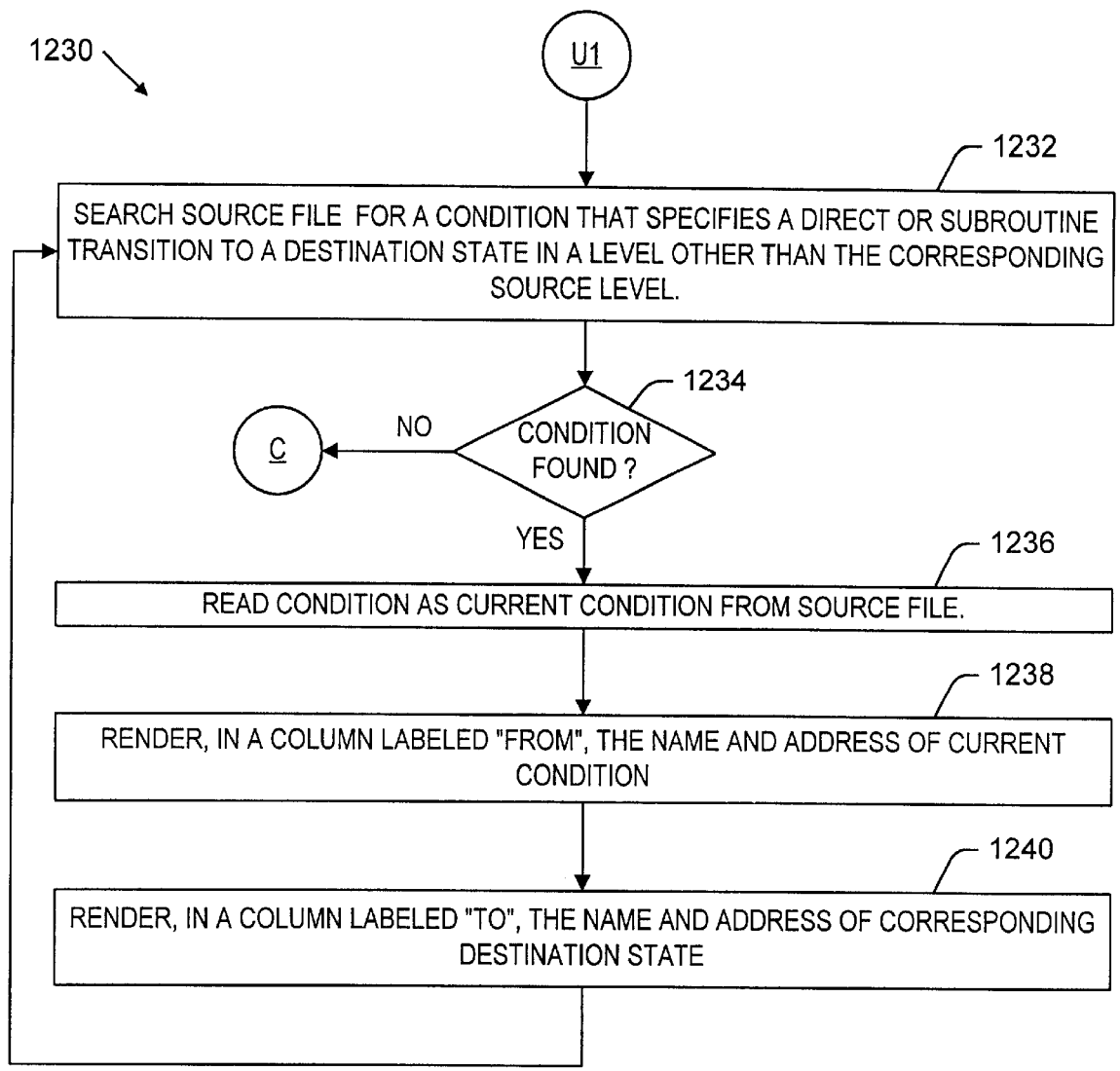

FIG. 48 shows a flow diagram at 1230 depicting a sub-process of the process 1220 (FIG. 47), the depicted sub-process for generating interprogram level cross-reference listings. The depicted process proceeds from "U1" (from FIG. 47), and proceeds to step 1232, in which the system searches the source file of the internal file 132 (FIG. 3A) for a condition that specifies a direct or sub-routine transition to a destination state in a program level other than the corresponding source program level. The process proceeds from step 1232 to 1234 at which the system determines whether a condition as described in step 1232 has been found. If it is determined at 1234 that such a condition has been found, the process proceeds to step 1236 in which the system reads the condition as the current condition from the source file. In step 1238, the system renders in a column labeled "FROM", the name and address of the current condition. In step 1240, the system renders in a column labeled "TO", the name and address of the corresponding, destination state, after which the process proceeds back to step 1232 to search for the next condition. If it is determined at 1234 that a condition specifying a transition to a destination state in another program level has not been found, the process proceeds to "C" (to FIG. 33).

Figure 49:
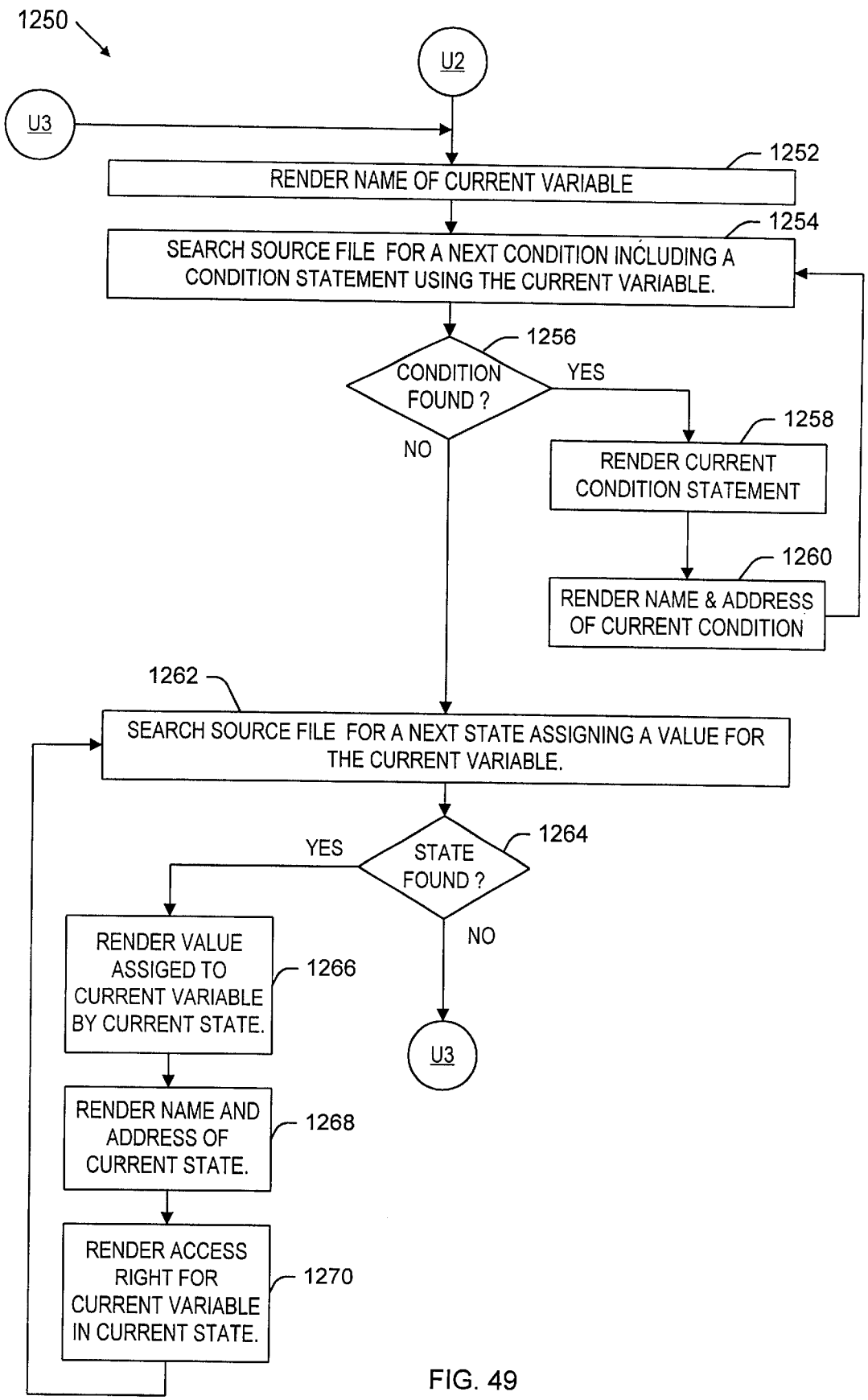

FIG. 49 shows a flow diagram at 1250 illustrating a sub-process of the process 1220 (FIG. 47) for generating cross-reference listings, the depicted sub-process for generating cross-reference listings for variables. The depicted process proceeds from "U2" (from FIG. 47) and proceeds to step 1252 in which the system renders the name of a current variable. In step 1254, the system searches the source file for a next condition including a condition statement using the current variable. It is then determined at 1256 whether a condition including a condition statement using the current variable has been found, and if so, the process proceeds to step 1258 in which the system renders the current condition statement. From step 1258, the process proceeds to step 1260 in which the system renders the name and address of the current condition, after which the process proceeds back to step 1254. If it is determined at 1256 that a condition, including a condition statement using the current variable has not been found, the process proceeds to step 1262, in which the system searches the source file for a next state assigning a value for the current variable. It is then determined at 1264 whether a next state assigning a value for the current variable has been found. If it is determined at 1264 that such a state has been found, the process proceeds to step 1266 in which the system renders a value assigned to the current variable by the current state. In step 1268, the system renders the name and address of the current state. In step 1270, the system renders the access right value for the current variable as the controlled program operates in the current state, after which the process proceeds back to step 1262. The depicted process repeats steps 1262, 1264, 1266, 1268, and 1270 until it is determined at 1264 that a state assigning a value for the current has not been found, after which the process proceeds to "U3" (to FIG. 50).

Figure 50:
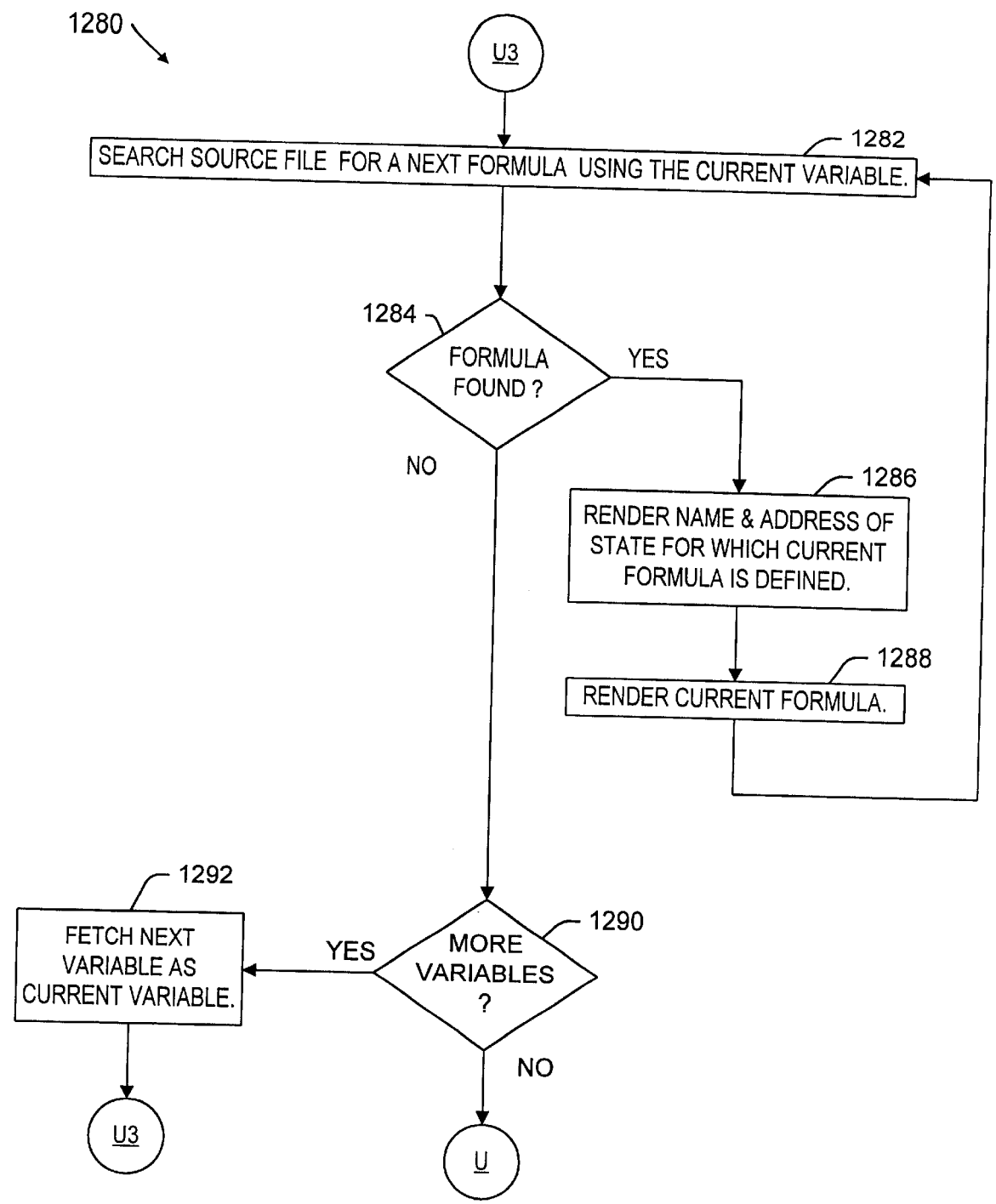

FIG. 50 shows a flow diagram at 1280 depicting a sub-process of the cross-reference listing process 220 (FIG. 47). The depicted process proceeds from "U3" (from FIG. 49) and proceeds to step 1282 in which the system searches the source file for a next formula using the current variable. It is then determined at 1284 whether a formula using the current variable has been found, and if so, the process proceeds to step 1286 in which the system renders the name and address of the state for which the current formula is defined. From step 1286, the process proceeds to step 1288 in which the system renders the current formula, after which the process proceeds back to step 1282. If it is determined at 1284 that a formula using the current variable has not been found, the process proceeds to 1290 at which the system determines whether there are more variables of the type selected in step 1224 (FIG. 47). If it is determined at 1290 that there are more variables to be listed, the process proceeds to step 1292 in which the system fetches the next variable as the current variable, after which the process proceeds back to "U3" (to FIG. 49) to repeat processes 1250 and 1280 (FIG. 49 and 50). If it is determined at 1290 that there are not more variables to be listed, the process proceeds to "U" (to FIG. 1220).

Although the present invention has been particularly shown and described above with reference to a specific embodiment, it is anticipated that alterations and modifications thereof will no doubt become apparent to those skilled in the art. It is therefore intended that the following claims be intercepted as covering all such alterations and modifications as fall within the true spirit and scope of the invention.

What is claimed is:

1. A process for generating a control program for execution by a programmable logic control unit having a plurality of input ports for receiving input signals from components of an external system under control, and a plurality of output ports for providing output signals to components of the external system, the program listings being easily read and understood by one not trained in the arts of software engineering, comprising the steps of:

(ai) providing a variable editing user interface allowing a user to select and edit existing variables stored in a file and including input variables associated with corresponding ones of the input signals, and output variables associated with corresponding ones of the output signals, and to define new variables;

(aii) displaying a list of previously defined variables;

(aiii) selecting a type of variable from a predetermined set of types of variables;

(aiv) selecting and editing an existing variable of the selected type, or defining a new variable of the selected type by entering a variable name identifying the variable, and specifying particular characteristics of the new variable; and (av) storing the edited or defined variable in said file and returning to step (aii) until all desired variables have been edited and/or defined;

(bi) providing a program level editing user interface allowing the user to edit a program level stored in said file, said program level including a plurality of states defining a sub-process of said control program for asynchronous execution by the programmable control unit, or to define a new program level;

(bii) selecting and editing an existing program level, or defining a new program level by assigning a level value, level type and level description thereto; and (biii) storing the edited or new program level in said file and returning to step (bii) until all desired program levels have been edited and/or defined;

(ci) providing a state editing user interface allowing a user to select and edit an existing state stored in said file, or to define a new state having at least one variable associated therewith, said variable being assigned a data value upon transition of said control program to the corresponding state during execution of said control program by the programmable control unit;

(cii) selecting and editing an existing state, or defining a new state and assigning at least one variable thereto; and (ciii) storing the edited or new state in said file;

(di) providing a condition editing user interface allowing a user to select and edit a condition associated with a particular state and stored in said file, or to add a new condition to a selected state said condition specifying a transition from an associated state as a source state to a corresponding selected destination state upon satisfaction of said condition during execution of said control program by the programmable control unit;

(dii) selecting a stored condition for editing, or defining a new condition for a particular state by assigning thereto a condition address, a condition name, a destination state address, and a destination state name, said destination address specifying, for said condition, a transition from its associated state, as a source state, to a selected destination state when said condition is true during execution of said control program; and (diii) storing said edited or new condition in said file; and (e) generating said control program as a function of the associative relationships of said stored variables, states, and conditions stored in said file.

2. A process for generating a control program as recited in claim 1 wherein said program levels include:

at least one task program level; and at least one subroutine program level which may be called by a corresponding calling program level having a plurality of states, said plurality of states of said corresponding calling program level including at least one state having a call condition associated therewith, said call condition specifying a transition from an associated state of a calling program level to a corresponding selected destination state of a corresponding subroutine program level;

said plurality of states of said corresponding subroutine program level including at least one state having a return condition associated therewith, said return condition specifying that said control program is to transition to a return state of said corresponding calling program level upon satisfaction of said return condition during execution of said control program.

3. A process for generating a control program as recited in claim 2 wherein a return state is indicated by a return state field associated with a calling condition of a corresponding calling program level.

4. A process for generating a control program as recited in claim 2 wherein each said subroutine program level and said corresponding calling program level are executed by the programmable control unit in a single thread.

5. A process for generating a control program as recited in claim 1 wherein:

each of said program levels has a program level value field associated therewith, said program level value field for carrying a value uniquely identifying said program level;

each of said states of each said program level has a state address field associated therewith for carrying a state address defined by a program level value of a corresponding program level, and a state value uniquely identifying said state; and each of said conditions has a condition field associated therewith, each said condition field including, a condition address field for carrying a condition address indicative of said condition, said condition address being formed by the program level value of a corresponding program level, the state value of a corresponding state, and a condition value uniquely identifying the condition, and a destination state address field carrying the state address of the selected destination state to which said process is to transition if the condition is determined to be true during execution of the control program by the programmable control unit.

6. A process for generating a control program as recited in claim 5 wherein:

each said program level has a program level name field associated therewith for receiving a user specified character string descriptive thereof;

each said state of each said program level has a state name field associated therewith for receiving a user specified character string descriptive thereof; and each said condition field further includes a condition name field for receiving a user specified character string descriptive thereof.

7. A process for generating a control program as recited in claim 5 wherein said state values and said condition values are automatically generated sequentially by said process as the user defines said states and said conditions via said state editing user interface and said condition editing user interface respectively.

8. A process for generating a control program as recited in claim 1 wherein said set of types of variables includes memory location variables including:

at least one program variable for which an associated program variable data field is to be allocated by said programmable control unit upon execution of said control program; and at least one digital variable for which an associated digital variable data field is to be allocated by said programmable control unit upon execution of said control program.

9. A process for generating a control program as recited in claim 1 wherein said input variables include analog input variables associated with corresponding analog input signals received from corresponding ones of said components of said external system; and digital input variables associated with corresponding digital input signals received from corresponding ones of said components of said external system.

10. A process for generating a control program as recited in claim 1 wherein said output variables include analog output variables associated with corresponding analog output signals provided to corresponding ones of said components of said external system; and digital output variables associated with corresponding digital output signals provided to corresponding ones of said components of said external system.

11. A process for generating a control program as recited in claim 1 wherein said conditions include condition statements for determining whether a transition from an associated source state to a corresponding destination state is to occur, said condition statements including check-state condition statements specifying that a selected check state and a source state must be active for the associated condition to be satisfied, the selected check state and source state being associated with different ones of said program levels.

12. A process for generating a control program as recited in claim 1 wherein selected limited ones of the program levels are limited to be executed by the programmable control unit only when corresponding selected limiting states are active, each said limiting state being associated with a program level other than the corresponding limited program level.

13. A process for generating a control program as recited in claim 1 wherein said program levels include at least one task program level.

14. A process for generating a control program as recited in claim 1 wherein said program levels include:

at least one subroutine program level which may be called by a corresponding calling program level having a plurality of states, said plurality of states of said corresponding calling program level including at least one state having a call condition associated therewith, said call condition specifying a transition from an associated state of a calling program level to a corresponding selected destination state of a corresponding subroutine program level;

said plurality of states of said corresponding subroutine program level including at least one state having a return condition associated therewith, said return condition specifying that said control program is to transition to a return state of said corresponding calling program level upon satisfaction of said return condition during execution of said control program.

15. A process for generating a control program as recited in claim 1 wherein said program levels include at least one task program level.

16. A process for generating a control program as recited in claim 1 wherein said program levels include:

at least one subroutine program level which may be called by a corresponding calling program level having a plurality of states, said plurality of states of said corresponding calling program level including at least one state having a call condition associated therewith, said call condition specifying a transition from an associated state of a calling program level to a corresponding selected destination state of a corresponding subroutine program level;

said plurality of states of said corresponding subroutine program level including at least one state having a return condition associated therewith, said return condition specifying that said control program is to transition to a return state of said corresponding calling program level upon satisfaction of said return condition during execution of said control program.

17. A process for generating a control program as recited in claim 1 wherein said variables include analog input variables, analog output variables, digital input variables, digital output variables, program variables, digital variables, panel light-emitting diode (panel LED) variables, panel switch variables, timer variables, and proportional integral derivative (PID) variables.

18. A process for generating a control program as recited in claim 1 wherein said program level value and state name are numerical values, and further comprising the step of;

generating a flow chart having a left hand column and a right hand column, the left hand column listing in order according to program level value and state name each odd numbered state and its associated conditions, and the right hand column listing in order according to program level value and state name each even numbered state and its associated conditions, the associative relationships between the several states and conditions being indicated by connecting lines.

19. A process for generating a control program as recited in claim 18 wherein each said state is identified by a unique pair of numbers the first of which indicates program level and the second of which indicates state name.

20. A process for generating a control program as recited in claim 19 wherein each said condition is identified by a unique set of at least three numbers the first of which indicates program level, the second of which indicates state name, and the third of which indicates condition name.

21. A machine readable storage device having stored therein encoding instructions for executing a process for generating a control program for execution by a programmable control unit having a plurality of input ports for receiving input signals from components of an external system under control, and a plurality of output ports for providing output signals to components of the external system, the program listings being easily read and understood by one not trained in the arts of software engineering, said process comprising the steps of:

(ai) providing a variable editing user interface allowing a user to select and edit existing variables stored in a file and including input variables associated with corresponding ones of the input signals, and output variables associated with corresponding ones of the output signals, and to define new variables;

(aii) displaying a list of previously defined variables;

(aiii) selecting a type of variable from a predetermined set of types of variables;

(aiv) selecting and editing an existing variable of the selected type, or defining a new variable of the selected type by entering a variable name identifying the variable, and specifying particular characteristics of the new variable; and (av) storing the edited or defined variable in said file and returning to step (aii) until all desired variables have been edited and/or defined;

(bi) providing a program level editing user interface allowing the user to edit a program level stored in said file, said program level including a plurality of states defining a sub-process of said control program for asynchronous execution by the programmable control unit, or to define a new program level;

(bii) selecting and editing an existing program level, or defining a new program level by assigning a level value, level type and level description thereto; and (biii) storing the edited or new program level in said file and returning to step (bii) until all desired program levels have been edited and/or defined;

(ci) providing a state editing user interface allowing a user to select and edit an existing state stored in said file, or to define a new state having at least one variable associated therewith said variable being assigned a at a value upon transition of said control program to the corresponding state during execution of said control program by the programmable control unit;

(cii) selecting and editing an existing state, or defining a new state and assigning at least one variable thereto; and (ciii) storing the edited or new state in said file;

(di) providing a condition editing user interface allowing a user to select and edit a condition associated with a particular state and stored in said file, or to add a new condition to a selected state said condition specifying a transition from an associated state as a source state to a corresponding selected destination state upon satisfaction of said condition during execution of said control program by the programmable control unit;

(dii) selecting a stored condition for editing, or defining a new condition for a particular state by assigning thereto a condition address, a condition name, a destination state address, and a destination state name, said destination address specifying, for said condition, a transition from its associated state, as a source state, to a selected destination state when said condition is true during execution of said control program; and (diii) storing said edited or new condition in said file; and (e) generating said control program as a function of the associative relationships of said stored variables, states, and conditions stored in said file.

22. A machine readable storage device having stored therein encoding instructions for executing a process for generating a control program as recited in claim 21 wherein said program levels include: at least one task program level; and at least one subroutine program level which may be called by a corresponding calling program level having a plurality of states, said plurality of states of said corresponding calling program level including at least one state having a call condition associated therewith, said call condition specifying a transition from said associated state of a calling program level to a corresponding selected destination state of a corresponding subroutine program level: said plurality of states of said corresponding subroutine program level including at least one state having a return condition associated therewith, said return condition specifying that said control program is to transition to a return state of a corresponding calling program level upon satisfaction of said return condition during execution of said control program.

23. A machine readable storage device having stored therein encoding instructions for executing a process for generating a control program as recited in claim 22 wherein a return state is indicated by a return state field associated with a calling condition of a corresponding calling program level.

24. A machine readable storage device having stored therein encoding instructions for executing a process for generating a control program as recited in claim 22 wherein each said subroutine program level and said corresponding calling program level are executed by the programmable control unit in a single thread.

25. A machine readable storage device having stored therein encoding instructions for executing a process for generating a control program as recited in claim 21 wherein:
   each of said program levels has a program level value field associated therewith, said program level value field for carrying a value uniquely identifying said program level;
   each of said states of each said program level has a state address field associated therewith for carrying a state address defined by a program level value of a corresponding program level, and a state value uniquely identifying said state; and
   each of said conditions has a condition field associated therewith, each said condition field including,
      a condition address field for carrying a condition address indicative of said condition, said condition address being formed by the program level value of a corresponding program level, the state value of a corresponding state, and a condition value uniquely identifying the condition, and
      a destination state address field carrying the state address of the selected destination state to which said process is to transition if the condition is determined to be true during execution of the control program by the programmable control unit.

26. A machine readable storage device having stored therein encoding instructions for executing a process for generating a control program as recited in claim 21 wherein:
   each said program level has a program level name field associated therewith for receiving a user specified character string descriptive thereof;
   each said state of each said program level has a state name field associated therewith for receiving a user specified character string descriptive thereof said corresponding state; and
   each said condition field further includes a condition name field for receiving a user specified character string descriptive thereof.

27. A machine readable storage device having stored therein encoding instructions for executing a process for generating a control program as recited in claim 21 wherein said state values and said condition values are automatically generated sequentially by said process as the user defines said states and said conditions via said state editing user interface and said condition editing user interface respectively.

28. A machine readable storage device having stored therein encoding instructions for executing a process for generating a control program as recited in claim 21 wherein said set of types of variables includes memory location variables including:
   at least one program variable for which an associated program variable data field is to be allocated by said programmable control unit upon execution of said control program; and
   at least one digital variable for which an associated digital variable data field is to be allocated by said programmable control unit upon execution of said control program.

29. A machine readable storage device having stored therein encoding instructions for executing a process for generating a control program as recited in claim 21 wherein said input variables include:
   analog input variables associated with corresponding analog input signals received from corresponding ones of said components of said external system; and
   digital input variables associated with corresponding digital input signals received from corresponding ones of said components of said external system.

30. A machine readable storage device having stored therein encoding instructions for executing a process for generating a control program as recited in claim 21 wherein said output variables include:
   analog output variables associated with corresponding analog output signals provided to corresponding ones of said components of said external system; and
   digital output variables associated with corresponding digital output signals provided to corresponding ones of said components of said external system.

31. A machine readable storage device having stored therein encoding instructions for executing a process for generating a control program as recited in claim 21 said conditions include condition statements for determining whether a transition from an associated source state to a corresponding destination state is to occur, said condition statements including check-state condition statements specifying that a selected check state and a source state must be active for the associated condition to be satisfied, the selected check state and source state being associated with different ones of said program levels.

32. A machine readable storage device having stored therein encoding instructions for executing a process for generating a control program as recited in claim 21 wherein selected limited ones of the program levels are limited to be executed by the programmable control unit only when corresponding selected limiting states are active, each said limiting state being associated with a program level other than the corresponding limited program level.

33. A machine readable storage device having stored therein encoding instructions for executing a process for generating a control program as recited in claim 21 wherein said variables include analog input variables, analog output variables, digital input variables, digital output variables, program variables, digital variables, panel light-emitting diode (panel LED) variables, panel switch variables, timer variables, and proportional integral derivative (PID) variables.

* * * * *